(12) United States Patent
Grosz et al.

(10) Patent No.: US 9,077,823 B1
(45) Date of Patent: Jul. 7, 2015

(54) SYSTEMS AND METHODS FOR AUTOMATICALLY GENERATING A PHOTO-BASED PROJECT HAVING A FLUSH PHOTO MONTAGE ON THE FRONT COVER

(71) Applicant: Interactive Memories, Inc., Palo Alto, CA (US)

(72) Inventors: Aryk Erwin Grosz, Palo Alto, CA (US); Yedidya Medina, San Mateo, CA (US)

(73) Assignee: Interactive Memories, Inc., Palo Alto, CA (US)

( * ) Notice: Subject to any disclaimer, the term of this patent is extended or adjusted under 35 U.S.C. 154(b) by 0 days.

(21) Appl. No.: 14/529,777

(22) Filed: Oct. 31, 2014

(51) Int. Cl.
*H04N 1/00* (2006.01)

(52) U.S. Cl.
CPC ....... *H04N 1/00196* (2013.01); *H04N 1/00177* (2013.01)

(58) Field of Classification Search
CPC .......... H04N 1/00196; H04N 1/00183; H04N 1/00188; H04N 1/0177; H04N 1/00177
USPC .................. 382/100, 118, 224, 305
See application file for complete search history.

(56) References Cited

U.S. PATENT DOCUMENTS

| | | | |
|---|---|---|---|
| 1,710,483 A | 4/1929 | Kbaushab | |
| 2,088,672 A | 8/1937 | Steinthal | |
| D159,614 S | 8/1950 | Angeles | |
| D182,105 S | 2/1958 | Chase | |
| 2,850,294 A | 9/1958 | Orifa | |
| 2,852,275 A | 9/1958 | Arthur | |
| 3,188,114 A | 6/1965 | O'brien et al. | |
| D212,148 S | 8/1968 | Dean | |
| 4,164,085 A | 8/1979 | Steeb et al. | |
| 4,172,332 A | 10/1979 | Holes et al. | |
| 4,259,799 A | 4/1981 | Fulton | |
| 4,267,655 A | 5/1981 | Holson | |
| D266,771 S | 11/1982 | Wihlke | |
| 4,378,647 A | 4/1983 | Stancato | |
| D295,189 S | 4/1988 | Gordon | |
| 4,888,648 A | 12/1989 | Hirose et al. | |
| D312,095 S | 11/1990 | Mandel | |
| 4,991,767 A | 2/1991 | Wyant | |
| 5,040,216 A | 8/1991 | Policht | |

(Continued)

OTHER PUBLICATIONS

"Finao Online—Bookbound Art—Specialty Covers" by Finao, 2012.*

(Continued)

*Primary Examiner* — Utpal Shah
(74) *Attorney, Agent, or Firm* — American Patent Agency PC; Karl P. Dresdner, Jr.; Daniar Hussain

(57) ABSTRACT

A photo-based project and associated printed photobook having a flush photo collage, or montage, on the front cover are disclosed. In one embodiment, a photobook is made by receiving a plurality of images corresponding to a photo-project; storing said plurality of images in a data repository; receiving a print order for a printed photobook corresponding to the photo-project; in response to the print order, printing a photo-strip having one or more of the images; producing a front cover by compressing a compressible cover material to form a channel in the compressible cover material, wherein the channel is of a size and a shape matching the photo-strip; wrapping the compressible cover material with the channel around a cover board to make the front cover; and setting the photo-strip permanently into the channel and flush with the front cover to create the photobook.

33 Claims, 48 Drawing Sheets

(56) References Cited

U.S. PATENT DOCUMENTS

| | | | |
|---|---|---|---|
| D330,853 S | 11/1992 | Koytuk | |
| D340,070 S | 10/1993 | Tan | |
| D344,096 S | 2/1994 | Tan | |
| D350,365 S | 9/1994 | Kelley et al. | |
| 5,490,739 A | 2/1996 | Olson | |
| 5,662,447 A | 9/1997 | Tsai | |
| 5,683,112 A * | 11/1997 | McQueeny | 281/29 |
| 5,816,730 A | 10/1998 | Alspaw et al. | |
| D407,432 S | 3/1999 | Tell | |
| D413,922 S | 9/1999 | Thomas | |
| D415,419 S | 10/1999 | Abiteboul | |
| 5,961,150 A | 10/1999 | Kogutt et al. | |
| D417,890 S | 12/1999 | Joe et al. | |
| D418,160 S | 12/1999 | Gunasekera | |
| 6,003,901 A | 12/1999 | Takemura | |
| D421,049 S | 2/2000 | Armenta et al. | |
| D421,460 S | 3/2000 | Joe et al. | |
| D425,116 S | 5/2000 | Pflug | |
| 6,145,882 A | 11/2000 | Fu | |
| 6,147,768 A | 11/2000 | Norris | |
| 6,288,719 B1 | 9/2001 | Squilla et al. | |
| D453,766 S | 2/2002 | Grandcolas et al. | |
| 6,362,900 B1 * | 3/2002 | Squilla et al. | 358/442 |
| 6,389,181 B2 * | 5/2002 | Shaffer et al. | 382/305 |
| D460,482 S | 7/2002 | Nomura | |
| 6,540,260 B1 | 4/2003 | Tan | |
| 6,547,472 B2 | 4/2003 | Jordan | |
| 6,583,799 B1 | 6/2003 | Manolis et al. | |
| D477,361 S | 7/2003 | Park | |
| D479,531 S | 9/2003 | Yanagida | |
| D485,172 S | 1/2004 | Defino | |
| D486,499 S | 2/2004 | Hayashi et al. | |
| 6,742,809 B2 | 6/2004 | Frosig et al. | |
| D500,517 S | 1/2005 | Park | |
| 6,854,915 B1 | 2/2005 | Ong | |
| D505,975 S | 6/2005 | Navarre | |
| D507,178 S | 7/2005 | Biddlecom et al. | |
| 6,931,147 B2 | 8/2005 | Colmenarez et al. | |
| D523,079 S | 6/2006 | Jackson | |
| D523,440 S | 6/2006 | Hernandez et al. | |
| 7,117,519 B1 | 10/2006 | Anderson et al. | |
| 7,146,575 B2 | 12/2006 | Manolis et al. | |
| D541,291 S | 4/2007 | Zhou et al. | |
| D545,894 S | 7/2007 | Park | |
| D553,140 S | 10/2007 | Noviello et al. | |
| D559,308 S | 1/2008 | Sakaguchi | |
| D559,906 S | 1/2008 | Sakaguchi | |
| D561,253 S | 2/2008 | Sakaguchi | |
| D567,284 S | 4/2008 | Sakaguchi | |
| 7,362,919 B2 * | 4/2008 | Das et al. | 382/284 |
| 7,383,282 B2 | 6/2008 | Whitehead et al. | |
| D573,636 S | 7/2008 | Sakaguchi | |
| 7,474,801 B2 | 1/2009 | Teo et al. | |
| 7,479,949 B2 | 1/2009 | Jobs et al. | |
| D588,453 S | 3/2009 | Glade | |
| D600,280 S | 9/2009 | Weber et al. | |
| D601,154 S | 9/2009 | Pelczarski et al. | |
| 7,911,627 B2 | 3/2011 | Niblett et al. | |
| 7,970,240 B1 * | 6/2011 | Chao et al. | 382/305 |
| 8,024,658 B1 | 9/2011 | Fagans et al. | |
| D652,447 S | 1/2012 | Knox | |
| 8,131,114 B2 * | 3/2012 | Wang et al. | 382/284 |
| D657,417 S | 4/2012 | Naimi | |
| 8,182,188 B2 | 5/2012 | Manico et al. | |
| D664,562 S | 7/2012 | McCain et al. | |
| D664,967 S | 8/2012 | Lee et al. | |
| D668,665 S | 10/2012 | Chen et al. | |
| 8,326,945 B2 * | 12/2012 | Grosz et al. | 709/218 |
| D673,864 S | 1/2013 | Read et al. | |
| D674,809 S | 1/2013 | Furue | |
| 8,345,934 B2 | 1/2013 | Obrador et al. | |
| 8,358,846 B2 | 1/2013 | Gibbs | |
| 8,363,888 B2 | 1/2013 | Chen et al. | |
| D678,894 S | 3/2013 | Kanalakis et al. | |
| 8,396,326 B2 | 3/2013 | Chen et al. | |
| D680,109 S | 4/2013 | Akana et al. | |
| D681,657 S | 5/2013 | Deng | |
| D682,854 S | 5/2013 | Kanalakis et al. | |
| D687,846 S | 8/2013 | Jou | |
| 8,503,857 B2 * | 8/2013 | Sikorski | 386/224 |
| 8,520,979 B2 | 8/2013 | Conwell | |
| D691,154 S | 10/2013 | Talbot et al. | |
| D691,653 S | 10/2013 | Benadon et al. | |
| D691,900 S | 10/2013 | Kraus | |
| 8,554,020 B2 * | 10/2013 | Berger et al. | 382/305 |
| 8,555,154 B2 | 10/2013 | Chen et al. | |
| 8,571,331 B2 | 10/2013 | Cifarelli | |
| D694,258 S | 11/2013 | Lee et al. | |
| D694,763 S | 12/2013 | Edwards et al. | |
| D694,770 S | 12/2013 | Edwards et al. | |
| D695,751 S | 12/2013 | Edwards et al. | |
| D696,266 S | 12/2013 | d'Amore et al. | |
| 8,611,677 B2 | 12/2013 | Das et al. | |
| D697,077 S | 1/2014 | Rodenhouse et al. | |
| D697,078 S | 1/2014 | Carlin et al. | |
| D697,924 S | 1/2014 | Woo-Seok et al. | |
| D698,359 S | 1/2014 | Ray | |
| D699,731 S | 2/2014 | Chand et al. | |
| 8,655,105 B2 | 2/2014 | Chen et al. | |
| 8,660,366 B2 * | 2/2014 | Chen et al. | 382/209 |
| D720,006 S | 12/2014 | Grosz et al. | |
| 2002/0148552 A1 | 10/2002 | Finley et al. | |
| 2003/0051207 A1 * | 3/2003 | Kobayashi et al. | 715/500 |
| 2004/0032599 A1 * | 2/2004 | Atkins et al. | 358/1.9 |
| 2004/0119278 A1 | 6/2004 | Metzger, Jr. et al. | |
| 2004/0164542 A1 | 8/2004 | Crawford | |
| 2005/0129334 A1 | 6/2005 | Wilder et al. | |
| 2006/0016114 A1 | 1/2006 | Vanderberg | |
| 2006/0158463 A1 * | 7/2006 | Michlin | 345/634 |
| 2006/0237961 A1 | 10/2006 | Partain | |
| 2007/0024048 A1 * | 2/2007 | Akin | 281/22 |
| 2008/0018091 A1 | 1/2008 | Hwang et al. | |
| 2008/0043259 A1 * | 2/2008 | Triplett et al. | 358/1.9 |
| 2008/0073899 A1 | 3/2008 | Parker et al. | |
| 2008/0129033 A1 * | 6/2008 | Anderson et al. | 281/38 |
| 2008/0155422 A1 * | 6/2008 | Manico et al. | 715/731 |
| 2008/0211220 A1 | 9/2008 | Boxer | |
| 2009/0235563 A1 | 9/2009 | Lehrman | |
| 2009/0284002 A1 | 11/2009 | Miranti | |
| 2009/0315313 A1 | 12/2009 | Kalman | |
| 2010/0156085 A1 | 6/2010 | Devoy et al. | |
| 2010/0158637 A1 | 6/2010 | Manico et al. | |
| 2010/0158639 A1 | 6/2010 | Manico et al. | |
| 2010/0227525 A1 * | 9/2010 | Smith | 446/149 |
| 2010/0241939 A1 | 9/2010 | Rozen-Atzmon | |
| 2010/0241945 A1 | 9/2010 | Chen et al. | |
| 2011/0013226 A1 | 1/2011 | Grosz et al. | |
| 2011/0041372 A1 | 2/2011 | Daniel | |
| 2011/0211736 A1 * | 9/2011 | Krupka et al. | 382/118 |
| 2011/0283173 A1 | 11/2011 | Babcock et al. | |
| 2012/0066573 A1 * | 3/2012 | Berger et al. | 715/202 |
| 2012/0141023 A1 * | 6/2012 | Wang et al. | 382/162 |
| 2012/0294514 A1 | 11/2012 | Saunders et al. | |
| 2012/0301865 A1 | 11/2012 | Taylor | |
| 2013/0004073 A1 | 1/2013 | Yamaji et al. | |
| 2013/0139055 A1 | 5/2013 | Chen et al. | |
| 2013/0177243 A1 | 7/2013 | Grosz et al. | |
| 2013/0264812 A1 | 10/2013 | Frech et al. | |
| 2013/0301934 A1 | 11/2013 | Cok | |
| 2013/0322707 A1 | 12/2013 | Phillips et al. | |
| 2014/0272336 A1 * | 9/2014 | Lenhard et al. | 428/203 |

OTHER PUBLICATIONS

Picaboo, "Picaboo photobooks," Picaboo website, available at http://www.picaboo.com/photo-books/classic/ Accessed on Mar. 14, 2014.

Shutterfly, "Shutterfly photo book," Shutterfly website, available at http://www.shutterfly.com/howto/photobook/cover.jsp Accessed on Mar. 14, 2014.

Snapfish, "Snapfish photo book," Snapfish website, available at http://www5.snapfish.com/photo-gift/photo-books Accessed on Mar. 14, 2014.

Lulu, "Lulu photo books," Lulu website, available at http://www.lulu.com/us/en/publish/photo-books Accessed on Mar. 14, 2014.

(56) References Cited

OTHER PUBLICATIONS

Artscow, "Artscow photo album," Artscow website, available at http://www.artscow.com/photo-books Accessed on Mar. 14, 2014.
CVS Photocenter, "CVS Photocenter photobook," CVS Photocenter website, available at http://www.cvsphoto.com/photo-books Accessed on Mar. 14, 2014.
Digilabs, "Digilabs photo album," Digilabs website, available at http://www.digilabspro.com/products/albums.shtml Accessed on Mar. 14, 2014.
Blurb, "Blurb photo album," Blurb website, available at http://www.blurb.com/create-photo-books Accessed on Mar. 14, 2014.
MyCanvas, "MyCanvas photo album," MyCanvas website, available at http://www.mycanvas.com/Products/Photo-Books.aspx Accessed on Mar. 14, 2014.
Keepsy, "Keepsy photo album," Keepsy website, available at http://www.keepsy.com/book/start Accessed on Mar. 14, 2014.
Winkflash, "Winkflash photo album," Winkflash website, available at http://www.winkflash.com/photo/books/ Accessed on Mar. 14, 2014.
Yogile, "Yogile photo album," Yogile website, available at http://www.yogile.com/ Accessed on Mar. 14, 2014.
Moleskine, "Moleskine Photo albums," website, available at http://moleskine.milkbooks.com/catalog/photo-albums.aspx Accessed on Mar. 15, 2014.
Walgreens, "Walgreens photo," website, available at http://photo.walgreens.com/walgreens/photobookdetails/product=collagebook Accessed on Mar. 15, 2014.
Costco, "Costco photo center," website, available at http://www.costcophotocenter.com/Shop/Photobooks#/ Accessed on Mar. 15, 2014.
Artifact Uprising, "Artifact uprising photo," website, available at http://www.artifactuprising.com/site/home Accessed on Mar. 15, 2014.
Kindred, "Kindred photo booklets," website, available at http://www.kindredprints.com/ Accessed on Mar. 15, 2014.
Pinhole Press, "Pinhole press photo album," website available at https://pinholepress.com/category/photo-books/ Accessed on Mar. 15, 2014.
Impressed, "Impressed App," website available at http://www.impressedapp.com/#0 Accessed on Mar. 15, 2014.
Artkive, "Artkive App," website available at http://www.artkiveapp.com/ Accessed on Mar. 15, 2014.
Photos in a Booth, "Photos in a booth album," available at: http://www.photosinabooth.com.au/photostrip-layout-options/photostrip-50pg-glorious-leather-drymount.aspx Accessed on Mar. 15, 2014.
Redtree Albums, "Red tree photo albums," available at https://www.redtreealbums.com/albums/redtree-photo-album Accessed on Mar. 15, 2014.
Enjoybook, "Enjoy book," website available at http://enjoybook.ru/ Accessed on Apr. 1, 2014.
Interactive Memories Inc. (d/b/a Mosaic), "heymosaic," website available at http://heymosaic.com/ Accessed on Mar. 14, 2014.
Tyndell, "Tyndell photographic packaging," available at https://www.tyndellphotographic.com/product/albums/album-box/39-2 Accessed on Mar. 20, 2014.
Exclusive Albums, "Flush Mount Albums," website available at https://www.exclusivealbums.com/ Accessed on Jul. 14, 2014.
Picaboo, "Picaboo photo uploading," Picaboo website, available at http://picaboo.com/ Accessed on Mar. 4, 2014.
Shutterfly, "Shutterfly photo uploading," Shutterfly website, available at http://www.shutterfly.com/ Accessed on Mar. 4, 2014.
Snapfish, "Snapfish photo uploading," Snapfish website, available at http://www.snapfish.com/ Accessed on Mar. 4, 2014.
Cluster, "Cluster photo album," Cluster website, available at https://cluster.co/ Accessed on Feb. 3, 2014.
MyPublisher, "MyPublisher photo album," MyPublisher website, available at http://www.mypublisher.com/ Accessed on Feb. 3, 2014.
Facebook's Shared Photo Album, "Facebook's shared photo album," Facebook's shared photo album website, available at https://www.facebook.com/help/151724461692727 Accessed on Feb. 3, 2014.
Jacobs, et al., "Multiresolution Image Querying," Proceedings of the 22nd Annual Conference on Computer Graphics and Interactive Techniques, SIGGRAPH 1995, pp. 277-286, U.S.
Athentec Imaging Inc., "Perfectly Clear by Athentech Imaging," available at http://www.athentech.com/ Accessed on Mar. 10, 2014.
Cheng, et al. "Salient Object Detection and Segmentation," IEEE Transactions on Pattern, 2011, U.S.
Interactive Memories, Inc., "Montage," website available at http://www.montagebook.com/ Accessed on May 31, 2014. Interactive Memories, Inc. is the owner of the "Montage" business name and the owner of montagebook.com domain which features the Montage photobook (Inventors Aryk Erwin Grosz and Yedidya Medina).
Techcrunch, "Mixbook debuts Montage," available at http://techcrunch.com/2013/11/19/mixbook-debuts-montage-a-photo-book-builder-meant-to-take-minutes-not-hours/ Posted on Nov. 19, 2013. Accessed on Aug. 18, 2014. Interactive Memories, Inc. is the owner of the "Montage" business name and the owner of montagebook.com domain which features the Montage photobook (Inventors Aryk Erwin Grosz and Yedidya Medina).

\* cited by examiner

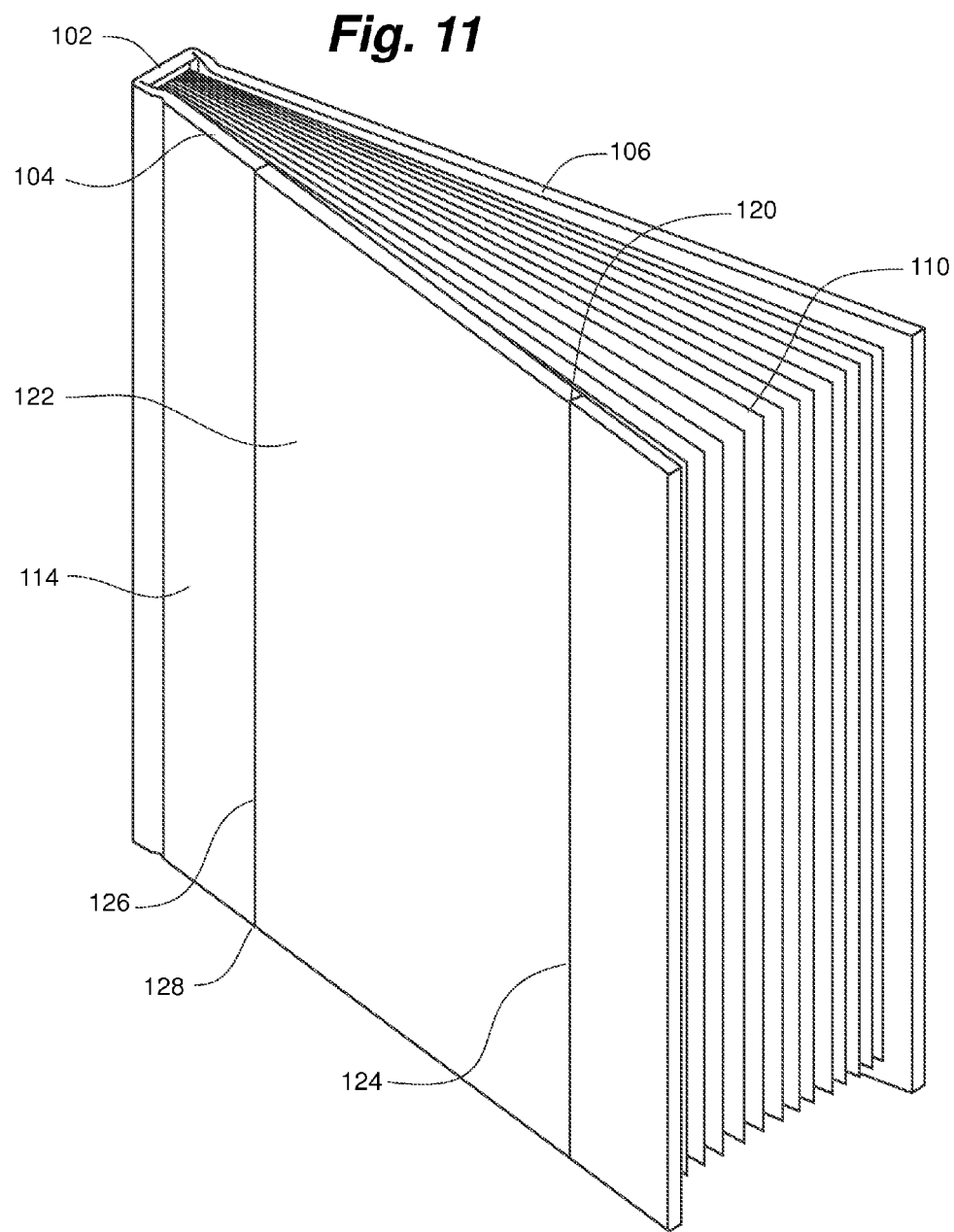

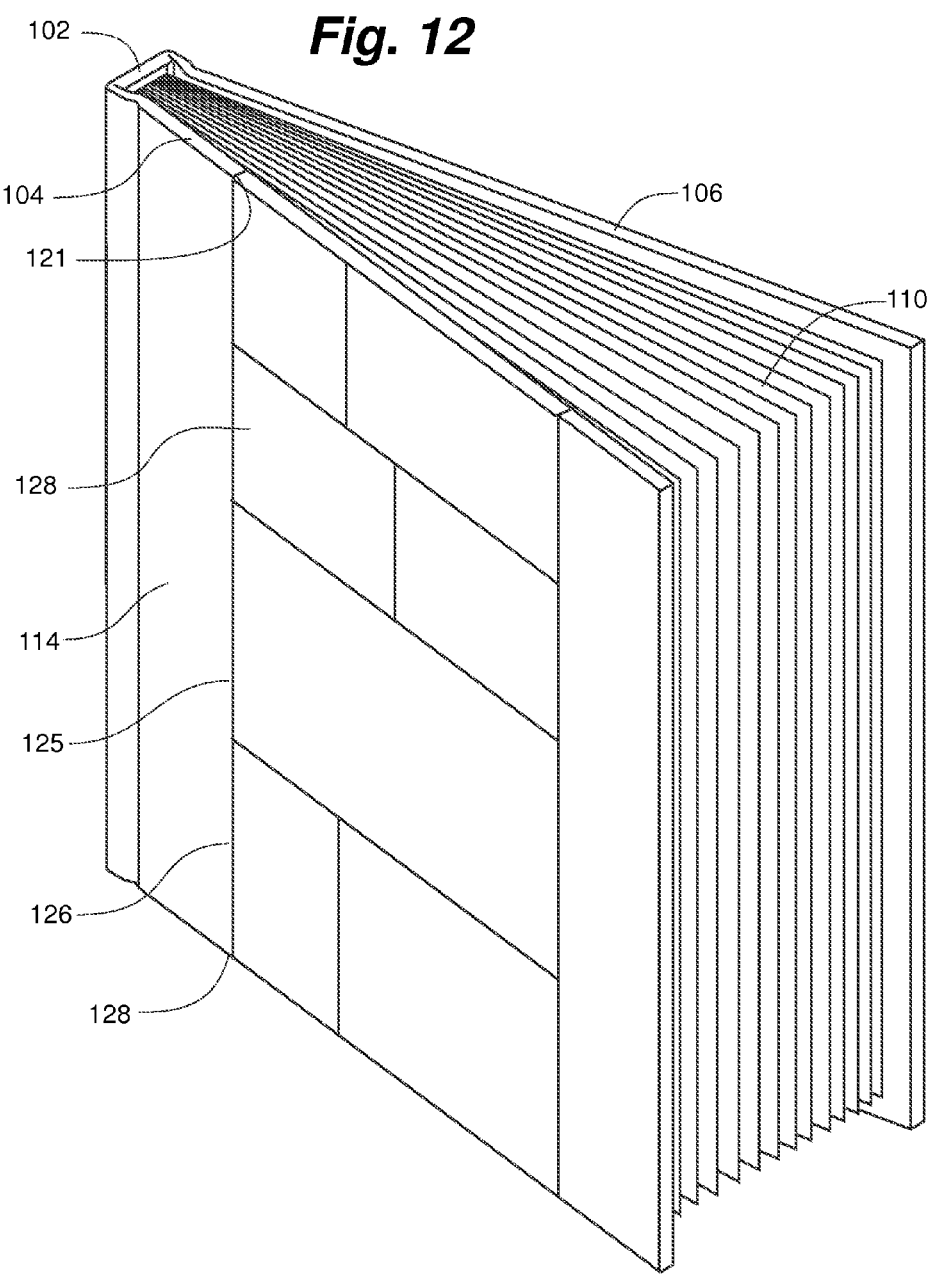

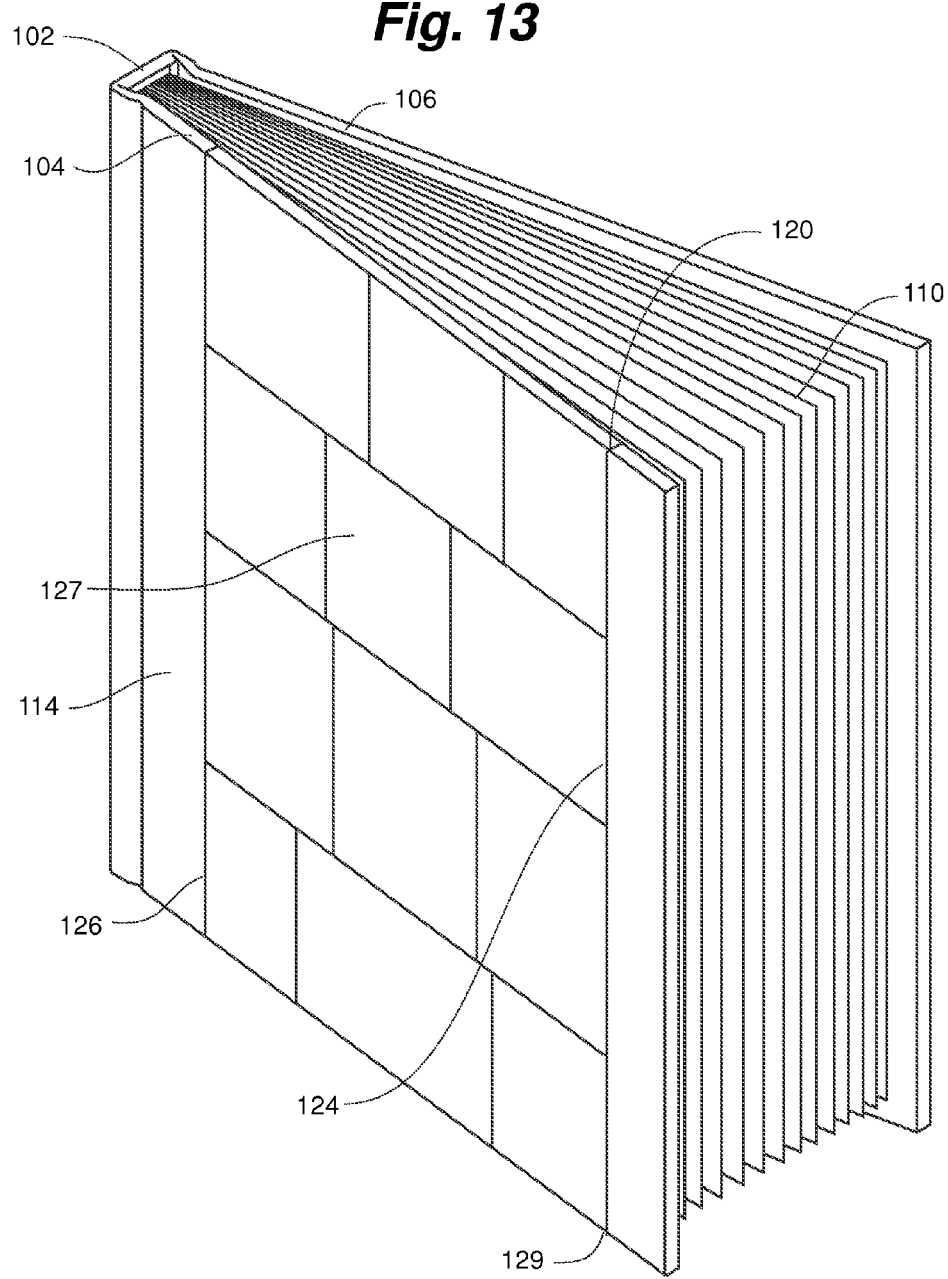

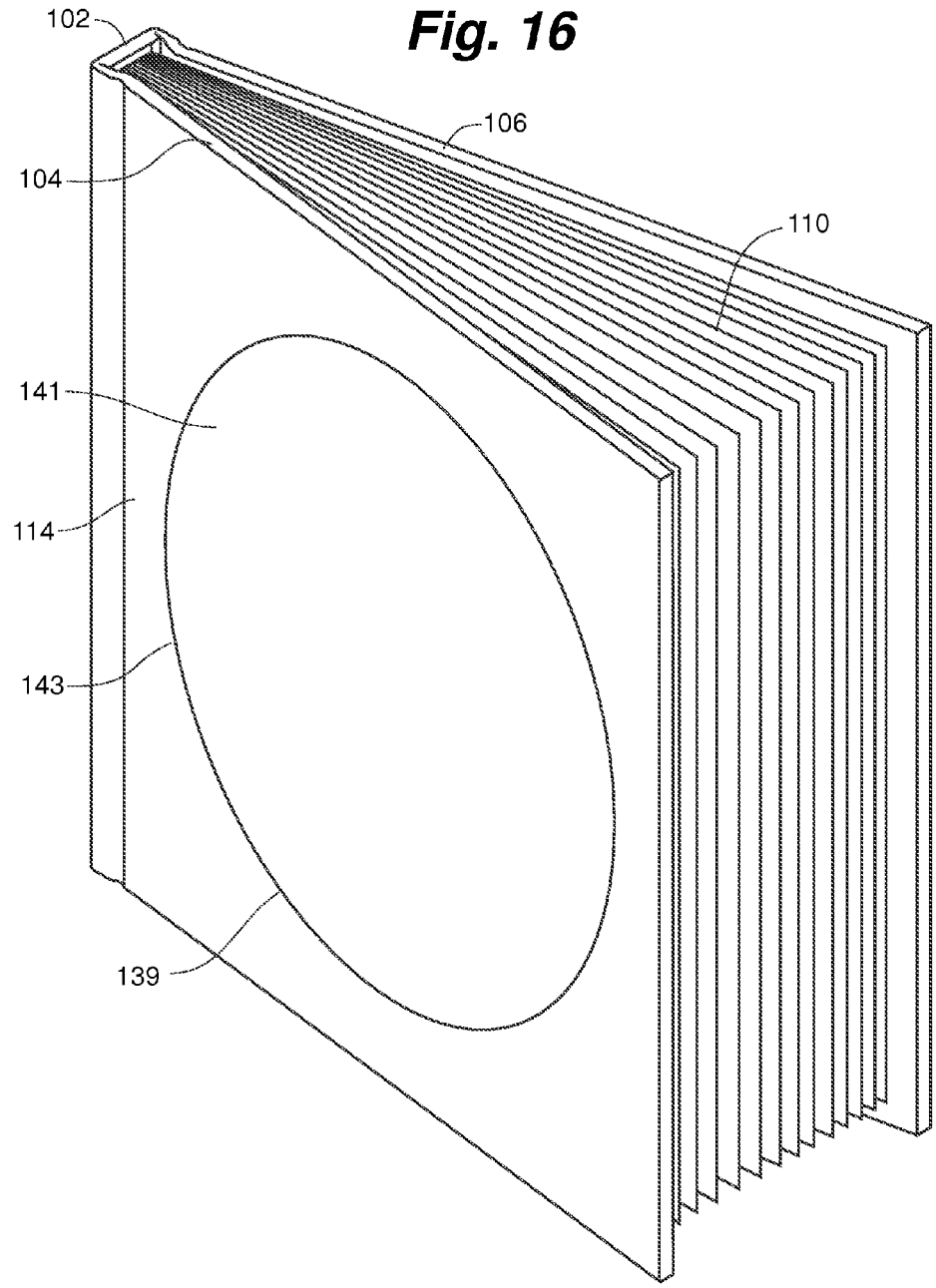

SYSTEMS AND METHODS FOR AUTOMATICALLY GENERATING A PHOTO-BASED PROJECT HAVING A FLUSH PHOTO MONTAGE ON THE FRONT COVER

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention broadly relate to systems and methods for designing customized media-based projects by automation. Embodiments of the present invention relate to customizations of content in multimedia files, photos, text, and stylistic parameters in ordering a media-based project online via an electronic commerce software application. In particular, systems and methods are provided for automatically generating a photo-based project that can be printed as a photobook which has a photo strip in a channel on the front cover so that the attached photo strip is essentially flush with the photobook cover.

BACKGROUND OF THE INVENTION

The statements in this section may be useful background to understanding the invention, but may not constitute prior art.

In the field of electronic commerce (e-commerce), there are interactive websites that assist users in creating media-based projects such as photo-books, photo-calendars, photo-cards, and photo-invitations. Such interactive websites allow users to upload photos and interact with the websites to create photo-based projects that are customized to user's preferences. A media-based project creation utilizes photos, videos, audio-videos, pictures, and/or text. As used herein, the phrase "photobook" shall be synonymous with any type of media-based product or project. Prior art photo-based project web sites come with various drawbacks.

A common drawback with conventional photo-based project websites is the amount of time required by users (Internet users or customers) to create a photo-based project. Users must often participate in a variety of functions and processes in order to complete a photo-based project. For example, users usually must sort through the photos they desire to upload, remove the photos that are not adequate or properly focused, choose the photos to be uploaded, group photos together by topic or location, order the photos by chronological order, and crop or focus photos on the relevant portions of said photos. Performing the above processes can take undue time and labor. Further, there are corrections and modifications that users must make to photos before the photos can be used in a photo-based project. For example, users often must correctly orient photos (landscape or portrait view), perform color corrections on photos, remove red-eye from the eyes of photo subjects, and correct photos for brightness or contrast. All of the corrections and modifications mentioned above require that the users additionally open a second program or application in a user device such as a personal computer, choose the photos to be corrected or modified, perform corrections or modifications, and then save the modified photos before using them in the project. Again, performing the corrections and modifications mentioned above may require additional skills, and can be time consuming, labor intensive, and create displeasure for users. As a result, many users that log-on to prior art photo-based project websites often discontinue the process, without completing a purchase transaction of the photo-book.

Prior art products for a photobook creation are often based on a theme or stylistic parameter. However, they often do not have any bearing on the inter-relationship of layouts, themes and designs so applied, and on how relevant photos are grouped together in the project. Prior art products also lack photo feature extraction, object detection, and image analysis to intelligently customize the photobook for the user.

Prior art products lack a layering of photos based on photo feature extraction, object detection, and image analysis. With such shortcomings in the prior art, an Internet user or customer may need to spend undue time and labor in manually customizing layouts, colors, themes, stylistic parameters, and captions of photos and text to be able to finally design and print-by-order a satisfactory photobook. Undue time and labor in such a manual customization is a barrier to decide on an online purchase of a photobook. Such a barrier is also known as a "friction point." Such barriers or friction points are further compounded by unfriendly graphical user interface (GUI) of prior art products and photo editing software, and result in additional inefficiencies and errors in printing a media-based product, such as a photobook. Such friction points result in loss of potential customers before the customers reach to the point where they can order the media-based product for printing. A significant fraction of potential customers are lost in such friction points.

Because of the aforementioned issues in customizing and printing a photobook through a web application or electronic commerce application, customer or user experience in creating and ordering a photobook is inefficient.

With respect to the physical books themselves, prior art books may have a photo printed on a protective book jacket of the book or on a hardcover of the book itself. For example, school textbooks need to withstand heavy use by students and may have a textbook cover photo concerning the textbook subject that is printed as an integral part of the protective plastic wrapping of the textbook cover. Similarly, a protective clear plastic wrap may be used over a photo on a photobook cover. In these cases, there is a printing of a photographic image directly on the protective cover material or the jacket of the book cover and as a result the printed photographic image contributes nothing to the thickness of the protective cover material or to the thickness of the book jacket.

Personalized photo albums and photobooks are generally used to hold photographs printed on photographic paper and the cover of the album or book may display a photograph printed on photographic paper as well. A personalized photograph may be inserted underneath a plastic window on top of the photobook cover or may be inserted underneath a border frame on top of the book cover. In some cases, the personalized photograph is inserted underneath a plastic window bordered by a frame on the top of the photobook cover. If a photograph is attached to a photobook cover without a protective covering, then an object may catch an edge of the photograph and initiate a sudden detachment or gradual peeling of the photograph from the cover of the photobook cover. The present inventors have recognized that it would be an advancement in the state of the art to address these and other problems with prior art methods for attaching photographs to photo albums, photobooks, and the like.

It is against this background that the various embodiments of the present invention were developed.

BRIEF SUMMARY OF THE INVENTION

Accordingly, the inventors have developed an embodiment of the present invention, which is a photobook, made by a process comprising the steps of receiving a plurality of images corresponding to a photo-project; storing said plurality of images in a data repository; receiving a print order for a printed photobook corresponding to the photo-project; in response to the print order, printing a photo-strip having one or more of the images; producing a front cover by compressing a compressible cover material with a stamp to form a channel in the compressible cover material, wherein the channel is of a size and shape matching the photo-strip; wrapping the compressible cover material with the channel around a cover board to make the front cover; and setting the photo-strip permanently into the channel and flush with the front cover to create the photobook.

Other embodiments of the present invention include a photobook, made by a process comprising the steps of receiving a plurality of images corresponding to a photo-project; storing said plurality of images in a data repository; receiving a print order for a printed photobook corresponding to the photo-project; in response to the print order, printing a photo-strip having one or more of the images; producing a front cover by wrapping a compressible cover material around a cover board to make the front cover; compressing the compressible cover material to form a channel in the compressible cover material, wherein the channel is of a size and a shape matching the photo-strip; and setting the photo-strip permanently into the channel and flush with the front cover to create the photobook. Other embodiments of the present invention are described next.

According to one aspect of the invention, the inventors were trying to figure out the best way to automatically insert content (photos, text, and so on) into a design in such a way as for it to appear the way the user intended in a book that they would want to purchase, with minimum input from the user.

In the prior art, content would be placed in a default way that would not take into account photo information and saliency information. The prior art would also not aggregate this information in a useful way. Most automatic content insertion in auto-fill algorithms, for example, involved centering photos perfectly in photo slots regardless of what was in the photo, thus potentially cutting off important content.

In the prior art, a combination of saliency detection, face detection, computer vision analysis, etc. was not used because all these technologies present many false positives that can make inserting the content into a layout worse. For example, with saliency detection, if one could potentially detect the sky of a photo as being the important part since it's bright and big, which would cause the photo to be positioned improperly, cutting off the people standing on the beach. The present invention solves such problems.

For grouping of photos, the prior art did not combine timestamp data along with photo similarity and photo meta-data information to do a better job at grouping the photos. The present invention is able to use this information to create a more appealing book with less user interaction. The present invention, from user feedback, presents a better finished product than the prior art. Feedback from users has been strong that the system is in fact automatically cropping and grouping photos intelligently.

The present invention helps automate the building of photobooks into a buyable product from the get-go, with little need for tweaking. The present invention offers several unique advantages over the state of the art: (a) positions photos more accurately within photo slots; (b) determines a photo's importance and uses it in the decision making process for where to place the photo on the page; (c) grouping algorithm takes into account a photo's importance, and will single a photo out if it is so important that it should end up on its own page; and (d) once the combined saliency of a photo is properly determined, the system will add the appropriate buffer to the photo so the system can fit it into a photo slot in a natural way. Other features and benefits are described later.

Accordingly, the present invention saves time and labor in creating media-based projects by automating content insertion into projects. In one embodiment, the present invention eliminates singularly practiced manual methods in prior art photo projects and automates a plurality of novel methods for creating such projects. Such novel methods comprise: sorting of photos, removing inadequate or undesirable photos, selecting correct photos, grouping of photos, ordering of photos in correct order, and cropping or focusing on an area of the photos, and presenting a book design to a user. Other embodiments of the present invention automate a plurality of photo edit processes that were traditionally not available in a single prior art product; such edit processes comprise: orienting photos, re-coloring photos or performing a color correction on photos, correcting red-eyes, and correcting photos for brightness or contrast. Furthermore, the present invention places photos more accurately within photo slots of a design page in a photobook. The present invention also auto-detects areas of saliency and computes photo importance for using photos intelligently in grouping and highlighting purposes. In one embodiment, the present invention presents to a user a final design of a photo project, without the user's involvement in the designing aspect of the project.

The present invention reduces the number of Internet users, who because of undue time and labor required by prior art media-based projects, drop off or discontinue a photobook creation process before completing a purchase of the photobook.

In one embodiment, the present invention is a method of automating a creation of a media project in a client-server environment via a graphical user interface (GUI) of a user device, after a user of said device uploads media files from said device to a server, the method comprising: (a) inserting a first set of contents, said contents comprising media files, text and user inputs, into a design of said media project, wherein said first set of contents comprises information derived though an analysis performed by said sever, and wherein said first set of contents is automatically inserted into said design without said user's interaction to said design by using automated rules of inserting contents; (b) grouping of said media files into a group by using automated rules of grouping, and inserting said group of media files into said design, wherein said design is a spread, and wherein said rules of grouping comprise timestamps, image similarities, approximations of image sequence, image scores by repetition of images, or aesthetics; and (c) presenting to said user at said GUI an automated design of said media project, wherein said presented automated design is prepared through said automated insertion rules of said contents of step (a) and said automated rules of grouping of step (b), and wherein said both rule types comprise computer algorithms of content insertion rules having saliency detection rules, face detection rules, computer vision detection rules, photo similarity detection rules, photo information detection rules, text matrix detection rules, and photo caption detection rules.

The aforementioned method further comprises the steps of: (d) inserting manually via said GUI by using said user's interactions a second set of contents into said presented automated design, wherein said second set of contents comprises information manually derived by said user's said interactions to said media project, and wherein a manual insertion of contents alters said first set of contents or adds said second set of contents into said presented automated design of step (c); (e) re-grouping of said media files based on said manual insertion of contents of step (d) in said spread of said design, wherein said presented automated design is thereby manually customized by said user's said interactions via said GUI, and wherein said user's said interactions over-ride said presented automated design of step (c); and (f) presenting to said user a final design of said media project, wherein said final design comprises said manual insertion of contents of step (d) and said re-grouping of step (e) into said presented automated design, and wherein said presented automated design is over-ridden by said user's said interactions, and wherein said final design is a deliverable product to said user.

In another embodiment, the present invention is a non-transitory, computer-readable storage medium, the medium having embodied thereon a plurality of computer code executable by a processor to implement the aforementioned steps of (a), (b) and (c). The computer readable storage medium further comprises computer code to implement the aforementioned steps of (d), (e), and (f).

In another embodiment, the present invention is a system for automating content insertion into a media-based project in a client-server environment via a graphical user interface (GUI) of a user device, after a user of said device uploads media files from said device to a server, the system comprising: said user-device having a processor, a display, a memory, and an input means; a server; a communications-link between said user-device and said server; and a plurality of computer codes embodied on said memory of said user-device, said plurality of computer codes which when executed causes said processor to implement the aforementioned steps (a), (b) and (c). The system further comprises computer code to implement the aforementioned steps (d), (e) and (f).

Another embodiment of the present invention includes a method, a system, and a computer-readable storage medium storing executable program code for a process comprising the steps of: (1) establishing a client-server connection between the server and a computing device over said communications network; (2) receiving a plurality of images from said computing device through an upload to said server, and storing said plurality of images in a data repository connected to said server; (3) performing an image analysis on said plurality of images to derive automatic image information from said plurality of images; (4) grouping said plurality of images based on said automatic image information; (5) inserting content into said photo-project based on the grouping of said plurality of images to create an editable photo-project; (6) presenting said editable photo-project to a user of said computing device; (7) monitoring user interactions on said computing device while the user is manipulating said plurality of images to derive observed image information from said user interactions; and (8) automatically modifying an arrangement of content in said editable photo-project based on said observed image information to produce a final recommended design of the photo-project.

In some embodiments, the automatic image information may be derived though one or more algorithms for: saliency detection, face detection, photo similarity detection, and object detection. The grouping of said plurality of images may be achieved through at least one of: timestamp analysis, image similarity analysis, and photo importance scoring.

In some embodiments, the observed image information may be derived through analysis of user interactions comprising: areas of interest selection, photo importance selection, text input, panning, zooming, moving, and swapping of photos by said user.

In some embodiments, the insertion of content may be achieved through one or more algorithms for: a ranking of images based on a plurality of image heuristics for calculating image importance, a buffer calculation for a best fitting content into a photo slot, an area of interest selection on a photo, a score for inserting a photo into a photo slot of a layout, a determination of a best design of a design page, a dynamic text insertion algorithm, and a positioning of a photo into a photo slot having a focal box.

Yet another embodiment of the present invention includes a method, a system, and a computer-readable storage medium storing executable program code for a process comprising the steps of: (1) inserting a first set of content into a design of said media project, wherein said first set of content is based on information derived though an analysis performed by the server, and wherein said first set of content is automatically inserted into said design without said user's interaction to said design by using automated rules for insertion of content; (2) grouping of said media files into a plurality of groups by using automated rules of content grouping, and inserting said groups of media files into said design, wherein said design is a spread, and wherein said rules of grouping comprise at least image similarity detection and image scores by repetition of images; (3) presenting to said user at said GUI an automated design of said media project, wherein said automated design is prepared through said automated rules of inserting content and said automated rules of content grouping, and wherein said rules comprise algorithms comprising at least: saliency detection rules, face detection rules, object detection rules, photo similarity detection rules, and photo caption detection rules; (4) inserting a second set of content into said automated design based on observed user interactions with said first content, wherein said second set of content is based on information derived from observing said user interactions with said media project, and wherein said insertion of said second content alters said first set of content or adds additional content into said automated design; (5) automatically re-arranging said media files based on said observed user interactions, wherein said automated design is automatically customized based on said observed user interactions via said GUI, and wherein said user interactions over-ride a photo arrangement logic specifying how photos are arranged in the media project; and (6) presenting to said user a final recommended design of said media project, wherein said final recommended design comprises said first content, said second content, and said automatic re-arranging, and wherein said final recommended design may be further customized by said user prior to ordering.

In some embodiments, the first content and the second content are inserted automatically by the server at a background computer process that is invisible to the user utilizing the GUI. In some embodiments, the steps may be practiced in any sequence. In some embodiments, the observed user interactions may comprise: panning, zooming, moving, and swapping of said media files by the user. In some embodiments, the process sends an order to print said automated design or said final recommended design to a printer, wherein said printer prints said automated design on paper, and wherein said paper is selected from a plurality of configurable print sizes. In some embodiments, the processes described here may be practiced over the Internet network.

Turning now to the physical photobooks themselves, a preferred embodiment of the present invention is a photobook, comprising: a front cover with a channel having an area less than the area of the front cover; a photo strip set into the channel; a back cover; a connection between the front cover and the back cover; and pages for photographic images, wherein the pages are situated between the front cover and the back cover, and wherein the photo strip set into the channel displays a single or multiple photographic images which are essentially flush with the front cover.

The photo strip set into the channel can have a location anywhere on the front cover, for example a location selected from the group consisting of in a central location, a right side location, a left side location, an upper location, a lower location, and a combination thereof.

In some embodiments of the present invention, the photo strip is wrapped around a front cover edge and terminates on a backside of the front cover. In other embodiments of the present invention, two or more ends of the photo strip are wrapped around edges of the front cover and terminate on the backside. For other embodiments of the photobook, the photo strip is set into a channel on the front cover and ends of the photo strip are wrapped around one to three edges of the front cover, and terminate on the back side of the front cover. In some embodiments of the invention, the channel from the cover continues around the cover edge so that the photo strip is essentially flush with the surface of the edge of the cover as well as with the cover.

In other embodiments of the photobook of the present invention, there is a channel also on the back cover of the photobook with a photo strip is set into the back cover channel so that this photo strip is essentially flush with the back cover. Photobook embodiments of the invention preferably have a photo strip covering only part of a cover.

Furthermore, in other embodiments of the photobook of the present invention there are several channels on a cover of the photobook. Optionally a photo strip can be located on the spine or an interior side of a cover with this photo strip set into a channel on the spine or interior side of the cover so that the photo strip is essentially flush with the surface of the spine or the interior cover. Notably, a photo strip on a cover of the photobook can be of any imaginable shape, for example a square, a rectangle, a triangle, pentagon, a hexagon, a polygon, a circle, an ellipse, a rounded vertices polygon, a shape having a hole or a combination of these shapes. When the present invention is practiced to make a photobook, photo strip images appear as a collage or montage of images.

For some embodiments of the present invention, the front cover or the back cover or both of a photobook may contain a rigid board material to stiffen the cover. For other embodiments of the present invention, the front cover and/or the back cover of the photobook comprises a flexible cover material so that the cover is flexible. In preferred embodiments of the present invention, the front cover and the back cover of the photobook each contain at least a rigid board cover material wrapped over with a flexible cover material.

In some embodiments of the present invention, the spine of the photobook flexibly connects the front cover to the back cover, the spine comprising the same flexible cover material as the front and back covers. In alternative embodiments, the spine of the photobook contains a rigid board material beneath the flexible cover material which stiffens the spine. For some embodiments of the present invention, the front cover, the back cover or both covers are padded using a padding material between the rigid board cover material and the flexible cover material. When in some embodiments of the present invention, the padding has been added only to the back cover of the photobook, and the front cover contains additional rigid cover board material so that the thickness of the front cover will match the thickness of the back cover.

Some embodiments of the present invention are a photobook, comprising: a front cover with a centrally located channel: a photo strip: a back cover; a spine comprising a flexible cover material; and pages for photographic images between the first cover and the second cover, wherein the front cover further comprises a first rigid board cover material over which is wrapped a flexible cover material, and wherein the back cover comprises: a second rigid board cover material and further comprises a padding material over which has been wrapped the flexible cover material, and wherein the photo strip is set into the centrally located channel, the photo strip displaying one or multiple photographic images which are essentially flush with the cover. Optionally some photobook embodiments of the preset invention have no spine which connects the front cover directly with the back cover, and the photobook has been made with its inside pages interconnected and connected to the covers. In preferred embodiments of the present invention, the photobook has a spine connecting the front cover and the back cover and also the inside pages are interconnected and fixed to the covers.

The present invention also includes methods for making a photobook of the present invention. In one embodiment, the present invention provides a method for making a photobook, the photobook comprising: a photo strip set in a channel on a cover of the photobook, the channel having an area less than the area of the cover, the photo strip displaying one or multiple photographic images, so that the one or more photographic images is essentially flush with the cover, the method for making said photobook comprising: (a) cutting pieces of a rigid cover board material for a front cover, and a back cover of the photobook; (b) cutting a piece of a flexible cover material to a size and to a shape for a wrapping of the piece of the flexible cover material over the pieces of the rigid board cover materials for the front cover and the back cover; (c) using a portion of the flexible cover material between the front cover and the back cover for making a spine connecting the front cover and the back cover; (d) making the channel by pressing a channel shaped stamp into the piece of the flexible cover material, the channel shaped stamp having so the channel has a shape and dimensions of the photo strip to be set into the channel; (e) holding the channel pressed into the piece of the flexible cover material over the rigid cover board materials at a cover location selected for the channel while wrapping the piece of flexible cover material over the front cover and the back cover; (f) using a portion of the flexible cover material for making a flexible spine comprising the flexible cover material connecting the front cover to the back cover of the photobook; (g) setting the photo strip having one or more photographic images into the channel of the piece of the flexible cover material so that the one or more photographic images of the photo strip are essentially flush with the cover having the channel; (h) printing photographic images on pages to be situated in the photobook between the front cover and the back cover; and (i) situating the pages with the photographic images in the photobook between the front cover and the back cover, thereby creating said photobook.

The flexible cover material is preferably pressed to form a channel for the photo strip before the flexible cover material is wrapped around the rigid cover board material. For synthetic flexible cover materials, the pressing may require an elevated temperature to soften the flexible cover material. For some embodiments of the present invention, the photobook has a cover comprising a rigid cover board wrapped with a flexible cover material, wherein the flexible cover material is pressed to create a channel before the flexible cover material is wrapped around a rigid cover board of a cover so that one or more photographic images on the photo strip is essentially flush with the cover. In such cases as when the photo strip is intended to continue from a cover surface to over a cover edge, and thence to the other side of the cover, then these edge surfaces needed require pressing to create a channel on the cover edge so that the photo strip is essentially flush with the cover edges.

For some embodiments of the present invention, the method for making the channel comprises pressing a piece of the flexible cover material with a stamp having the shape and the dimensions of the photo strip to be set into the channel. For some materials stamped to form a channel, the stamp pressure is about 1 psi (pounds per square inch) to about 20,000 psi.

For some embodiments of the present invention, one method for making the channel in a photobook cover further comprises adding rigid cover material strips to the rigid cover material beneath sides of the channel in the flexible cover material. In other embodiments of the present invention, methods for making the channel in a photobook cover comprise using one or more layers of same rigid cover materials alone or in combination with one or more different layers of flexible cover materials. Thus the cover materials of the channel in a cover of the photobook may comprise rigid cover materials, flexible cover materials, or any combinations thereof. Any method for shaping, casting, or molding of a cover material as a means for creating a channel wall is contemplated for some embodiments of the present invention. For example, contemplated are methods for making embodiments of the present invention having a channel in one or more cover materials of the photobook by a process of shaping, or a molding, or a casting a cover channel in a rigid cover board material and placing said channel of the rigid cover board material beneath a channel in a flexible cover material made by a process of pressing the flexible cover material. Any known method for forming a channel in a flexible cover material is contemplated for some embodiments of the present invention. One or a plurality of cover materials may be employed in some embodiments of the present invention to create one or more channels in one or more covers of the photobook so that one or more photo strips can be set into the one or the more channels so that the one or more photographic images of the one or the more photo strips are essentially flush with the cover having the channel.

For some embodiments of the present invention, the method for making the photobook further comprises padding a cover with a padding material to create a soft cover touch. Any form of padding may be suitable, including a flexible foam plastic sheet. Padding may be placed over the rigid cover board of the front cover or back cover. When padding is used in one cover, then other cover can be matched in thickness by a method of using a thicker rigid cover board material in the other cover.

For some embodiments of the present invention, the method for making the photobook further comprises adding a flexible cover material strip along at least the width of the inside surface of the spine. Adding the cover strip along the inside of the spine helps to reduce or remove or smooth out any uneven aspect of a surface along the spine caused by the use of a flexible cover material, including for example, a thick cover material such as a synthetic leather cover material that is wrapped over a photobook edge such as from an outside surface to an inside surface of the photobook.

In some photobook embodiments of the present invention, the photobook has a feature selected from the group consisting of a photo strip which displays a collage of images, a back cover which contains a padding material, a spine which comprises a flexible cover material, a spine which is rounded, a binding decoration which is located between the spine and the binding of the pages, an end sheet before the binding of the pages, an end sheet after the binding of the pages, an end sheet which displays a collage of images, pages which display a collage of images, a page which displays a single image, two consecutive pages which have a portion of the same image, and any combination of features thereof. In embodiments of the present invention, wherein the spine does not have a rigid board material, the spine may comprise a layer of a flexible cover material such as the kind used as a wrapping for the cover of the photobook.

In embodiments of the present invention, wherein the spine of a photobook has a binding decoration, the decoration may be located between the spine and the ends of the inside pages of the photobook. The binding decoration may be flexible or stiff, of any shape, and of any material. For example, the biding decoration may be a woven fabric of the same color as the flexible cover material and can give the photobook spine to have a traditional book binding appearance. Other embodiments of the invention will become apparent from the detailed description below.

BRIEF DESCRIPTION OF THE DRAWINGS

Embodiments of the present invention described herein are exemplary, and not restrictive. Embodiments will now be described, by way of examples, with reference to the accompanying drawings.

FIG. 11 depicts a frontal view of an example photobook embodiment of the present invention with a photo strip set into a channel on the front cover of the photobook so that the photo strip is essentially flush with the cover. A photographic image is not depicted on the surface of the photo strip.

FIG. 12 depicts a frontal view of an example photobook embodiment of the present invention with a photo strip set into a channel on the front cover of the photobook so that the photo strip is essentially flush with the cover. Lines in the photo strip are hypothetical borders for eight photographic images on the photo strip as a collage. The photo strip is wrapped over top and bottom edges of the front cover and is essentially flush with the bottom edge and top edges of the cover.

FIG. 13. depicts a frontal view of an example photobook embodiment of the present invention with a photo strip set into a channel on the front cover of the photobook so that the photo strip is essentially flush with the cover. Lines in the photo strip are hypothetical borders for twelve photographic images as a collage. The photo strip depicted in figure FIG. 13 is wider and larger than the photo strip depicted in FIG. 12.

FIG. 16 depicts a frontal view of an example photobook embodiment of the present invention with a circular photo strip set into a circular channel in the center of the front cover. The photo strip is essentially flush with the cover.

FIG. 17A depicts a stamp above a cover material. FIG. 17B depicts the stamp pressed into the cover material. FIG. 17C depicts a channel remaining after the stamp has been withdrawn from the cover material. The shape of the stamp, and the depth that the stamp presses into the cover material will determine the shape and depth of the channel.

DETAILED DESCRIPTION OF THE INVENTION

Glossary Definitions

Figure 1A:
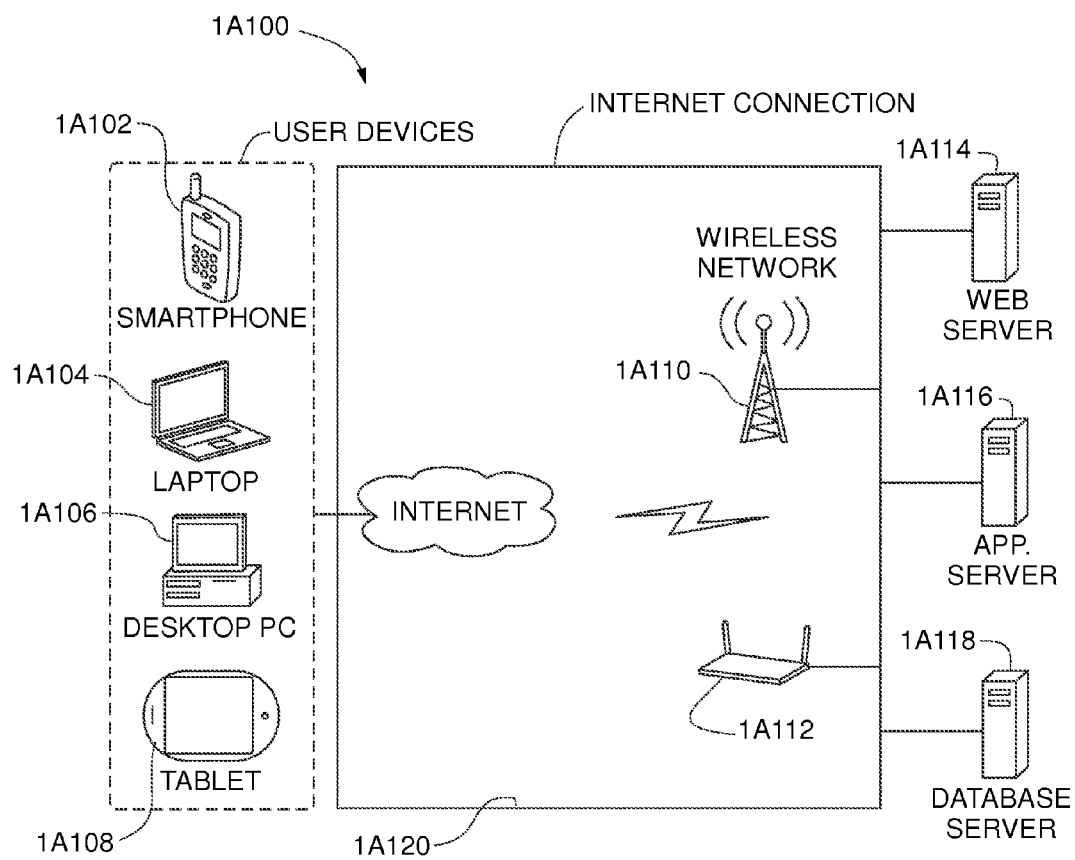
FIG. 1A is a network configuration diagram in which the present invention may be practiced.

The following terms shall have the below definitions throughout this specification and claims. The terms may be used in the form of nouns, verbs or adjectives, within the scope of the definitions.

"Project", "photo-project", "photo-based project", and "media-project" is a computer-representation of a photo or multimedia based product that is worked on either collaboratively or singularly by one or more users, that is either printed and shipped physically, or delivered electronically to the one or more users. The photo based project that is delivered physically can be a "photobook" embodiment of the present invention.

"Communications network" is a collection of terminal nodes, links and any intermediate nodes which are connected so as to enable telecommunication between the terminals. The Internet is a widely used communications network.

"Physical medium" and "storage medium" refer to an article of manufacture in which computer program code may be stored, said program code later to be executed by a computer having at least one processor, such as a server.

"Data repository" refers to a central place, such as a database, where data is stored and maintained. It is also a logical (and sometimes physical) partitioning of data where multiple databases which apply to specific applications or sets of applications reside.

"Interface", "user interface", and "graphical user interface (GUI)" is a user interface (UI) in a display of a computer screen, where a user of a computer system can provide input.

"Server" is a computer comprising a processor and a memory that is used by the system to provide the software program code implementing the invention to multiple client devices over a communications network.

"User-device", "client device", "computing device", and "user-operated computer" is a computer with a display, input options, a processor and a memory, often in the form of a laptop, desktop, tablet, smartphone, or the like, that is used by users of the system to access the services of the present invention.

"Client-server connection" and "communications link" is a connection between a sever and a user-device via a communications network.

"Image", "photo," and "photograph" shall be used interchangeably to refer to a digital image stored in memory, or in a physical environment can be a "printed image" that exists on a surface of a "photo strip" or on a page of a "photobook".

"Multimedia content" and "content" refers to images and/or text.

"Visual content", "visual information", and "image information" is 2-D information presented in images after it has been processed and analyzed through computer algorithms.

"Automatic image information" is visual information in the images extracted by the system using automated photo analysis carried out by a processor.

"Observed image information" is visual information in the images extracted by the system through observing user interactions at the GUI.

"Media analysis," "photo analysis," and "image analysis" are all computer-based methods of extracting visual information from media files. These terms are used interchangeably to refer to an automated software and/or hardware process by which important features or salient features of the media files are identified, separated from background, extracted, and analyzed. Photo analysis in particular extracts useful information from digital images by means of digital image processing. In some embodiments, photo analysis comprises "feature extraction," in which specific features are extracted. Examples of features include, but are not limited to, scenery, faces, wedding cakes, people present, etc.

"Computer vision" is a field that includes methods for acquiring, processing, analyzing, and understanding images and high-dimensional data in order to produce numerical or symbolic visual information.

"Metadata" and "meta-data" is a set of data that describes and gives information about images. Meta-data also comprises data embedded in a digital image, which is known as EXIF (Exchangeable Image File Format) data.

"Customization actions" and "automatic customization actions" refer to any automatic editorial work performed automatically by the system to customize a design of a photo project. Examples of customization actions include, but is not limited to, matching images automatically to a use case specific theme, grouping similar images, grouping images having identical faces, grouping images having identical objects, removing undesirable images, cropping images to highlight relevant portions of said images, applying correction function on the plurality of images, and so on.

"Printed project" and "printed product" refers to a project that is physically printed on a paper by a printing machine. Examples of printed products include, but not limited to, a photobook, a photocalendar, a photocard, and the like.

"Use case" refers to a use, context, or events related to a use of the printed project. Use cases may comprise a wedding, a night out, an event with friends, a baby, a year in review, a trip, a water-related event, a beach trip, a lake trip, a pool trip, a snow-related event, a ski trip, a road trip, and the like. A use case is any scenario from which the user will be ultimately providing images.

"User analysis" comprises behavioral observation of the user's inputs, interests, and choices, and any data relevant to the interest of the user. Such data can be obtained by the user's own inputs or by third party applications comprising social networking sites. User analysis is performed on the expected user of the printed product. User analysis can be manual inputs as well as automatic extractions.

"User data" refers to data obtained through user analysis. The user's interactions with the system and/or behavioral observations of the user by the system via user inputs create such user data.

"Social media platform" refers to social or professional networking sites. Such sites include, but are not limited to, FACEBOOK, TWITTER, LINKEDIN, and the like.

"Canvas" is a virtual page of a project as displayed on a GUI, before being printed into a printed product. A canvas has a particular design for a page or pages of a project, which is selected by selecting a design from a designset (and automatically inheriting a layout from a layoutset, since every designset is tied to a layoutset). The canvas includes the design along with the content inserted by the user into the design.

"Layout" specifies a number of photo and/or text slots and their positions on a canvas. No style is applied on a layout.

"Layoutset" contains a set of layouts. Layouts are distinguished by their types. The types comprise magazine layouts, signature layouts, and the like.

"Style" adds design customizations over a layout, in which the customizations comprise frames, stickers, backgrounds, borders, and their appearances and positions, including fonts, colors, etc.

"Design" is a particular style on top of a layout.

"Designset" contains a set of designs. Designs are grouped by the layoutsets being used. One layoutset can spur off many designsets. A design from a given designset can choose its layout from the associated layoutset that is also related to that designset.

"Theme" is a collection of designsets.

"Spread" is a design on a canvas that extends to two pages of an album or book, or a "photobook".

"Photo slot" is a slot or location on a page of a canvas in which a target image or photo can be placed.

"Text slot" or "caption slot" is a slot or location on a page of a virtual canvas in which text or a caption can be inserted.

"Aesthetics" is a visual appearance of a design, designating the look and feel of the design.

"Saliency" refers to a most relevant and/or most important part of an image as determined by image analysis or user action analysis (user inputs).

"Face detection" is a specific type of image analysis that determines locations and sizes of human faces in images. The algorithms used detect faces from background (buildings, trees, bodies, and the like).

"Object detection" is a specific type of image analysis that detects instances of semantic objects of a certain class in digital images and videos.

"Timestamp" is a sequence of characters or encoded information identifying when a certain event occurred, usually providing date and time of day, sometimes accurate to a small fraction of a second.

"Image heuristics" refers to specific types of image analysis that are based on experience-based techniques for image analysis that give a solution which is not guaranteed to be optimal. Certain image issues for creating an optimal design are resolved in certain ways as defined in the specification. Such issues primarily are relevant in image processing and image editing, to finally produce a design. Since such solutions are not guaranteed to be optimal global solutions, they may be referred to as image heuristics in some embodiments.

"Image sequence" is a sequence of images in which the sequence is determined by timestamp, geo-location, landscape, or by some other ordering.

"Image score" is a relative importance of an image calculated mathematically to determine a best fitting image for an intended use.

"Rule" refers to any instruction provided by the methods and the systems of the present invention in the process of creating a project. A rule comprises image heuristics, computer programs or codes, and/or algorithms.

"Algorithm" is a set of instructions to be followed in calculations or image processing, especially by a computer. In a computer implemented method or system, the term algorithm may be used interchangeably with the terms "rules" or "instructions," to refer to a sequence of steps to be carried out by a computer processor following instructions encoded in memory.

"Buffer area" is an area around an object of interest in the photo. For example, if one takes a photo of an apple on a table, one wouldn't want the photo window to crop the apple exactly at the edge of the apple. One would want there to be "buffer area" around the apple so that it doesn't look crowded on the page. The size of the buffer area is an aesthetic choice of the user or designer.

"Focal box", "focal area," or "focal subsection" is defined on a layout or a design, and defines an area within a photo slot that is "visible" or "unobstructed." In other words, this is the area on the design where the photo can clearly be seen. If a photo slot was completely uncovered, then this focal box would simply be the dimensions of the photo slot itself. The focal box can be represented with any shape, not just a rectangle, as long as it's a continuous shape. That is, a focal box is a box of any shape that is contained within the bounds of a photo slot, that a photo is fitted to. Most of the time, the focal box and the bounds of the photo slot are the same. However, when there is something covering parts of the photo slot (for example, a caption covering up a portion of a photo slot, a border, or any other obstruction to the photo slot), then the focal box is adjusted to be less than the actual photo slot, so that any inserted photo is automatically shifted away from the area that is covered.

"Photobook" and "photo-book" are names for a printed book with photo images. The photobook has a front and a back cover with one or more printed images on a photo strip. The photo strip is mounted on a cover of the photobook so that the photo strip is essentially flush with the cover. Example embodiments of photobooks of the present invention are depicted in FIGS. 10-16, and FIGS. 19-24

"Photo strip" is a strip with a single or multiple printed images of people, places, or things on the surface of the strip. The strip is generally smaller than the area of a cover of a photobook. The photo strip in preferred embodiments of the present invention has a thickness of less than 5 millimeters, more preferably less than 2 millimeters. The photo strip is generally mounted into a channel on a cover of a photobook so that the photo strip is essentially flush with the surface of the cover of the photobook.

"Printed images" are images printed on a photo strip by any means and are images printed on pages in a photobook by any means. Printed images can be printed from a photo-project, project, or media-project and can be printed to appear as a photograph or as photo prints.

"Cover" refers to the front cover and/or back cover of the photobook with the same meaning as given to the front cover and back cover of a book. Between the covers of the photobook are pages with printed images.

Figure 10:
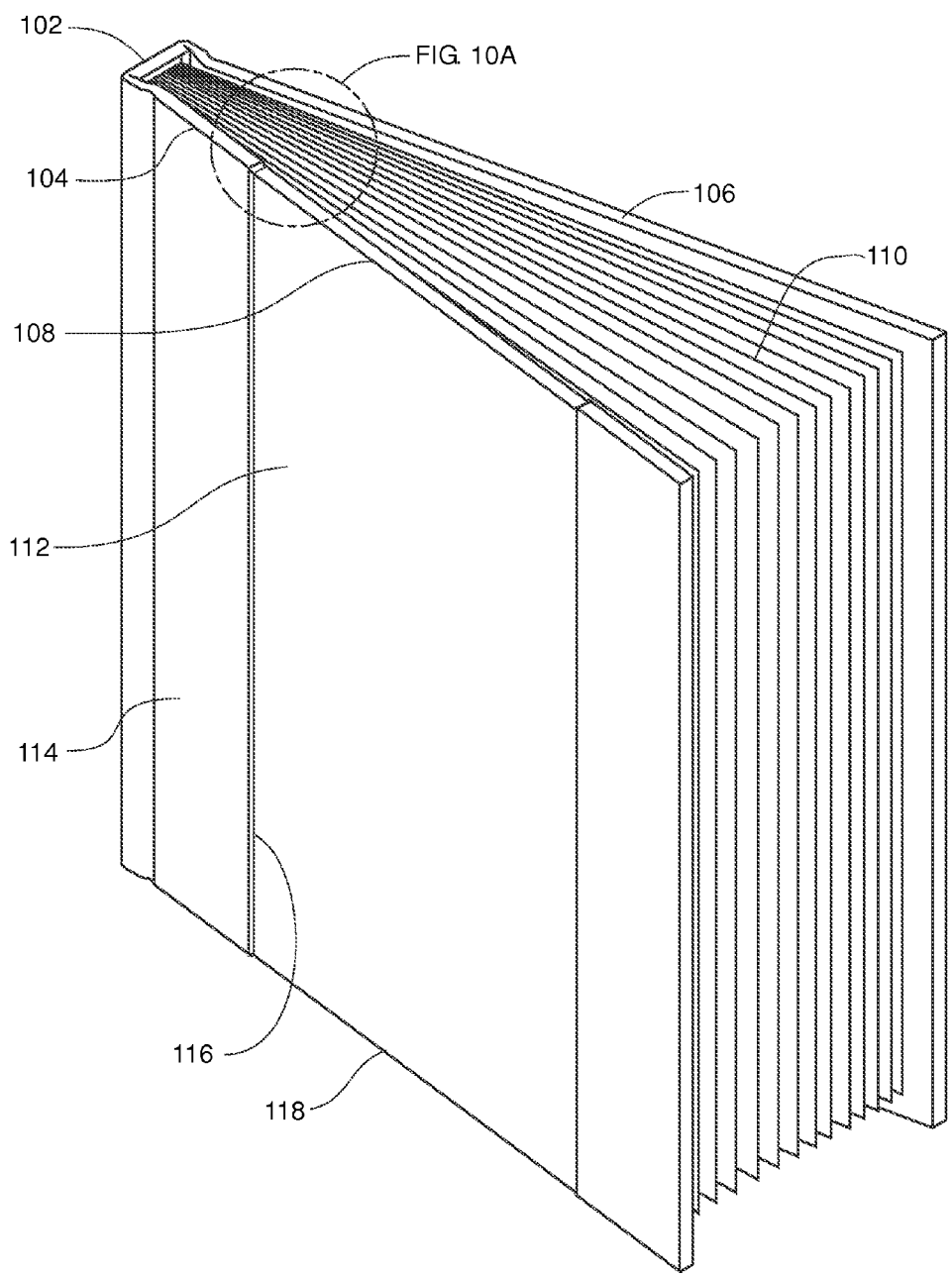
FIG. 10 depicts a frontal view of an example photobook embodiment of the present invention before a photo strip has been set into a channel on the cover of the photobook. In this embodiment, the channel passes over a top edge of the front cover, traverses a central area on the front cover, and passes over a bottom edge of the front cover.
Figure 19:
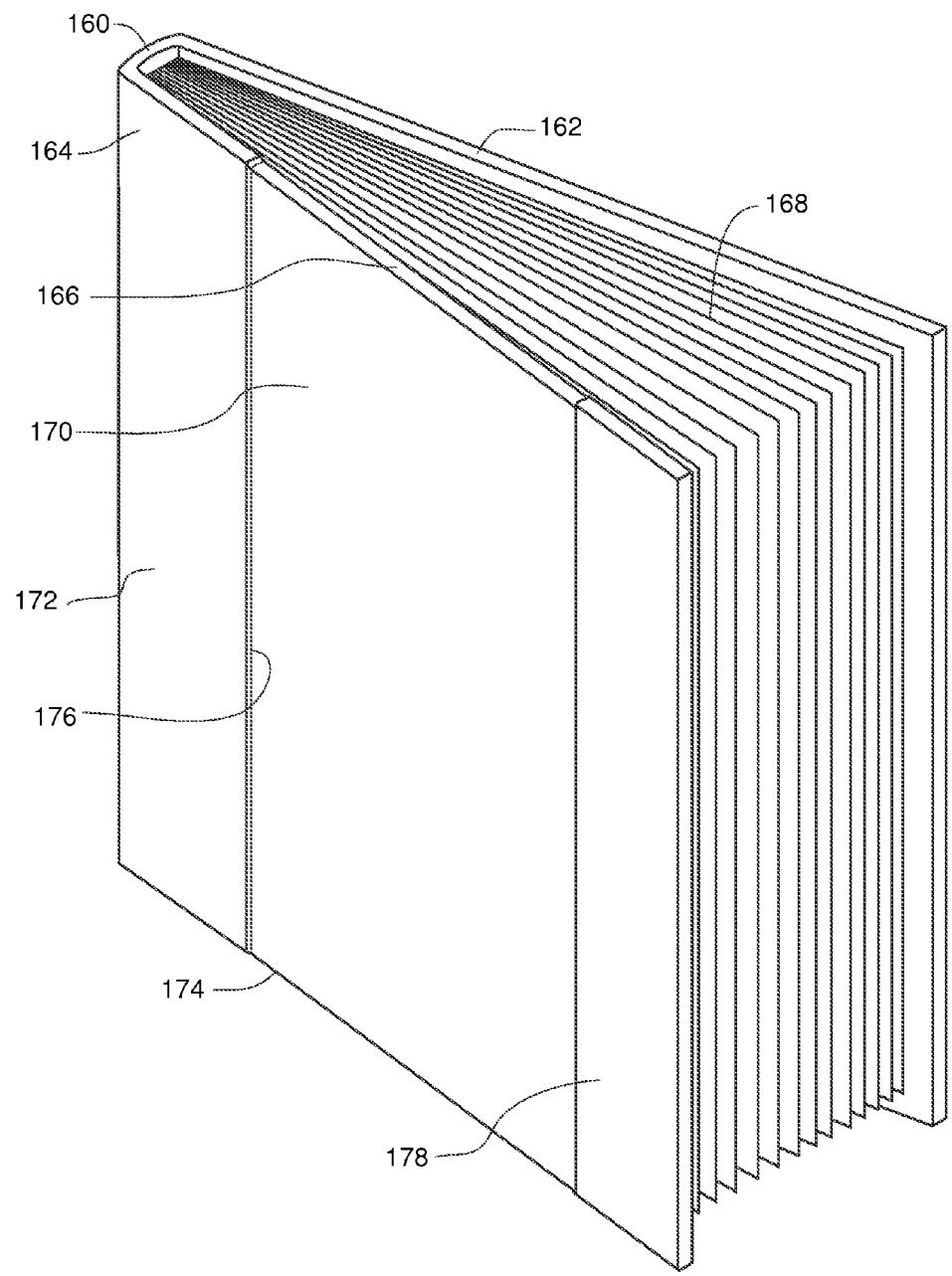
FIG. 19 depicts a frontal view of a soft rounded spine photobook embodiment of the present invention before a photo strip has been set into a channel on the front cover.

"Channel" refers to a depression that is made in the cover, generally on the front cover's outside surface of the photobook as depicted in FIGS. 10 and 19. In the channel is mounted a photo strip and thus the channel needs to have a depth slightly more than the thickness of the "photo strip" to be mounted in the channel. The channel has a horizontal area with a shape matching the shape of the photo strip to be set in the channel. Thus in some embodiments of the present invention, the channel can be made with suitable depth and area dimensions by stamping the front cover or its "cover material" using a "stamp" in a stamping method depicted in FIG. 17.

"Channel depth" refers to the depth of the channel on the cover of the photobook.

"Channel area" relates to the size, shape, and location details of the channel on the cover of the photobook. The size and shape of the channel area are designed to match the size and shape area of the photo strip to be set into the channel.

"Mounted" or "set" refers to the secure attachment of the photo strip in the channel on a cover of the photobook so that the photo strip is essentially flush with the cover. The photo strip can be mounted securely in the channel for example by using an adhesive between the channel surfaces and the photo strip.

"Flush", and "essentially flush" refer to the surface of the photo strip being at the essentially same level as the surface of the front cover, after the photo strip has been mounted in the channel.

"Stamp", "stamp-press", and "channel-shaped stamp" refer to a device with a flat surface in the shape of the area of the photo strip. A "stamp press" is a machine which can be used to exert a pressure through the stamp upon a surface which may be a cover board material, or a flexible cover material. An example stamp and stamping method are depicted in FIG. 17. The method for making the channel in the flexible cover material or another cover material of the photobook by stamping a shaped stamp into a deformable material is also sometimes called de-bossing.

"Stamp pressure" is the pressure in psi (pounds per square inch) used by the stamp when the stamp press is operated to produce a channel in a cover board material or in a flexible cover material.

"End sheets" are decorative sheets attached to the insides surfaces of the front and back covers of the photobook. Photo strip ends may be hidden beneath the end sheets. Also the end sheet(s) before the binding of the pages in the photobook and end sheet(s) after the binding of the pages in the photobook may display a collage of images.

"Binding" and "binding of pages" simply refers and means the location where the pages inside the photobook are interconnected or folded to each other. In some embodiments of the present invention, the binding of the photobook pages is attached to the front and back cover via the first and last photobook pages to the inside of the front cover and the inside of the back cover.

"Spine" is defined as the outermost "connection between the front cover and back cover" of the photobook and appears as the surface of the back of the photobook. It bridges the front cover to the back cover. The spine can be constructed of any material. In some embodiment of the present invention, the spine comprises a flexible material. The spine can be rounded by any means. An example of a flexible and rounded spine photobook is depicted as spine 160 in FIGS. 19-24. The spine may have a stiff material as a part of the spine so that the spine only flexes only at its margins where it is attached to the front and back covers. An example embodiment of a stiff spine photobook is spine 102 depicted in FIGS. 10-16. In preferred embodiments of the present invention, the spine is separate from the binding of the pages. The separation between the spine and the binding may increase when the photobook is opened. In some embodiments the spine may be directly connected to the binding of the pages of the photobook.

"Connection between the front cover and back cover" of the photobook literally refers to the various possible attachment means holding the front cover to the back cover. In some embodiments of the invention, the only connection between the front cover and back cover may be the spine which could be simply the flexible cover material of the photobook. In some embodiments of the invention, the connection between the front cover and back cover includes a stiff material containing the spine. In some embodiments of the invention, the connection between the front cover and back cover is made with the binding of the pages inside the photobook to the front and back cover, wherein for example, the first page is connected to the inside of the front cover while the last page is connected to the inside of the back cover. The binding of the photobook pages might be connected simply to the front cover of the photobook. The binding of the photobook pages might be connected only to the back cover. Preferably the "binding" of the pages is connected to both the front and back covers.

"Collage" or "montage" refers to the appearance that results when the printed images are selected to appear in combination on the photo strip used on a cover as well as may also occur on the pages of the photobook or on end sheets.

"Cover board material" refers to a structural material, for example, a thin wooden chip board which is used to stiffen the cover of a photobook.

"Padding material" refers to a compressible material such as a plastic foam, that may in a cover of the photobook. It may be present between a cover board material and a flexible cover material to improve the softness and feel of a cover of the photobook "Flexible cover material" is a flexible fabric such as a synthetic leather material which can be used as a surface wrapping for covers of the photobook.

Figure 24:
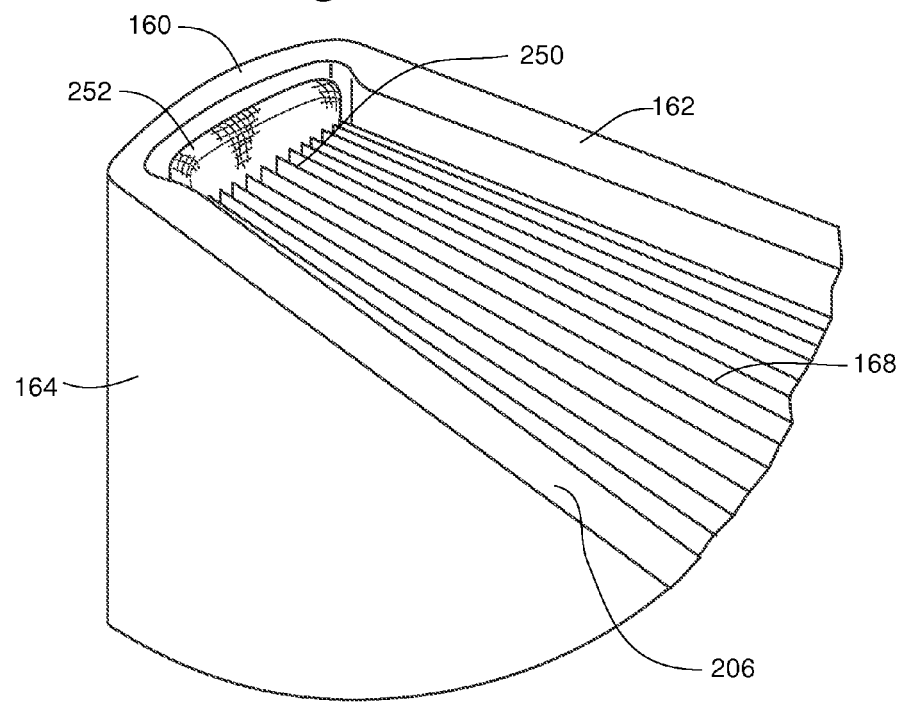
FIG. 24 depicts an expanded corner view of a soft spine photobook with a decorative binding between a flexible cover material spine and edges of the photobook pages near the spine, according to an alternative embodiment.

"Binding decoration" refers to a decoration located between the binding and the spine of the photobook. FIG. 24 depicts an example binding decoration 252. The binding decoration can be made of fabric, or woven, and can be present so that the area of the photobook spine and photobook binding of the pages takes on the appearance of a traditional book spine when the photobook is closed.

Reference in this specification to "one embodiment" or "an embodiment" means that a particular feature, structure, or characteristic described in connection with the embodiment is included in at least one embodiment of the invention. The appearance of the phrases "in one embodiment" in various places in the specification is not necessarily all referring to the same embodiment, nor is a separate or alternative embodiment mutually exclusive of other embodiments. Moreover, various features are described which may be exhibited by some embodiments and not by others. Similarly, various requirements are described which may be requirements for some embodiments but not other embodiments.

Overview

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematic, use case, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention relate to systems and methods for automating insertion of content into designs of media-based projects. Content refers to images/ photos, text, and user inputs. Generally, to create a photobook online, a user needs to select photos from a user-device, such as a laptop or mobile device. Once the photos are selected, the photos are uploaded to a server. Upon image analysis of the uploaded photos by the server, the server provides essential tools to the user-device to build a photobook. A server operates within a client-server architecture of a computer system. A server comprises computer hardware and software to serve computational requests of other programs or clients. A client comprises a user-device, such as, a laptop, a smartphone, or a desktop PC. A server performs tasks on behalf of clients. A server often provides services via the Internet or other network.

However, prior art products for a photobook creation are often based on a theme or stylistic parameter. They often do not have any bearing on the inter-relationship of layouts, themes, designs and content so applied, and on how relevant photos are grouped together in the project. Prior art products also lack photo feature extraction, object detection, and image analysis to intelligently customize a photobook for the user.

Prior art products lack a layering of photos based on photo feature extraction, object detection, and image analysis. With such shortcomings in the prior art, an Internet user or customer may need to spend undue time and labor in manually customizing layouts, colors, themes, stylistic parameters, and captions of photos and text, to be able to finally design and print-by-order a satisfactory photobook. Undue time and labor in such a manual customization is a barrier to decide on an online purchase of a photobook. Such a barrier is also known as a "friction point." Such barriers or friction points are further compounded by unfriendly graphical user interface (GUI) of prior art products and photo editing software, and result in additional inefficiencies and errors in printing a media-based product, such as a photobook. Such friction points result in loss of potential customers before the customers reach to the point where they can order the media-based product for printing. A significant fraction of potential customers are lost in such friction points.

The present invention addresses and resolves these problems by automating designs of photo-based or media-based projects. The present invention automates photo feature extraction, object detection, image analysis, photo grouping, and content insertion. The present invention saves time and labor in creating media-based projects by automating content insertion into the projects. In one embodiment, the present invention eliminates manual methods of prior art photo projects and automates efficient methods for such projects, the automated methods comprise: sorting of photos, removing inadequate or undesirable photos, selecting correct photos, grouping of photos, ordering of photos in correct orders, and cropping or focusing on an area of photos.

Other embodiments of the present invention automate the processes that comprise: orienting photos, re-coloring photos or performing a color correction on photos, correcting red-eyes, and correcting photos for brightness or contrast. The present invention places photos more accurately within photo slots of a page in a photobook. The present invention also auto-detects areas of saliency and computes photo importance for using photos intelligently for grouping and highlighting purposes. In one embodiment, the present invention presents to a user a final recommended design of a photo project, without the user's involvement in the designing aspect of the project. A final design is printable. Once printed, the final design is shippable to the user.

The present invention reduces the number of Internet users who, because of undue time and labor required by prior art media-based projects, drop off or discontinue a photobook creation process before completing a purchase of the photobook. In some embodiments, the media-based project comprises a physical manifestation of the project, resulting in a printed photobook, photo album, or other physical manifestation of the project. A photobook may be printed on a canvas or photo quality paper and bound together as a book. The media-based project also includes an online product comprising: audio, video, image and text—all packaged together as a single cohesive item or product for display or sharing through online means or electronic means, or for ordering a physical version of said online product.

A media-based project is not limited to a photobook. A photobook is a physical manifestation of the project in the form of a printed product. A physical manifestation may not be necessary in other embodiments, such as, an online video album, an online photo album, and/or combinations thereof. In the description that follows, a photobook is used as a representative of any type of media-based project.

MONTAGE, MOSAIC, and MIXBOOK are trademark names carrying embodiments of the present invention, and hence, the aforementioned trademark names may be collectively or interchangeably used in the specification and drawings to refer to the products/services offered by embodiments of the present invention. Because all of the products are created from media-files using a graphical manipulation system provided by the inventors as a network-based software application, the relative terms descriptive of the overall process and for the providing company are MONTAGE, MOSAIC, and/or MIXBOOK. The terms MONTAGE, MOSAIC, and/or MIXBOOK may be used in this specification to describe the overall media-based product creation and editing process of the invention, the website, mobile app, or web-app through which the process is made accessible to authorized users, and/or the service-providing company. With reference to the figures, embodiments of the present invention are now described in detail.

System Architecture

FIG. 1A shows a schematic diagram of a network configuration 1A100 for practicing embodiments of the present invention (this embodiment is sometimes known as "MONTAGE"). A user-device or devices may be connected to the Internet using a wireless network or wired network. A user-device may be a smartphone 1A102, laptop 1A104, desktop PC 1A106, or tablet 1A108. The wireless network comprises a cellular tower 1A110, or a wireless router 1A112. User-devices are connected to servers comprising a web server 1A114, an application server 1A116, and a database server 1A118. The servers are connected to a user-device through the wireless network, or the wired network 1A120. The wired network 1A120 or the wireless network may employ technologies and protocols comprising Ethernet technology, Local Area Network (LAN), Wide Area Network (WAN), and optical network, and the like.

Figures 1, 1B:
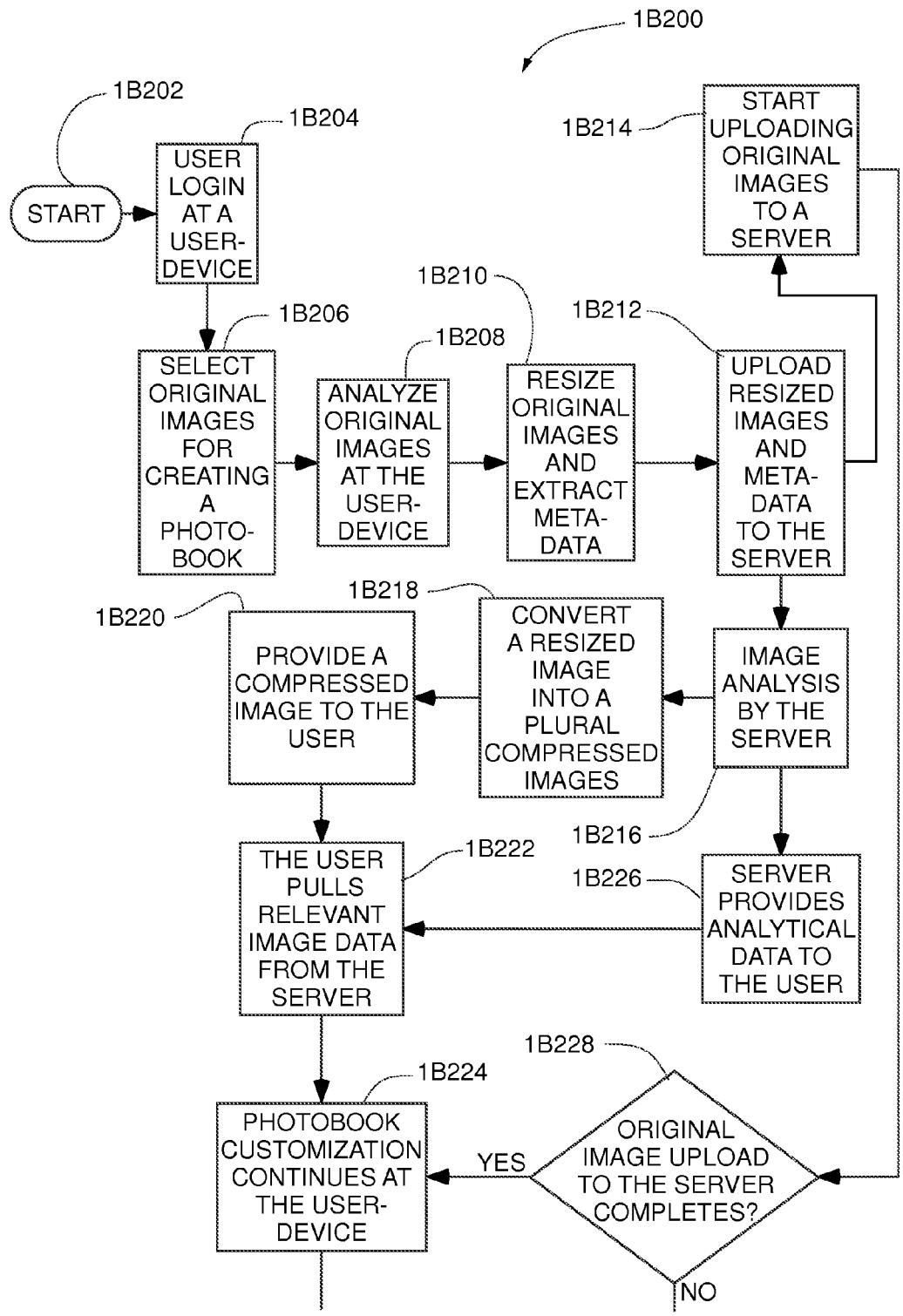
FIGS. 1B-1 and 1B-2 comprise a flow diagram showing a method of background uploading of media files, according to one embodiment of the invention.
Figures 1, 1B, 2:
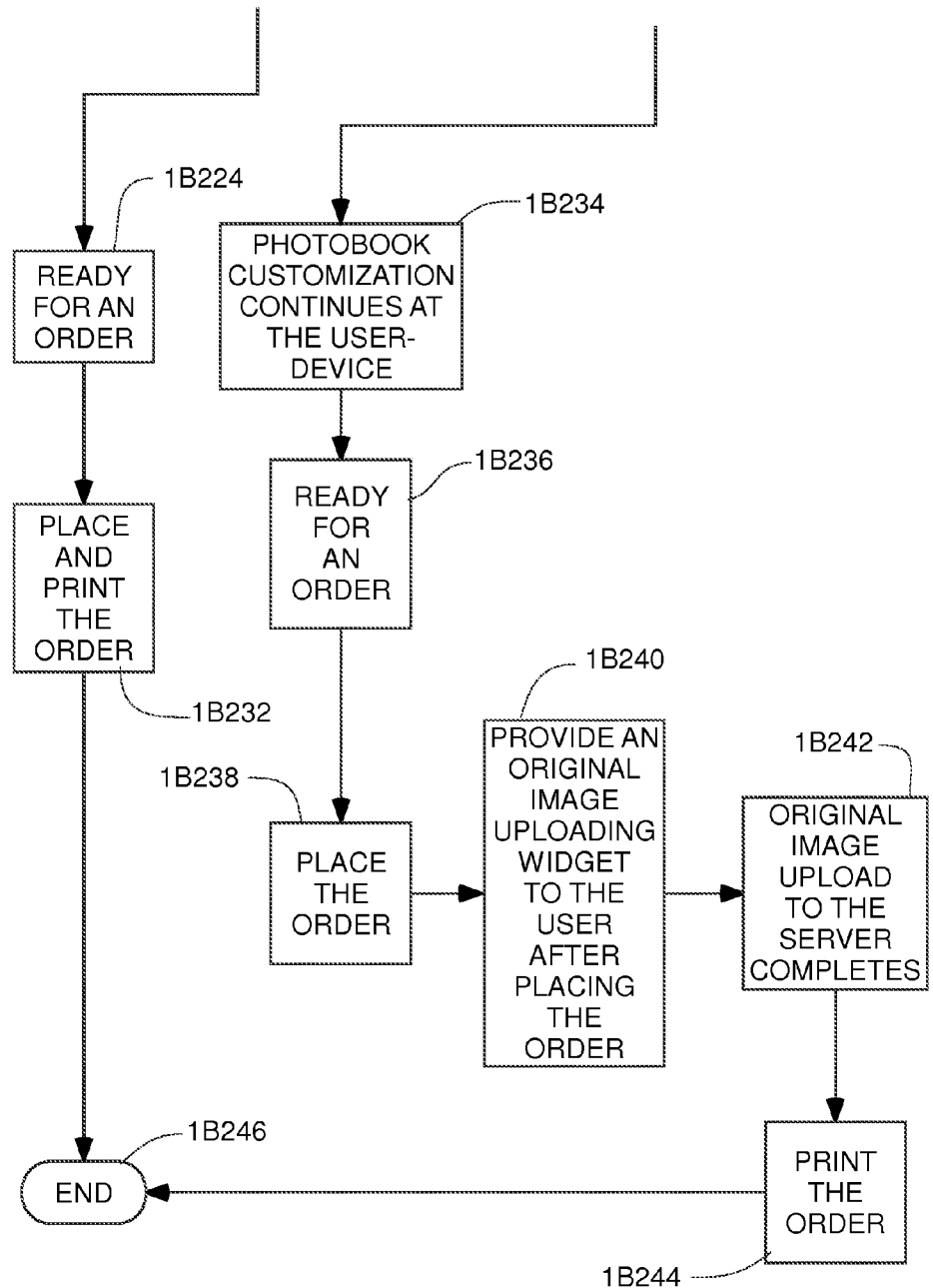

FIGS. 1B-1 and 1B-2 show a flow diagram of an exemplary embodiment 1B200 showing a method of background uploading of media-files while an Internet user is customizing a media-based project, which in this embodiment is a photobook. An Internet user (hereinafter "user") starts the process of creating a media-based project (hereinafter "project") using a user-device at step 1B202. The term photobook or project may be used interchangeably. The user logs in at step 1B204 using the user-device. After the user logs in at the user-device, at step 1B206 the user selects original media files or images for creating a photobook. At step 1B206, following the log-in process at the user-device, the user is provided a workspace (also called "editor") where the user can practice or utilize various embodiments of the present invention to customize, edit or create the photobook. After the selection of images is made, then at step 1B208, optionally and in some embodiments, the client-device analyses the images. Once the optional image analysis is completed at the client-device, at step 1B210 the original images are resized to smaller sized image files and a meta-data is extracted from each original image. Meta-data is a type of data that is relevant to or embedded in an image. Meta-data comprises digital data about a media file. In one embodiment, meta-data is an Exchangeable Image File format data, or "EXIF" data (also in some cases known as "Exif" data). EXIF is a standard that specifies a format for images, sound, geolocation data (provided by a Global Positioning Receiver or GPS receiver attached to a camera), and ancillary tags used by digital cameras, smartphone cameras, scanners, and other systems that handle image and/or sound files recorded by digital cameras. EXIF data comprises a broad spectrum of data, including, but not limiting to, date and time information of images taken, GPS location of images, camera settings (camera make and model, image orientation or rotation, aperture, shutter speed, focal length, metering mode, and ISO information), a thumbnail of the image, a description of the images, and/or copyright information thereof.

At step 1B212, the resized image files and the meta-data are uploaded to the server. The resized image files are smaller in size as compared to the larger sized original images, but not so small as to be un-useable by the server for image analysis. The resized images are immediately provided to the user-device for building the project. After the resized images and the extracted meta-data of the original images are uploaded to the server, step 1B214 will follow to begin uploading the original images to the server in a background computer process at the user-device. Using the uploaded resized images and the meta-data, at step 1B216, the server performs a server-side image analysis. An image analysis comprises image optimization algorithms, image ranking algorithms, feature or object detection algorithms, use case formation techniques, layout, and/or photobook design formation techniques, as described in greater detail below. Once the server-side image analysis is completed, at step 1B218, the server converts the resized uploaded media files into multiple sizes or multiple (plural) compression levels (the term "compressed media file" or "compressed image" is used herein to refer to a media file that has been in some way modified by the server and of a different size from the resized file uploaded from the client to the server). At step 1B220, the server provides to the user-device a compressed image, or an image of a size relevant to the scope of the project (photobook). The server converts a resized image into many different sizes (called "compressed files" herein) so that each size may be called by the user-device depending on the scope of the project. The scope of the project may comprise different sizes and different resolutions of image files, wherein the server performs the server-side image reduction to prepare images of different sizes as needed by the project. While the server performs the server-side image reduction using the resized image files, the original image files are still uploading in the background computer process. At step 1B226, the server provides analytical data to the user. At step 1B222, the user pulls relevant image data comprising image files and analytical data from the server. At step 1B224, the user continues customizing (building) the photobook or project. At step 1B228, the original image files may or still may not be uploaded [completed upload] to the server. If the original image files are uploaded to the server, the user continues building the photobook as shown by step 1B224. If the original image files are not uploaded, the photobook customization still continues at step 1B234. If the original image files are uploaded and the photobook customization continues (and thus completes), the photobook will be ready to order at step 1B224. At step 1B232, the user can place an order to print the photobook. Once the photobook is ordered and printed at step 1B232, the embodiment 1B200 ends at step 1B246.

In the event that the upload of the original images is not complete, the user still customizes (and thereby completes) the photobook at step 1B234, and is ready to order the photobook at step 1B236. The user places the order at step 1B238. Once the order is placed at step 1B238 and the original images are still not uploaded, the embodiment 1B200 provides the user a widget to upload [begin a new upload or complete the ongoing upload] the original image files that the user selects. Step 1B238 allows the user to order the photobook before the upload of the original image files completes. At step 1B240, the embodiment 1B200 provides the user an optional uploading mechanism of original image files if the user does not have time to wait until the original images are uploaded to the server before placing an order to print the photobook. However, in another embodiment, step 1B240 can happen before step 1B238 and/or before the step 1B236; that is, a widget to upload original images may be provided to the user-device before placing an order, or before the order is ready. In other words, steps discussed herein may be switched, overlapped, or altered as long as the spirit of the present invention is consistent with the plurality of embodiments described herein. An uploading widget may comprise a software application that the user can download from an embodiment of the present invention. Once the widget is downloaded and installed at the user-device, the user can begin uploading or continue uploading the original image files using the installed widget. At step 1B242, the original image files are uploaded to the server with the aid of the widget. After the original image files are uploaded to the server, at step 1B244 the server can send the order to print the finished product. The embodiment thereby ends at step 1B246.

Montage Embodiments

Figure 1C:
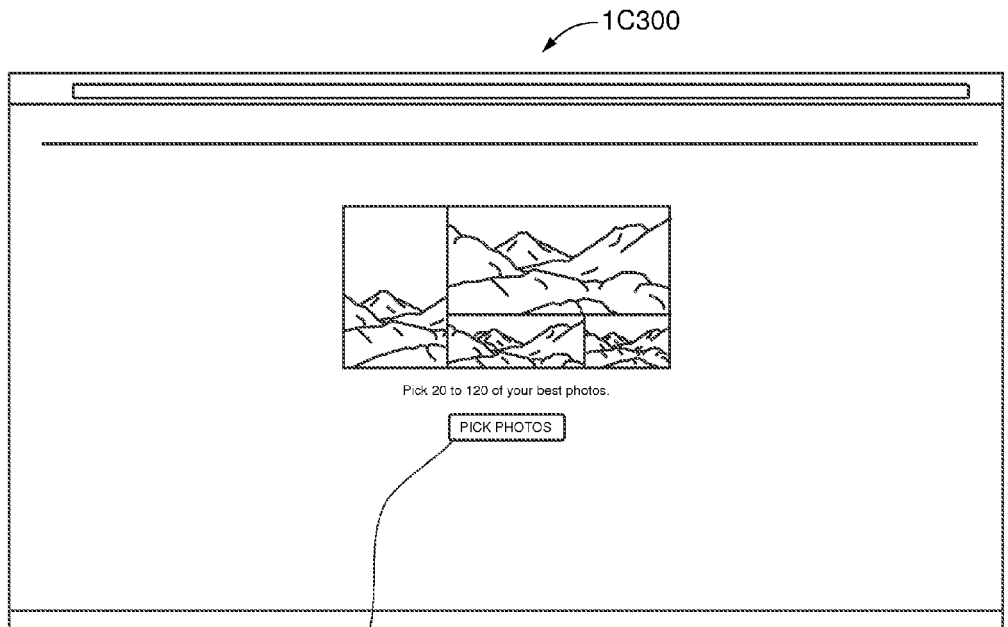
FIG. 1C is a diagram showing a method of selecting media files, according to one embodiment of the present invention (this embodiment sometimes known as "MONTAGE").

FIG. 1C is a screenshot embodiment 1C300 showing a method of selecting original media files or images at a user-device. In the embodiment 1C300, a user-device may select original images by clicking a button 1C302, labeled as, for example, pick photos. A button is a soft-button in a software embodiment. The words "image(s)" and "photo(s)" are used interchangeably in this specification.

Figure 1D:
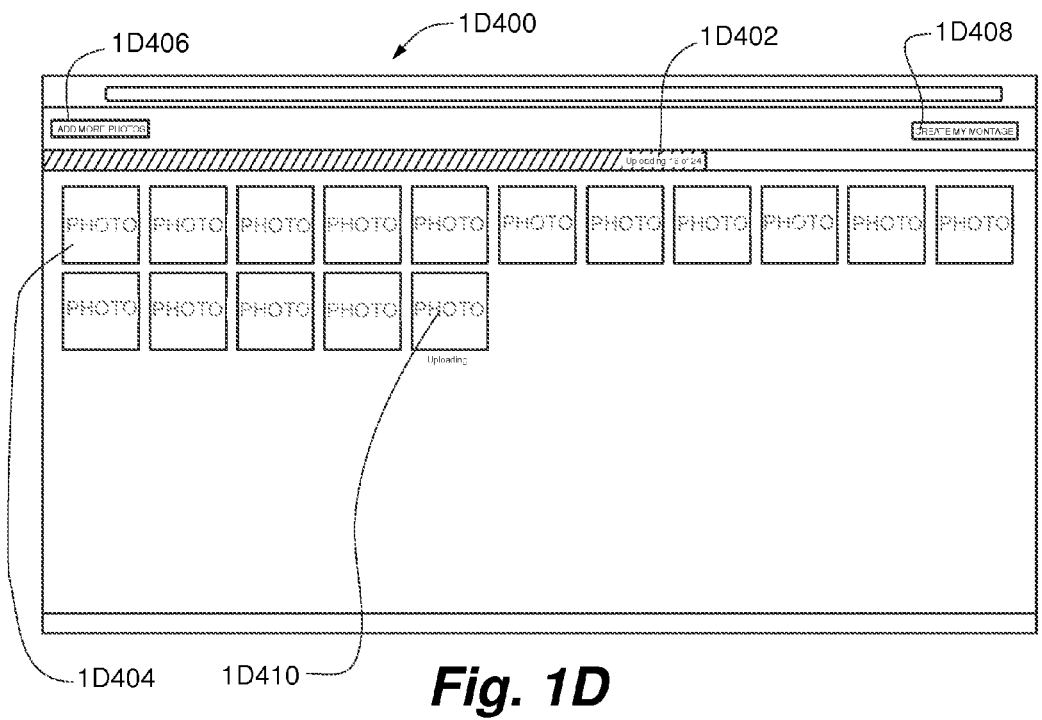
FIG. 1D is a diagram showing a method of uploading media files, according to said embodiment of the invention.

FIG. 1D is a screenshot embodiment 1D400 showing an upload of original images to a workspace of a user-device after the user-device selects or picks images. A workspace at a user-device is also called an editor. A progress bar 1D402 shows the number of images uploaded or uploading to the workspace. An uploaded image 1D404 is displayed in the workspace. The embodiment 1D400 also shows an uploading image 1D410 when the image is being uploaded. The embodiment 1D400 demonstrates client-side resizing of original image files. The image 1D404 is a resized image which is smaller than the original image. A button 1D406 allows the user to add more images. After the selected images are uploaded to the workspace of the client-device, the user can click a button 1D408 to create a design of a photobook using the uploaded photos in the workspace. The button 1D408 reads "create my Montage," where MONTAGE is a trademark name, but not a functional name, of the button 1D408.

Figure 1E:
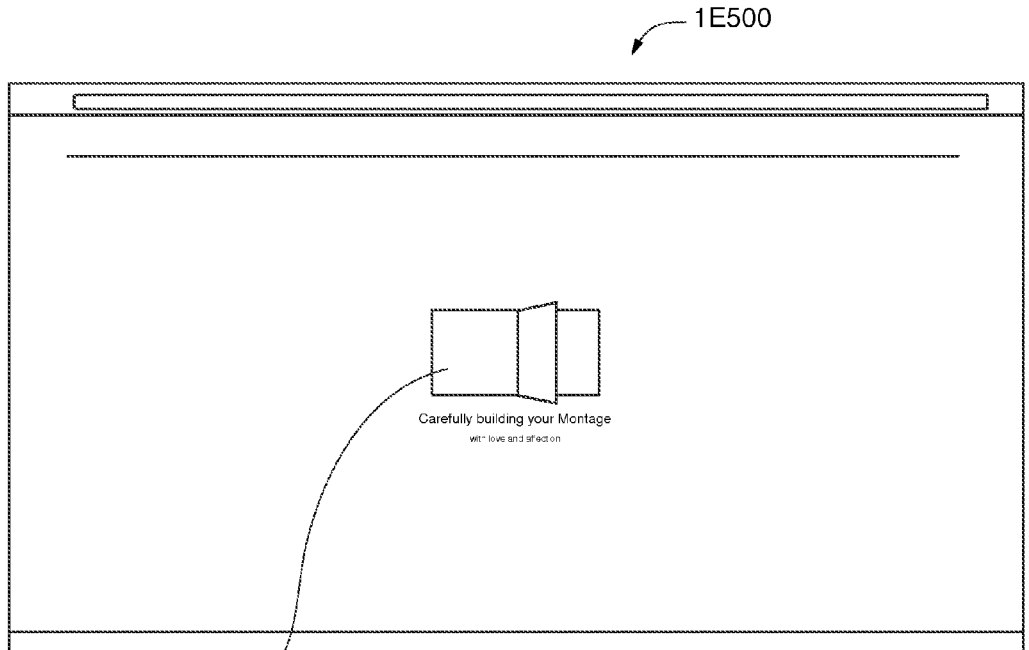
FIG. 1E is a diagram showing a method of building a media-based project, according to said embodiment of the invention.

FIG. 1E is a screenshot embodiment 1E500 in which the present invention does an analytical work or analysis work to build a photobook. An exemplary symbol 1E502 teaches that the present invention is building a photobook by performing the analytical work or analysis work, such as an image or video analysis.

Figure 1F:
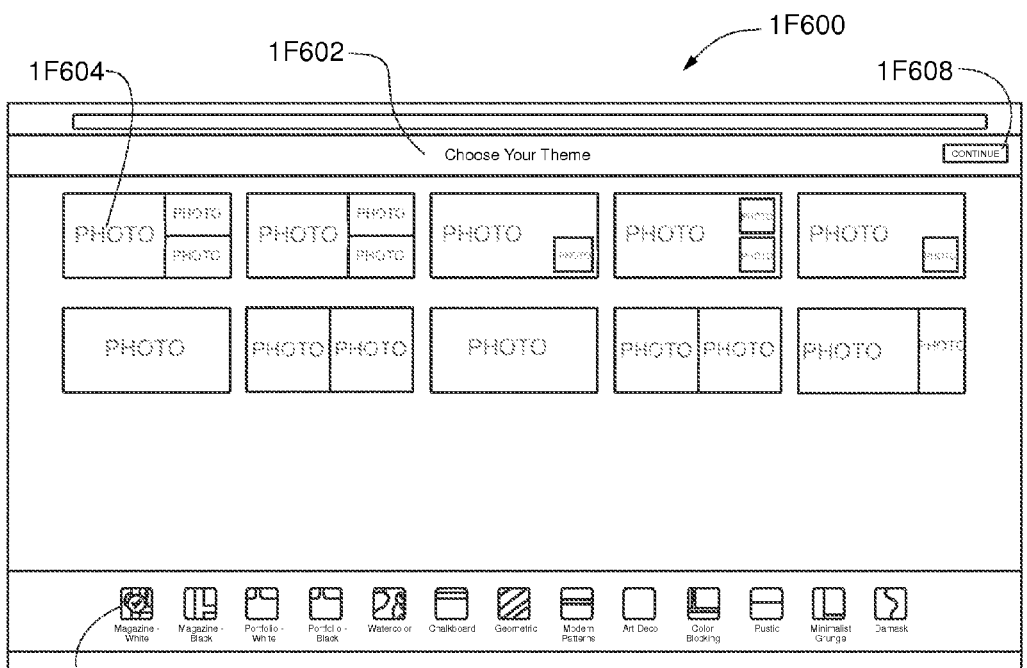
FIG. 1F is a diagram showing a method of selecting a theme, according to said embodiment of the invention.

FIG. 1F is a screenshot embodiment 1F600 that displays a theme selection of a project or photobook after images are uploaded to the workspace (editor) of a user-device. All pages of the photobook are displayed in the workspace. In a page 1F604 of the photobook, an arrangement of the images is shown. This arrangement is auto-populated by the present invention after an image analysis. The server performs the image analysis for auto-populating the arrangement. For auto-populating the design of the book, the server may use features such as, cropping, zooming, relevant images grouping, and other image editing processes. The embodiment 1F600 allows the user to select a theme 1F606. The instruction at 1F602 allows the user to select or choose the theme 1F606. Once the user is satisfied with the theme and arrangement of the images in all pages of the photobook, the user can click the button 1F608 to continue to the next step of the present invention.

Figure 1G:
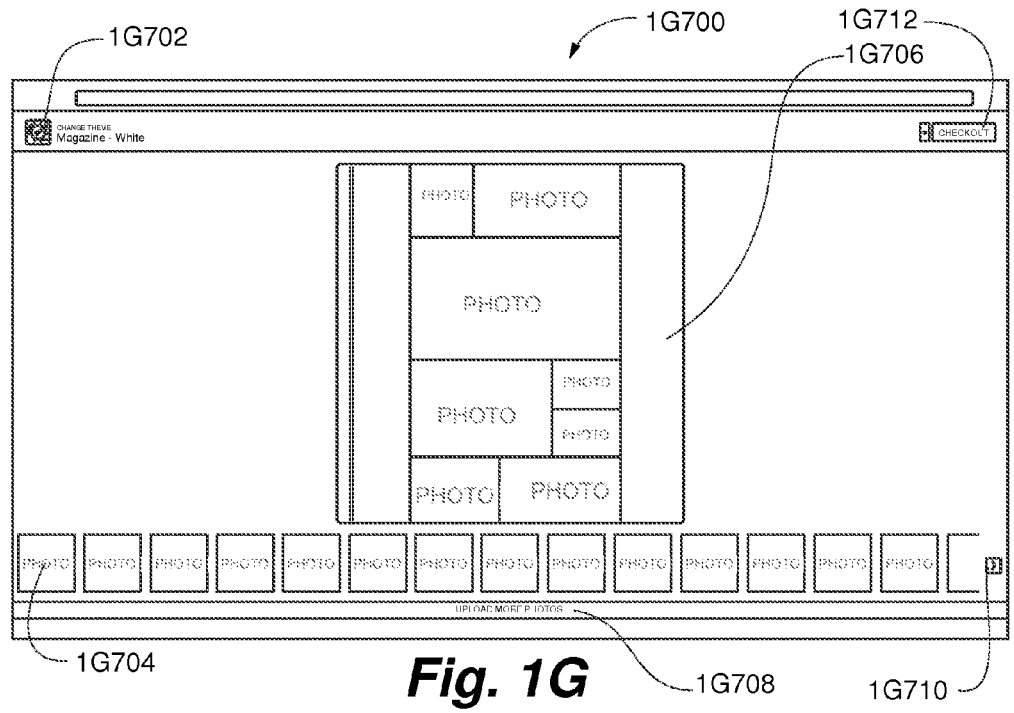
FIG. 1G is a diagram showing a method of designing a cover sheet, according to said embodiment of the invention.

FIG. 1G is a screenshot embodiment 1G700 that shows a cover page of a photobook and an arrangement of images therein. The cover page 1G706 uses at least an image 1G704. A plurality of images can be used in the cover page 1G706. A server auto-populates a first design of the cover page 1G706. The user has an option to further customize the cover page 1G706 by using any of the uploaded images. Standard image editing features may be applied in customizing each image on the cover page 1G706 of the photobook. The workspace displays the theme of the design at 1G702. The workspace further allows the user to upload more photos at 1G708. The button 1G710 allows the user to scroll the uploaded images. A checkout button 1G712 allows the user to order and print the photobook.

Figure 1H:
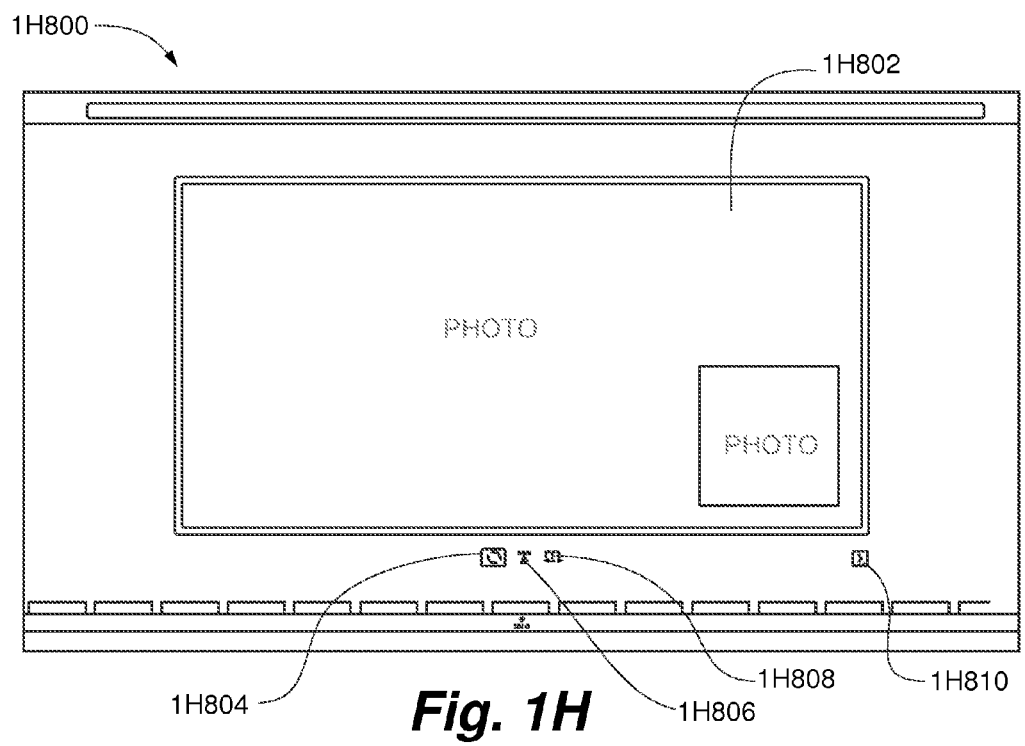
FIG. 1H is a diagram showing a method of arranging text and images, according to said embodiment of the invention.

FIG. 1H is a screenshot embodiment 1H800 that shows a page of a photobook for rearranging text and images therein. The page 1H802 shows an arrangement of the uploaded images on the page. The user can shuffle images on the page 1H802 by using a shuffle button 1H804, insert text on the page 1H802 by using a insert-text button 1H806, and rearrange pages of the book by using a rearrange button 1H808. The user can additionally use one or more of the uploaded images to customize the design of the page 1H802. The user can flip to a next page of the book by clicking or pressing an arrow button 1H810.

Figure 1J:
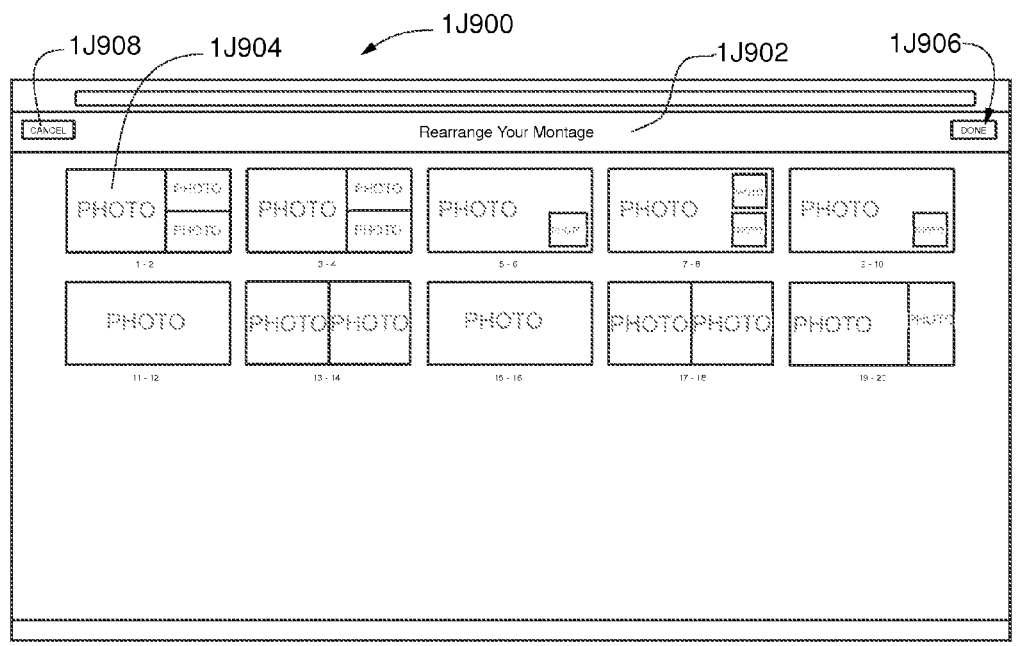
FIG. 1J is a diagram showing a method of previewing a design, according to said embodiment of the invention.

FIG. 1J is a screenshot embodiment 1J900 showing a method of previewing and rearranging design pages of a photobook. A design page 1J904 has a theme and at least an image. A plurality of images can be used in the design page 1J904 and the theme is selected by the user. In the embodiment 1J900, the design page 1J904 comprises page 1 and page 2 of the photobook. The message at 1J902 explains that the workspace provides a method to rearrange the pages of the photobook. There is a cancel button 1J908 to cancel a rearrangement if desired. Once a rearrangement of pages is completed, the user can click a done button 1J906 to save the rearrangement.

Figure 1K:
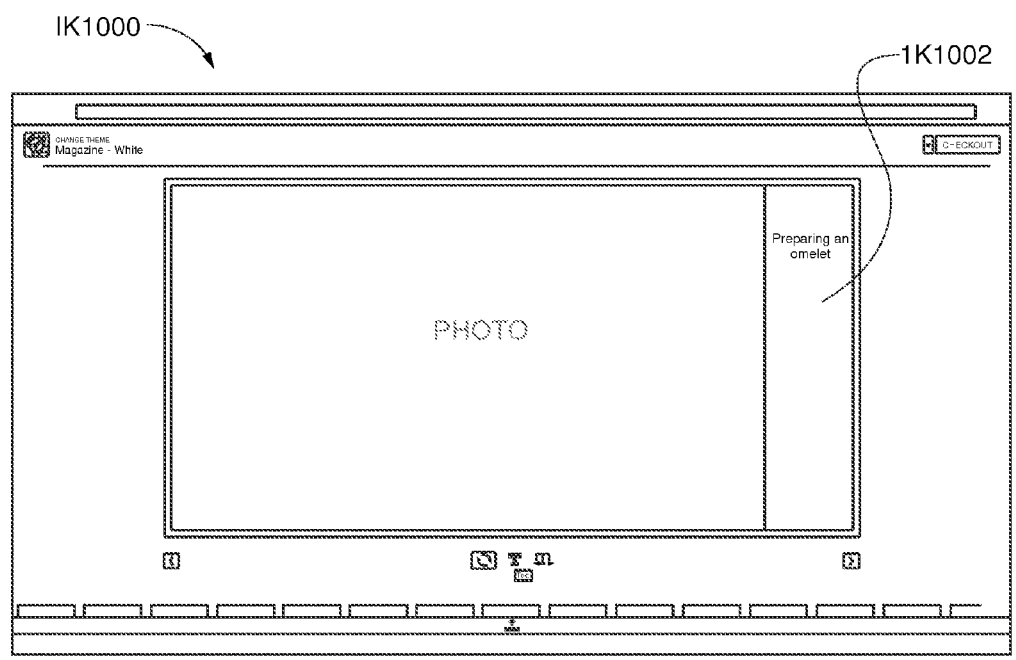
FIG. 1K is a diagram showing a method of inserting text, according to said embodiment of the invention.

FIG. 1K is a screenshot embodiment 1K1000 showing an insertion of text to describe an image. Text can be inserted into a page of the photobook to describe an image or a group of images. A storyline or narrative of work may be added with images using text. A narrative can be added as shown in the region 1K1002.

Figure 1L:
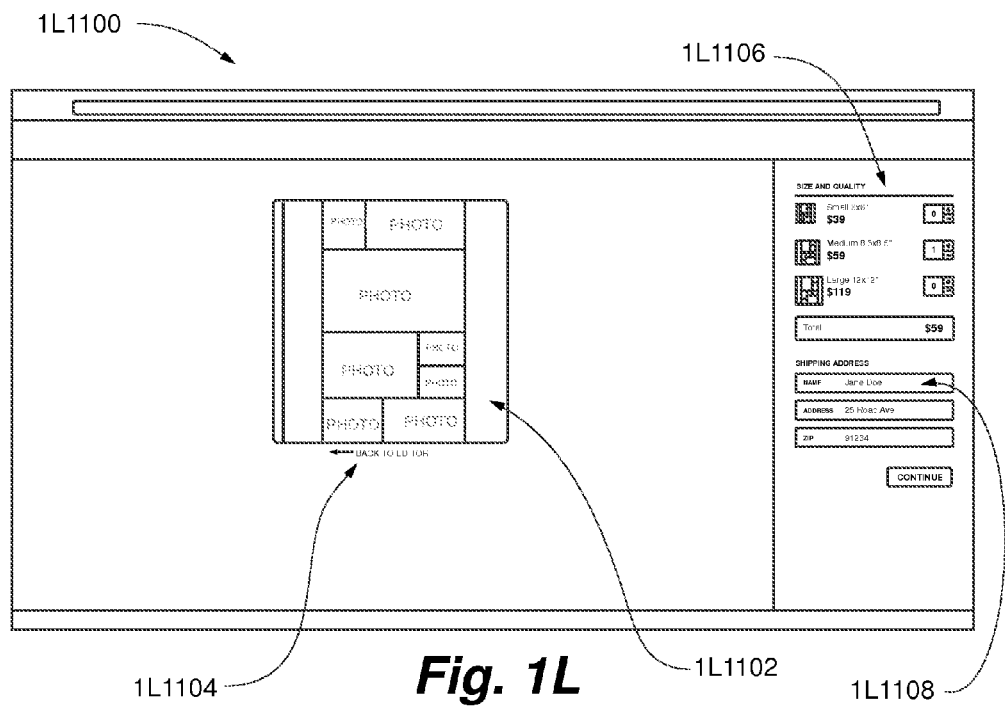
FIG. 1L is a diagram showing a method of ordering a photobook, according to said embodiment of the invention.

FIG. 1L is a screenshot embodiment 1L1100 showing a method of ordering a project or photobook. Once a photobook 1L1102 is customized and ready to order, a user can select a specification of the project to order. If the user is not happy with the customization of the photobook 1L1102, the user can go back to the editor or workspace by clicking 1L1104 to further edit/customize the pages of the photobook. A specification may be a size or dimension of the photobook. A sample specification of the project by size or dimension is shown at 1L1106. Each specification may have a different price for order. When the user agrees to a price, the user can enter a shipping address as shown at 1L1108. The user can further continue with payment options and order a printed photobook. A standard payment processing gateway maybe implemented in the present invention to order a printed copy of the photobook.

Mosaic Embodiments

Figure 1M:
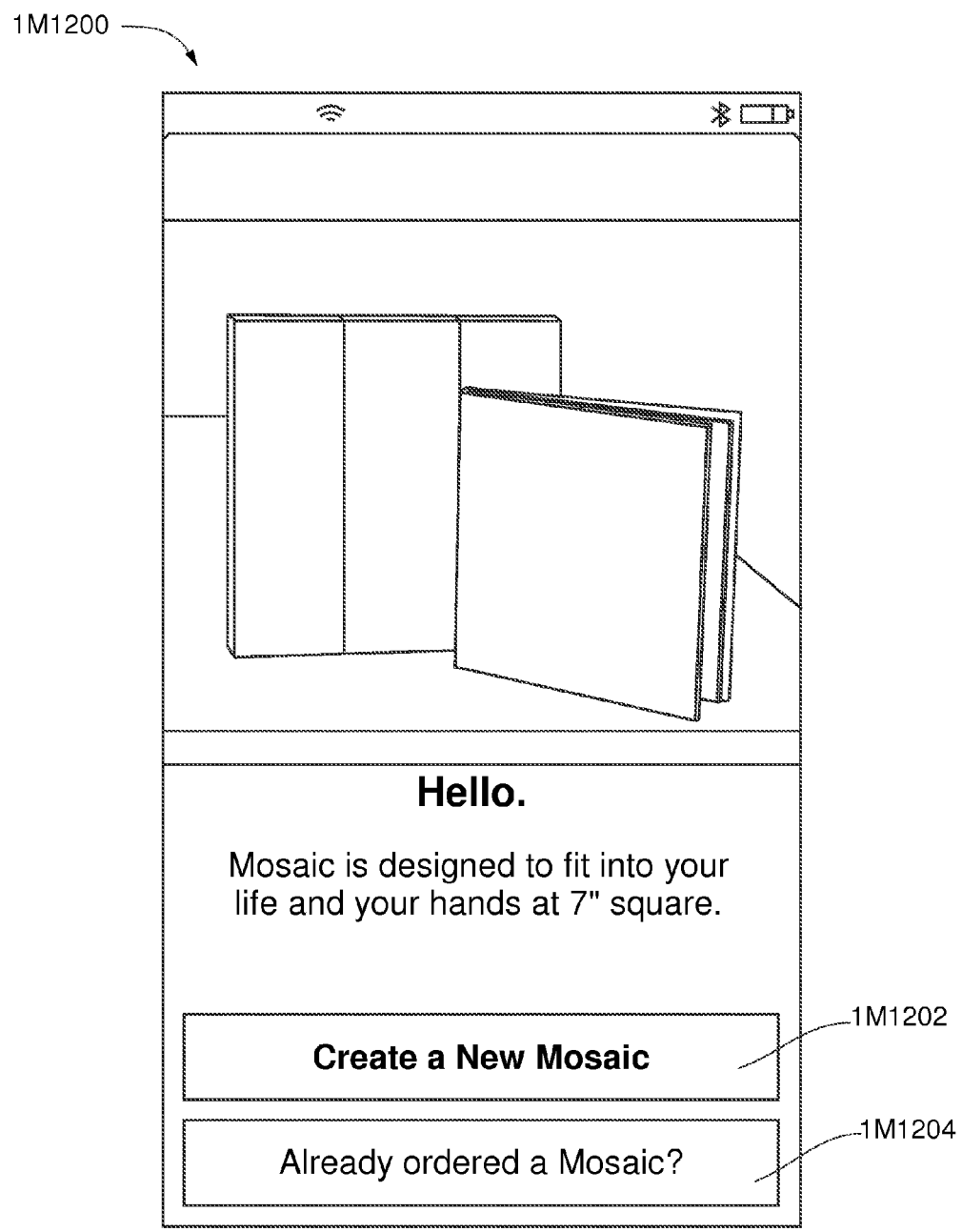
FIG. 1M is a diagram showing a mobile embodiment of a login screen of the present invention, according to another embodiment of the present invention (this embodiment sometimes known as "MOSAIC").

FIG. 1M is a screenshot embodiment 1M1200 showing a log-in screen at a handheld device or mobile device, such as, a smartphone (this embodiment is sometimes known as "MOSAIC"). A user can create a new user account by clicking a button 1M1202. An existing user can log-in to create a new project by clicking a button 1M1204. In the embodiment 1M1200, the word MOSAIC is a trademark name of an embodiment of the present invention, but not a functional name to describe a method or process.

Figure 1N:
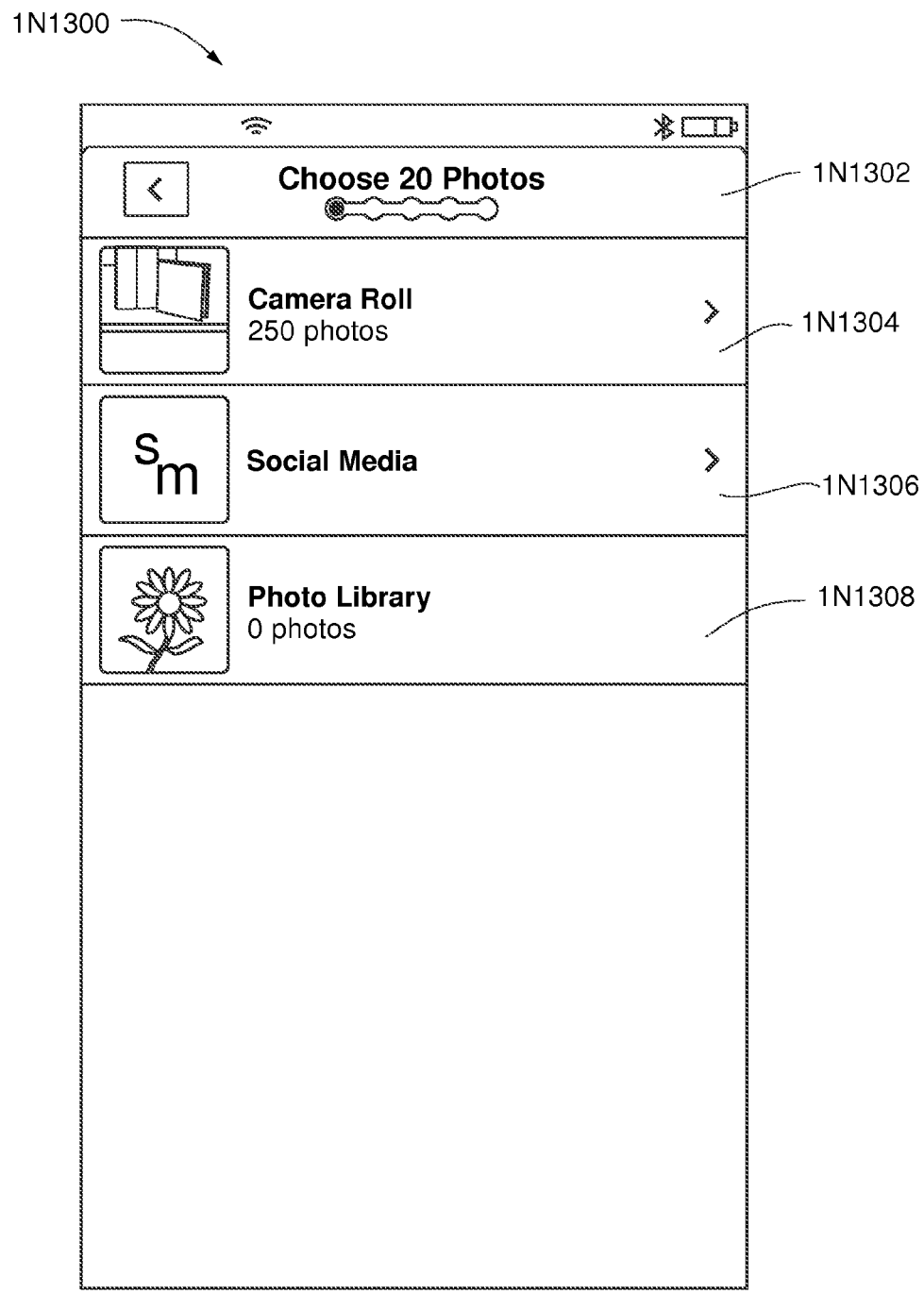
FIG. 1N is a diagram showing a method of media file selection at a mobile device, according to said embodiment of the invention.

FIG. 1N is a screenshot embodiment 1N1300 showing a method of selecting image files from multiple sources at a handheld or mobile device for creating a project. A method of selection 1N1302 shows a listing of sources where media files may be located. Image files or media files may be selected from a folder camera roll 1N1304, from a social media 1N1306, or from a photo library 1N1308. Camera roll 1N1304 is a file folder where images taken by a camera of the mobile device are stored. Social media 1N1306 comprises outside websites where image or media files are stored, such as, but not limited to, FACEBOOK, TWITTER, and LINKEDIN. Photo library 1N1308 is a file folder where the user can store image files at the mobile device.

Figure 1P:
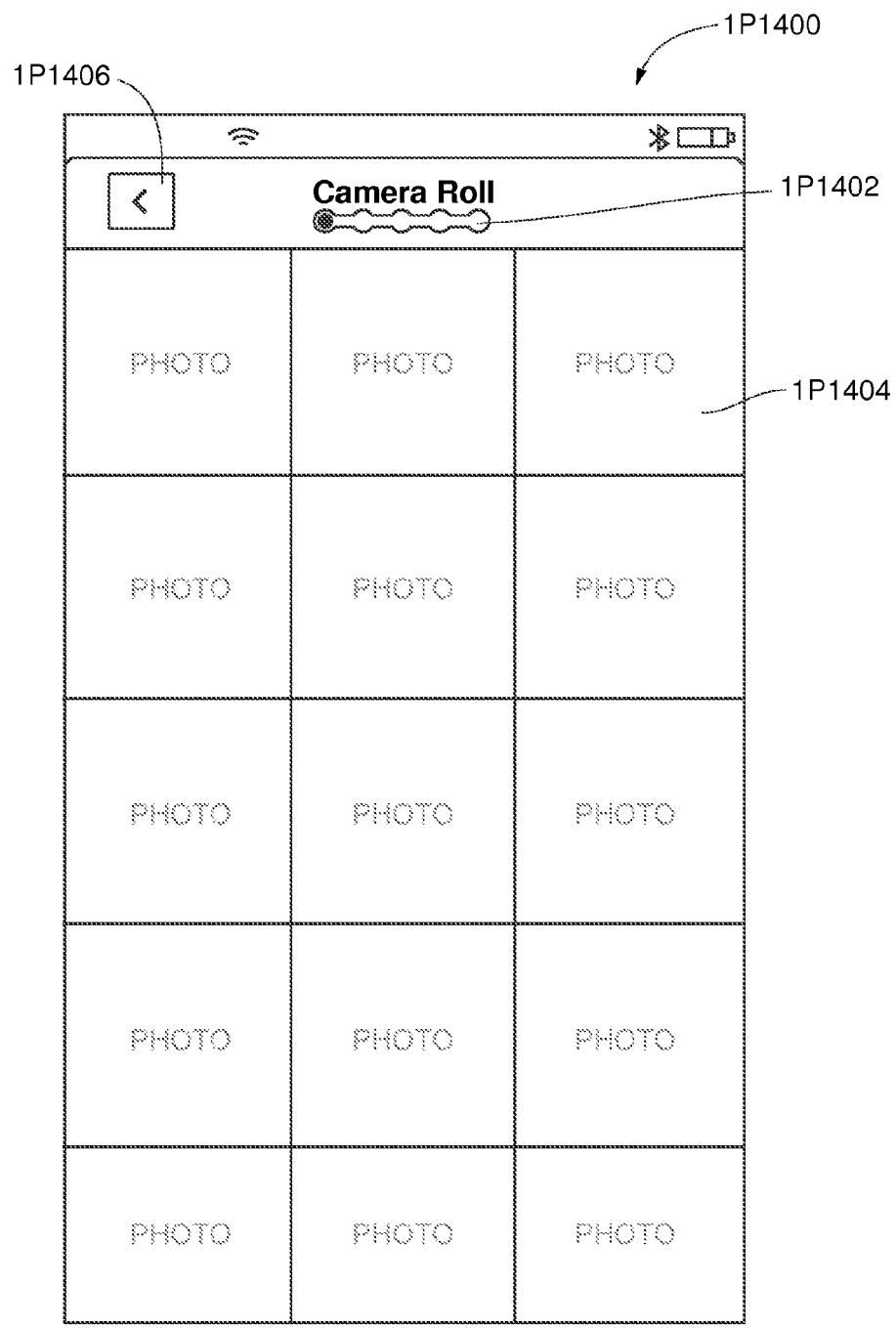
FIG. 1P is a diagram showing a preview of images at a mobile device, according to said embodiment of the invention.

FIG. 1P is a screenshot embodiment 1P1400 showing a preview of an image file folder at a mobile device. The folder 1P1402 with an exemplary name of camera roll, when selected by a user, the mobile device will show a preview of all images stored in the folder. An image 1P1404 is a preview of an original image. The user can go back to a different file folder at the mobile device by clicking or pressing a back button 1P1406.

Figure 1Q:
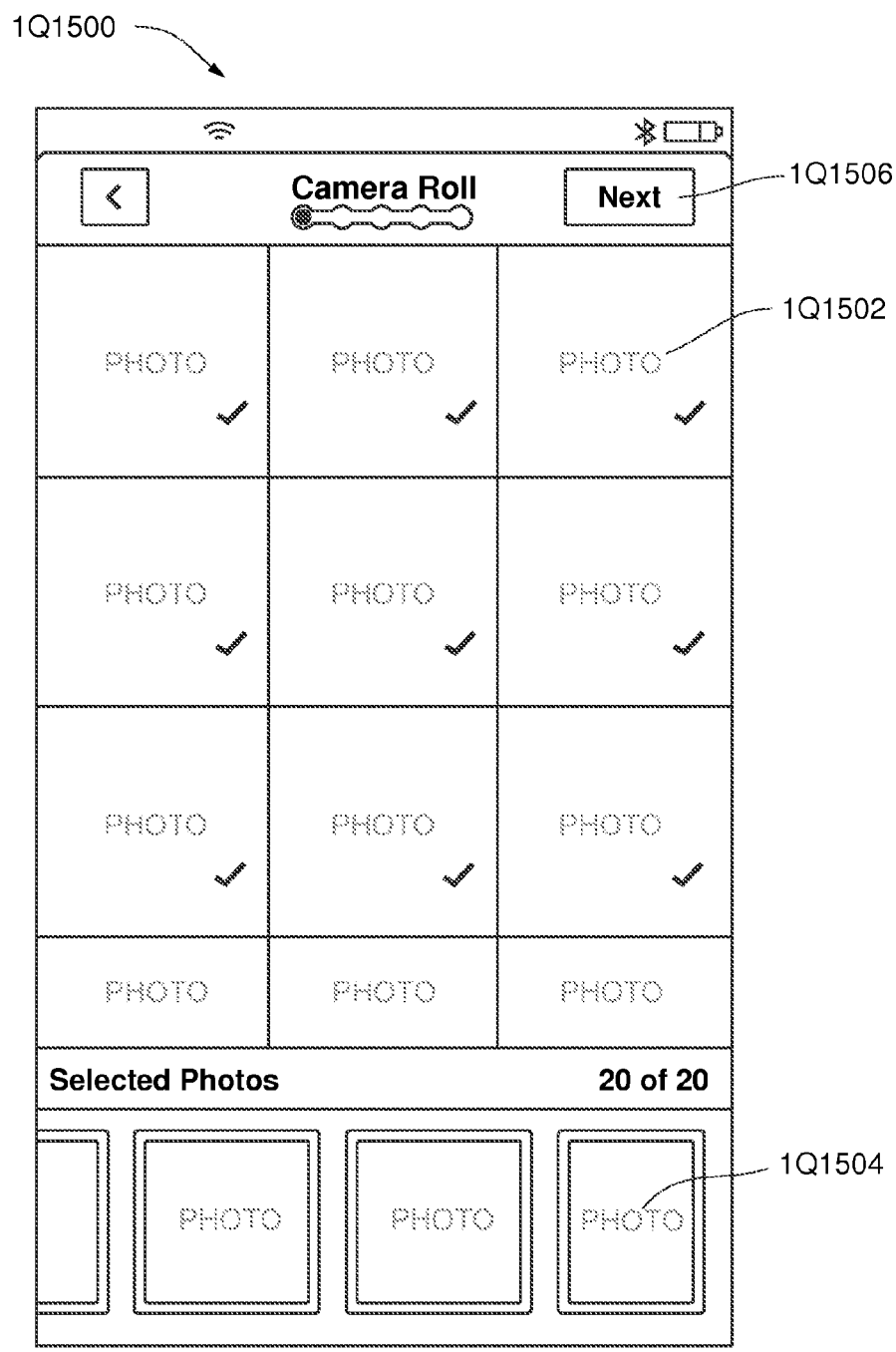
FIG. 1Q is a diagram showing image selection at a mobile device, according to said embodiment of the invention.

FIG. 1Q is a screenshot embodiment 1Q1500 showing images selected by a user at a mobile device. An image 1Q1502 may be selected by the user by touching, pressing, or clicking the image 1Q1502. Once the image 1Q1502 is selected, the selection is confirmed by a check mark as shown within the image 1Q1502. A preview 1Q1504 of the selected image is generated once the image is selected. Once images are selected for building a project, the user can press a next button 1Q1506 to build the project.

Figure 1R:
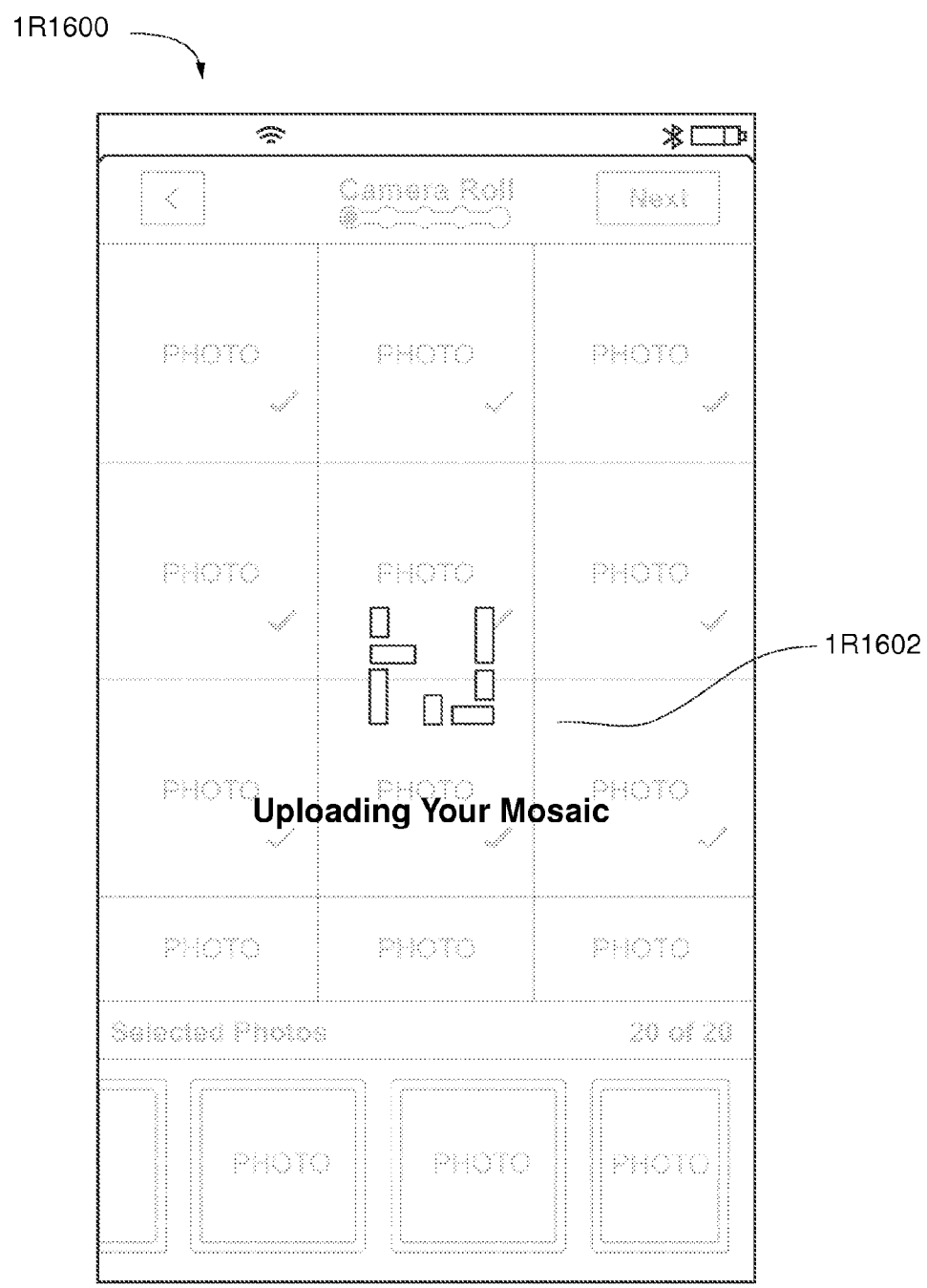
FIG. 1R is a diagram showing a method of uploading media files at a mobile device, according to said embodiment of the invention.

FIG. 1R is a screenshot embodiment 1R1600 showing an uploading process of images at a mobile device. Once images are selected for an upload, as shown by the method in the embodiment 1Q1500, the mobile device uploads the images to a server. While the images are uploading to the server, the mobile device displays the message 1R1602 in a form of graph or text showing that image uploading is in progress.

Figure 1S:
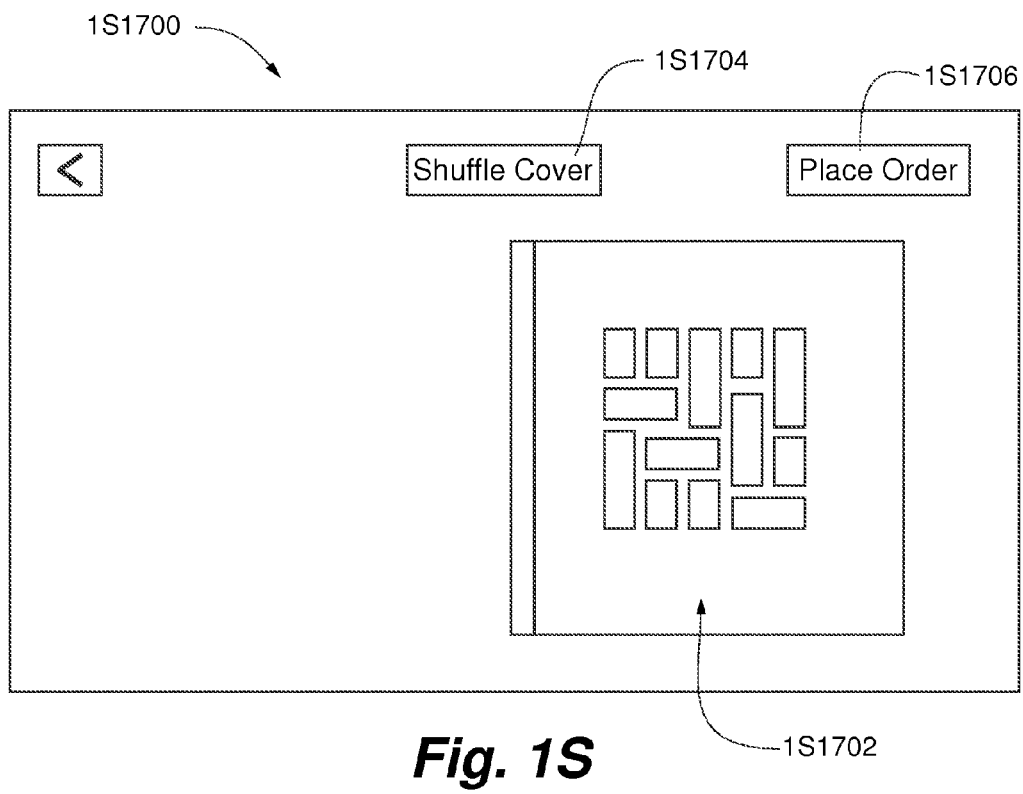
FIG. 1S is a diagram showing a completed project at a mobile device, according to said embodiment of the invention.

FIG. 1S is a screenshot embodiment 1S1700 showing a completed project at a mobile device. After images are uploaded to the server, as shown by the embodiment 1R1600, the server populates a design of a photobook 151702. The user can shuffle images in the design by using a shuffle button 151704. Further, the server populates a design of every page of the photobook 151702. The user can customize every page of the photobook 151702 by using image editing tools provided by the present invention. Image editing tools are provided by the user-device or the server. Image editing is also performed by the server as a part of image analysis. After the customization is complete, the user can proceed to order the photobook by pressing a button place order 151706.

Figure 1T:
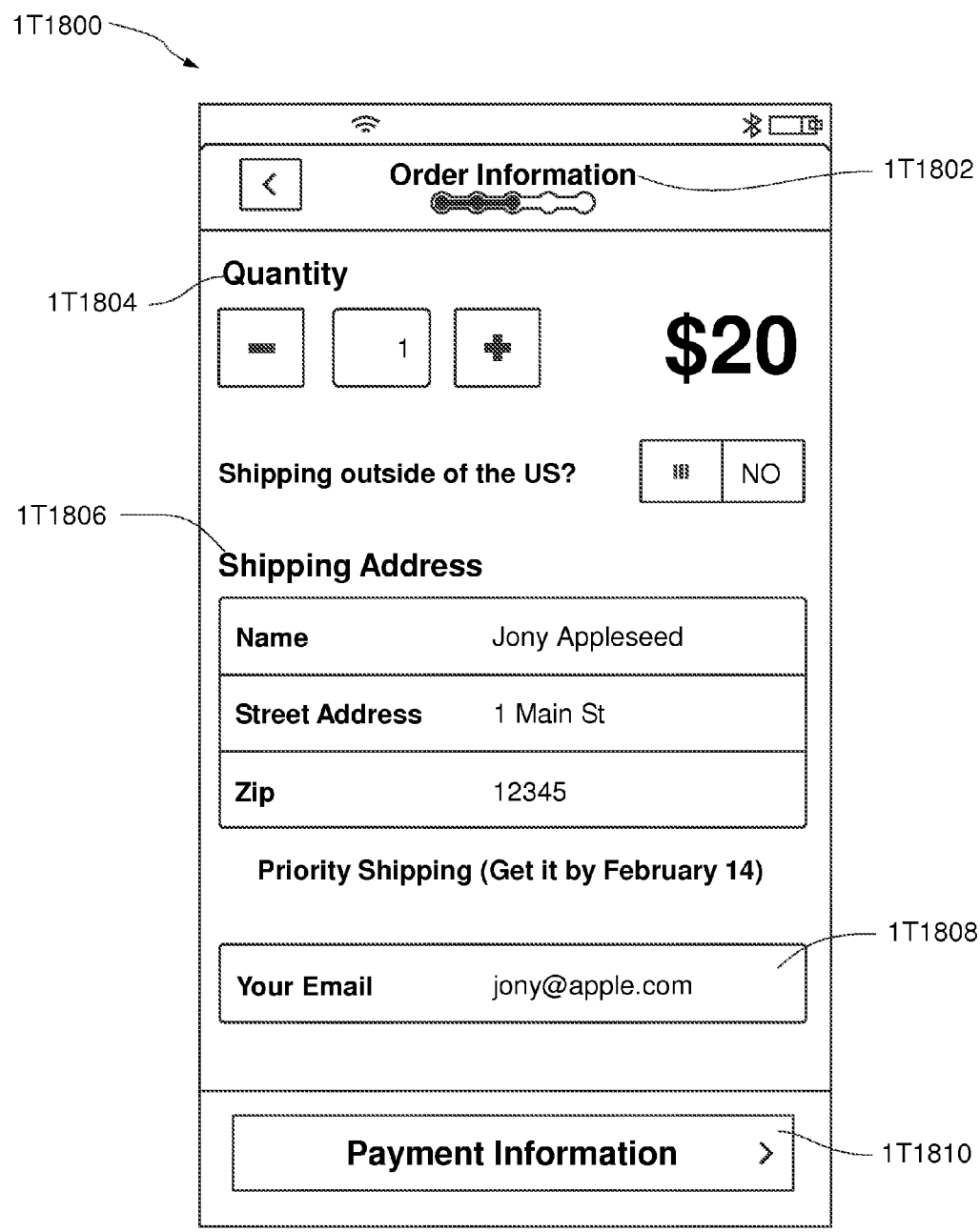
FIG. 1T is a diagram showing a method of ordering a media-based project at a mobile device, according to said embodiment of the invention.

FIG. 1T is a screenshot embodiment 1T1800 showing a method of ordering a project (photobook or book) at a mobile device. Once a user completes a customization of a photobook, an order information 1T1802 is displayed at the mobile device. The user can specify a quantity of the order at the quantity area 1T804. A price information is also included with the quantity information. The user can enter a shipping address in the area 1T1806, and an email address in the area 1T1808. The user continues a processing of payment for the order by pressing a button payment information 1T1810. The button payment information 1T1810 directs the user to a payment processing gateway to complete the order.

Figure 1U:
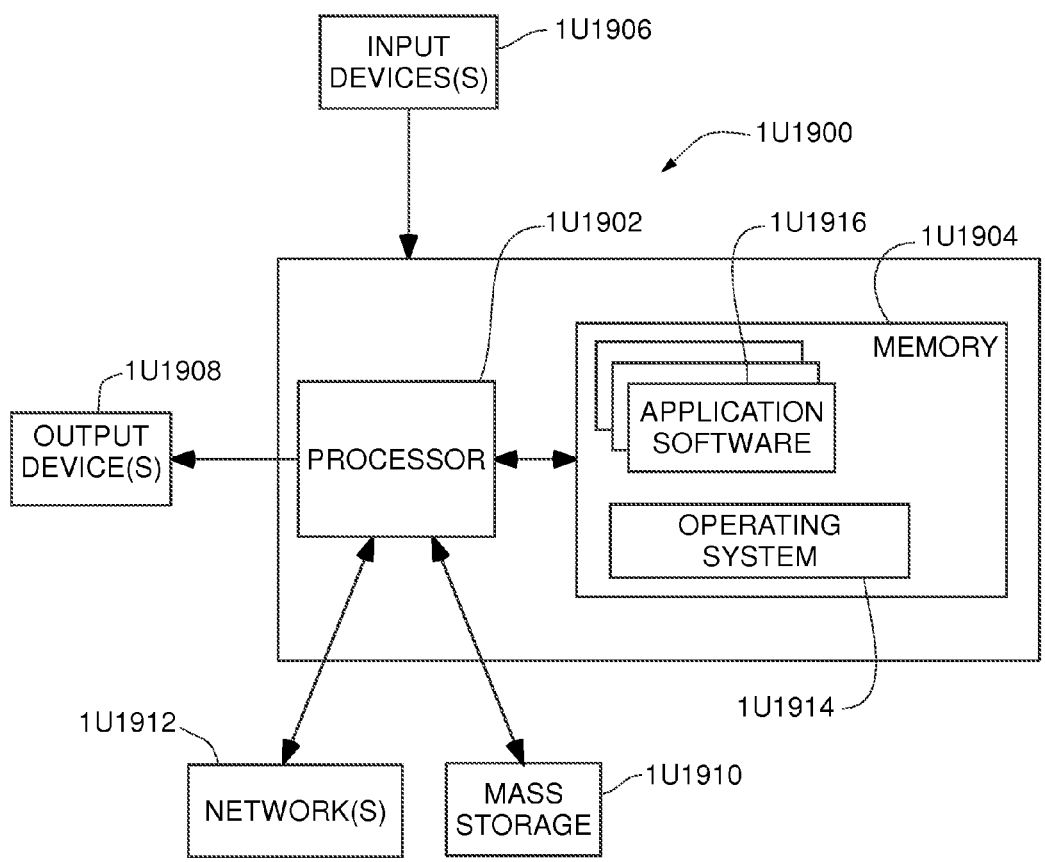
FIG. 1U is a schematic diagram of a user-device, within which the invention may be embodied, according to one embodiment of the invention.

FIG. 1U is an embodiment of a user-device wherein the invention may be practiced. A user-device comprises a processor 1U1902, an operating system 1U1914, an application software 1U1916, a memory 1U1904, at least one input device 1U1906, at least one output device 1U1908, a mass storage device 1U1910, and a network 1U1912. The network 1U1912 comprises a wired or wireless network to communicate to remote servers and databases via the Internet.

Figure 1V:
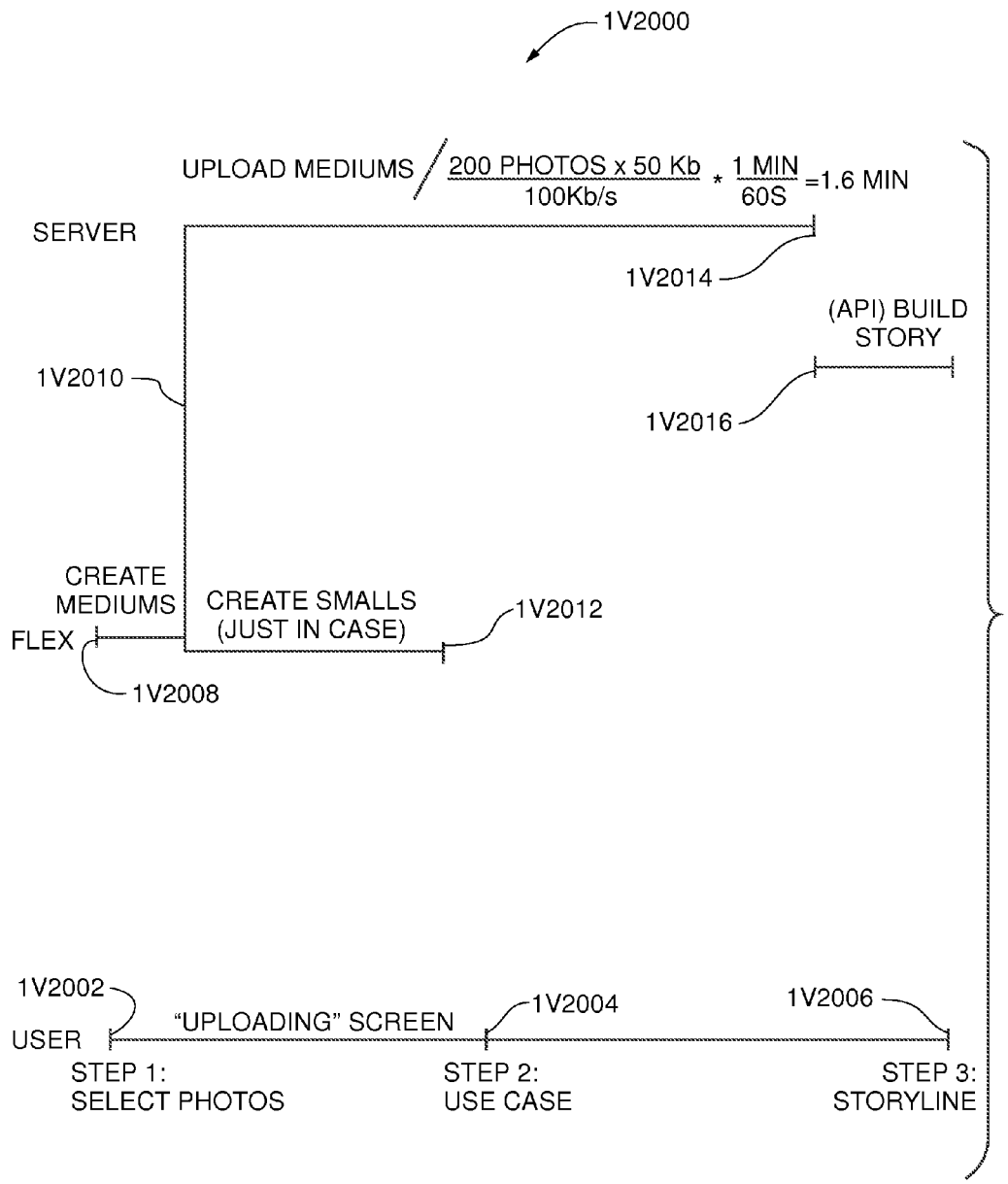
FIG. 1V is a timing diagram showing a timeline of image uploading, according to one embodiment of the invention.

FIG. 1V is a timing diagram 1V2000 showing a method of background uploading of media files. Steps in the embodiment 1V2000 are shown using timelines or progress bars. A user at step 1V2002 selects original photos or images for an upload. Once photos are selected, an uploading screen appears acknowledging the user that the upload is in progress. At step 1V2004, a use case is created to build a project. The use case is created by a server after performing a server-side image analysis. At step 1V2006, the user can further customize the project by adding a storyline or narrative of the project. A person of ordinary skill in the art of image uploading and editing can implement FLEX technology at step 1V2008. FLEX comprises photo resizing libraries. In one embodiment, once original photos are selected, FLEX creates medium sized photos by resizing the original photos. However, FLEX may also create small sized photos from the original photos. Both the medium sized photos and the small sized photos are uploaded to the server at the step 1V2010. An upload of small sized photos completes at step 1V2012. An upload of the medium sized photos completes at step 1V2014. The small sized photos are uploaded faster than the medium sized photos. Once the upload of medium sized photos completes, at step 1V2016 the FLEX API builds a story or use case. Once a use case or story (by grouping of similar photos) are built, the user can add a storyline or narrative to the project. FLEX and the FLEX API are an exemplary technology that maybe used to implement the embodiment 1V2000 of the present invention. The methods of the present invention are not restrictive to FLEX and the FLEX API.

A use case may be built by feature or object identification of images, geo-location data, and meta-data. For example, when a plurality of images are selected by a user for building a book, images are grouped together by similarity of objects or features. For example, wedding pictures may be grouped together from a plurality of random pictures by identifying the features of wedding, such as a wedding cake or an altar. Facial recognition is another example of feature or object identification that allows a formation of a use case or grouping of pictures together by facial similarity. A use case of a book can allow the program to better prepare a template for the book, for example, a wedding book.

Mixbook Embodiments

Figure 1W:
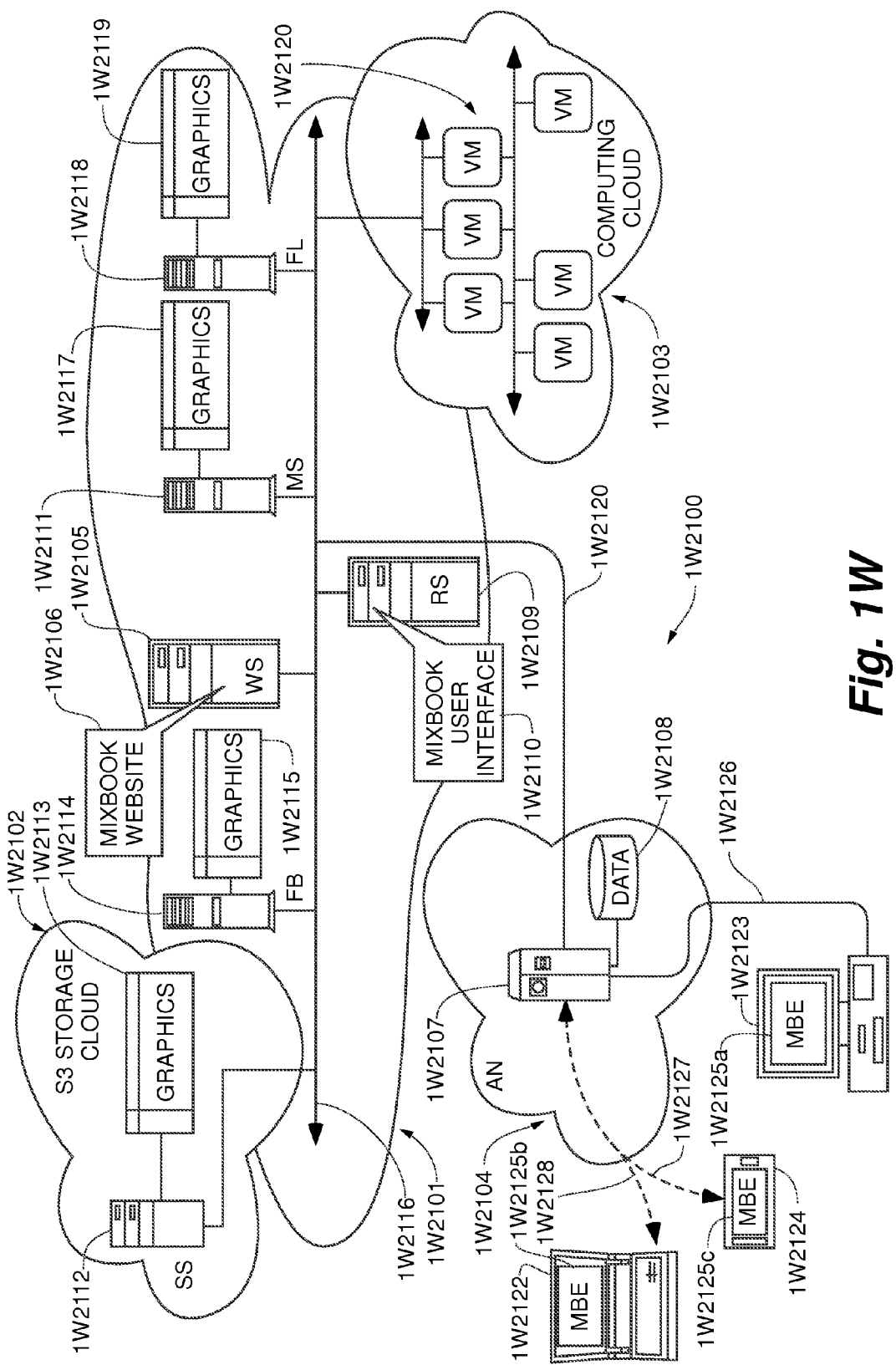
FIG. 1W is an architectural overview of a communications network supporting network-based graphics manipulation and production of media-based products, according to other embodiments of the present invention (these embodiments sometimes known as "MIXBOOK").

FIG. 1W is an architectural overview of a communications network 1W2100 supporting network-based graphics manipulation, and production of media-based products according to embodiments of the present invention (these embodiments sometimes known as "MIXBOOK"). Communications network 1W2100 includes a wide-area-network (WAN). WAN 1W2101 may be a private, corporate, or publicly-accessible data network. WAN 1W2101 may be referred to as the Internet 1W2101. The Internet 1W2101 is further illustrated by way of a network backbone 1W2116, which represents all of the lines, equipment, and access points that make up the World Wide Web (WWW) as a whole including any connected sub-networks. Therefore, there are no geographic limits to practice of the present invention.

The Internet backbone 1W2116 supports a web server (WS) 1W2105. It is noted herein that all network-capable computing appliances such as physical computers, servers, and other computing machines discussed in this specification shall be assumed to contain, be coupled to, or otherwise have accessible thereto, one or more digital mediums adapted to contain the data and software required to support and enable the primary function or functions (in the case of multi-task machines) of the computing appliance.

WS 1W2105 is an electronic information server connected to the Internet 1W2101 and adapted to server information pages or web pages as they are known in the art. WS 1W2105 may be maintained by a third party that provides a website hosting service. In one embodiment a service provider providing the service of the present invention owns and maintains WS 1W2105. WS 1W2105 hosts a website 1W2106, through which, users may access elements of the present invention. Website 1W2106 is adapted to provide authenticated access to users who create, publish, print, and purchase media-based products such as photo-books, photo-cards, photo-calendars, photo-posters, video-books, video-calendars, video-cards, and related products.

Communications network 1W2100 also includes an access network (AN) 1W2104, which may represent any data network adapted to provide access to the Internet network 1W2101. AN 1W2104 may be a public-switched-telephone-network (PSTN) or some other public or private telephony network. AN 1W2104 may be a local wireless network, a cellular time division multiple access (CDMA) network, a wireless fidelity (WiFi) network, or any other candidate access network through which one may access the Internet 1W2101.

A user may access WS 1W2105, more particularly MIXBOOK website 1W2106, through the Internet access facility 1W2107 in access network (AN) 1W2104 and an Internet access line 1W2120. The Internet access facility 1W2107 may be maintained and operated by an Internet service provider (ISP) or by a wireless Internet service provider (WISP), whichever is appropriate for any particular Internet connection. Users who might access WS 1W2105 are represented herein as network-capable computing appliances, more particularly, a laptop computer 1W2122, a desktop computer 1W2123, and a smart telephone 1W2124. Each mentioned appliance may be assumed to be Internet-capable by way of one or more network browsing applications residing thereon and executable there from.

Desktop computer 1W2123 is connected to an Internet-connection server 1W2107 by way of an Internet access line 1W2126. Desktop computer 1W2123, once connected, may access website 1W2106 hosted on WS 1W2105. Desktop computer 1W2123 has one or more input devices (not illustrated) coupled thereto such as a keyboard, a mouse, and a microphone for (Speech-to-Text Commands). Smart phone 1W2124 may connect wirelessly via a wireless link 1W2127 to an Internet service provider (also represented by machine 1W2107) that establishes a wireless Internet connection like public WiFi for example. Smart phone 1W2124 may or may not include a keyboard input device. In one embodiment smartphone 1W2124 has a touch-screen display. Laptop 1W2122 is illustrated as connected wirelessly to the Internet 1W2101 via WISP 1W2107 using wireless link 1W2128. Laptop 1W2122 includes a keyboard and/or other input devices as may be appropriate.

Laptop 1W2122, desktop 1W2123, and smartphone 1W2124 each include an Internet browser application (not illustrated) for accessing and navigating network 1W2101. Backbone 1W2116 supports a runtime server (RS) 1W2109 adapted to host a MIXBOOK user-interface 1W2110. User interface 1W2110 is accessible to all website visitors for the purpose of creating, manipulating, and printing media-based products such as a photo collage book, for example. Users accessing website 1W2106 who are ready to create a product may be re-directed to RS 1W2109.

Each user authorized to create and publish a media-based product using the site may receive a small download containing a compact editing package known as the MIXBOOK editor ("MBE") in some embodiments. MBE 1W2125a is installed as a browser-based extension or plug-in in one embodiment on desktop computer 1W2123. Laptop 1W2122 has an instance of MBE 1W2125b installed as a browser-based extension or plug-in. Smartphone 1W2124 has an instance of MBE 1W2125c installed as a browser-based extension or plug-in. An instance of MBE may be customized for any computing appliance that may access the Internet and through which a user may see and edit content. Therefore, MBE instances 1W2125 (a-c), though the same basic extension or plug-in, may contain differences based on host requirements. In one embodiment of the present invention there are no software downloads required in order to practice the present invention. In this case the MIXBOOK editing SW may be server hosted only. In another embodiment, the MIXBOOK editing SW may be ported to a desktop application such as ADOBE AIR and thus be operated as a desktop application. In one embodiment the SW is included as an add-on feature to any suitable desktop application and may be installed on a computing host with that desktop application from a removable medium such as a CD ROM, for example.

Service provider facility 1W2107 includes a connected data repository 1W2108. Data repository 1W2108 contains all of the customer contact and billing information for the Internet service provider. One with skill in the art will appreciate many possible internet connection schemes. It is preferred in most embodiments that users have a high speed Internet connection for the purpose of manipulating and editing graphics, which can be bandwidth intensive. The inventors provide one or more innovative solutions for saving bandwidth while editing images and image products online making the entire experience more efficient and easier for users practicing the invention.

The MIXBOOK website 1W2106 establishes a community-based portal and social interaction site that revolves around creating, editing, sharing publishing, printing, and purchasing media-based products created online by one or more user working in collaboration together. Users such as those operating appliances 1W2122-1W2124 connect online and navigate to WS 1W2105 to access website 1W2106. When any user determines to create a media-based product like a photo album, for example, the user is directed to an appropriate portal server like RS 1W2109 hosting MIXBOOK user interface (UI) 1W2110. UI 1W2110 is adapted to provide all of the assets needed to create and publish complete image and/or text-based products. Media-based products created through website 1W2106 include products containing images uploaded by one or more authorized users. Any work in progress or completed is termed a project. A project may be initiated by one user whereby other users are then invited by the initiating to join the creative experience in collaboration, and those users may contribute their own photos to the project. Such a project may be published for viewing by all or some of the community. Finished projects may be printed and distributed as "hard products" available for purchase by members of the community.

In one embodiment, a persistent storage of graphics uploaded by community members to be included into projects is obtained (leased) through a third-party storage provider. In this example, a simple storage service (S3) data storage cloud 1W2102 is illustrated and made available for use by a third-party service provider such as AMAZON. A storage server 1W2112 is illustrated within S3 cloud 1W2102 and has connection to the Internet backbone 1W2116. SS 1W2112 may be one of many servers including associated mass data repositories connected to SS 1W2112 such as repository 1W2113 contained within storage cloud 1W2102. In this logical representation all of the graphics (images or photos) that are uploaded to insert into projects are stored in a repository such as repository 1W2113 in storage cloud 1W2102. Repository 1W2113 may be an optical, magnetic, or some other type of data storage facility. In one embodiment, mass computations required for real-time and transparent editing and collaborating on multiple projects are performed by virtual machine instances 1W2120 in a computing cloud 1W2103. In another embodiment, the service host may maintain one or more powerful computing machines and storage devices for performing computations and for storing graphics for users of the service.

In use of the present invention a user operating one of computing appliances 1W2122-1W2124 connects online and accesses MIXBOOK website 1W2106 and logs into the site. If the user has already registered and created a project, a web page personalized to that user is served that includes all of that user's projects in the latest states of progress. The user may enter any project for which she or he has authorization to contribute to, and may review, edit, or otherwise work the project. Photos uploaded by the user to include into projects may be stored in cloud 1W2102 and served to the projects when needed by the system. Any computing such as editing, resizing, alterations, and so on may be handled in cloud 1W2103. A user may, through website 1W2106, authorize other users registered with the service of the invention to collaborate on a project initiated by that user. In one embodiment, a user having a project initiated may invite other potential users to the site so they may, with permissions, enter the site and collaborate with that user.

In one embodiment of the present invention, photos that are stored on the Internet can be represented in any online project provided the user has authorized access to those photos. For example, a user who has one or more accounts to third-party social interaction networks like FACEBOOK, MYSPACE, PHOTOBUCKET, FLICKR, or similar sites may use photos of registered friends that they are allowed to access in their own personal projects. These photos do not have to be uploaded to the service of the present invention. Rather, these photos can be accessed from their present storage locations anywhere on the Internet provided that the storage system is online.

The Internet backbone 1W2116 supports a FACEBOOK server (FB) 1W2114 coupled to a data repository 1W2115 for storing images and other graphics. The Internet backbone 1W2116 supports a MYSPACE server (MS) 1W2111 coupled to a data repository 1W2117 adapted to store images and other graphics. Backbone 1W2116 supports a FLICKR server (FL) 1W2118 coupled to a data repository 1W2119 adapted to store images and other graphics. Any of these images can be served to an active project by the respective servers directly from their storage locations. Any of these images that are altered during project work or collaboration may be subsequently saved to third-party S3 storage cloud 1W2102 in repository 1W2113 controlled by SS 1W2112.

In one embodiment of the present invention, MIXBOOK website 1W2106 includes or has working access to a SW print engine (not illustrated here) that is adapted to render any MIXBOOK project for professional printing. In one embodiment, printing is performed by a third-party provider who may also ship and/or distribute finished products for a price. In one embodiment, a user may access the service through Website 1W2106 and may initiate and complete a project that will be printed for that user for a static price for that particular product.

It is noted herein that a project created on MIXBOOK may be efficiently gathered for print in virtually any print format. Likewise, content originally laid out in one format or aspect ratio may be efficiently converted to another layout before printing in an automated process that incorporates the typical size and layout changes necessary to convert from one layout to another automatically. Furthermore, content assembled for a particular layout and product type may be automatically converted for print output in another layout and product type.

The disclosed embodiments improve upon the problems with the prior art by providing a system that allows for quick and easy creation of media-based projects over a communications network. The disclosed embodiments leverage the reduced costs of processing units in most servers and computers to provide various functions over a communications network to automate, either fully or partially, the process of creating a media-based project over the Internet. The disclosed embodiments automate the processes normally undertaken by users creating photo-based projects online, such as sorting through photos, removing the photos that are not adequate or properly focused, choosing the correct photos, grouping photos together by topic or location, ordering the photos by chronological order, and cropping or focusing photos on the relevant portions of the photos. Thus the disclosed embodiments reduce the amount of time required by users to create a photo-based project. Further, the disclosed embodiments automate the corrections or modifications normally performed by users creating photo-based projects, such as correctly orienting photos, re-coloring photos or performing a color correction on the photos, removing red-eye from the eyes of photo subjects, and correcting the photos for brightness or contrast. This eliminates the requirement that the user must open a special program or app to perform the correction or modification, thereby removing the time-consuming and frustrating nature of these steps when performed manually. The disclosed embodiments are further beneficial because, due to their time-saving nature, they reduce the number of users that drop off or discontinue the photo-book creation process before completing a purchase.

Auto-Creation of Projects Utilizing Use Case Data

Figure 2A:
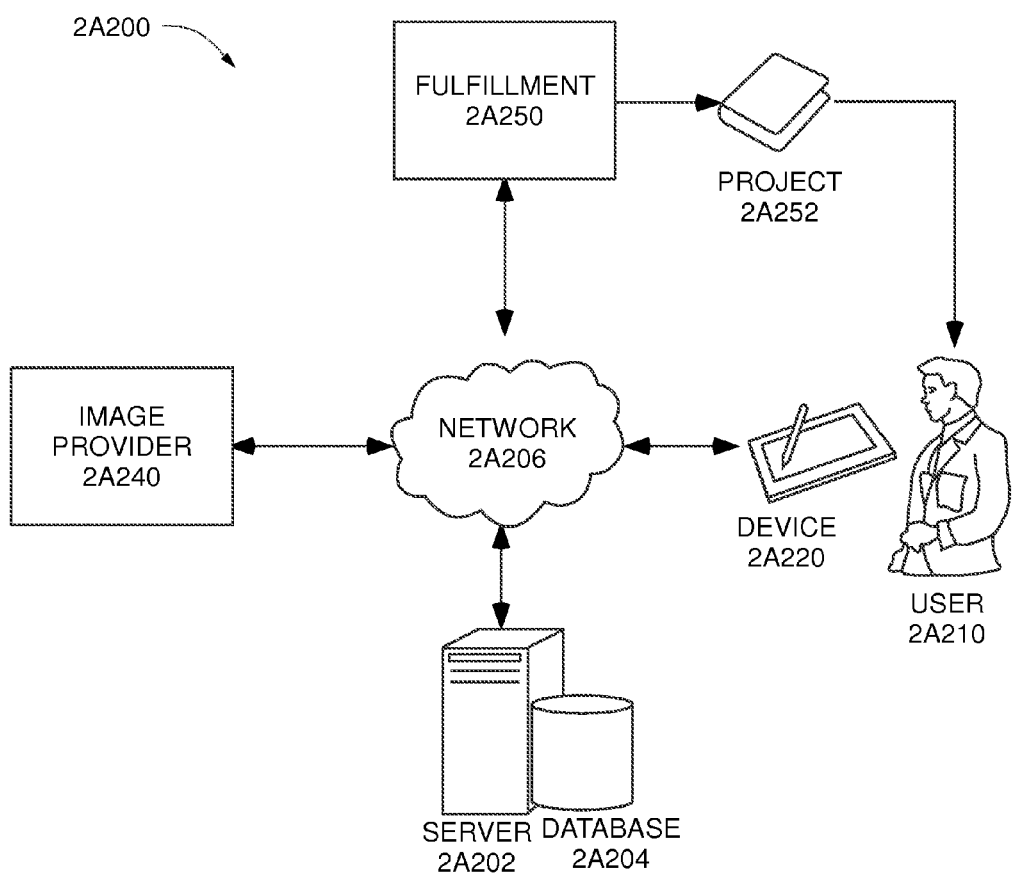
FIG. 2A is a block diagram illustrating a network architecture of a system for facilitating a creation of photo-based projects over a communications network, in accordance with one embodiment of the present invention.

FIG. 2A shows an illustration of a block diagram showing a network architecture of a system 2A200 and method for facilitating the creation of photo-based projects over a communications network in accordance with one embodiment. FIG. 2A shows various components coupled with network 2A206, which can be a circuit switched network, such as the Public Service Telephone Network (PSTN), or a packet switched network, such as the Internet or the World Wide Web, the global telephone network, a cellular network, a mobile communications network, or any combination of the above. A prominent element of FIG. 2A is the server 2A202 associated with a data repository or server-side database 2A204 and further coupled with network 2A206. Server 2A202 collects, processes and manages data from the users 2A210 and further manages the server-side database 2A204, which holds the master copy of data that is served to fulfillment entity 2A250 and client device 2A220. FIG. 2A further includes user 2A210 and his or her client computing device 2A220, which may be a desktop computer, a common computer terminal, or mobile computing devices such as smart phones, mobile phones, tablet computers, handheld computers, laptops, or the like.

FIG. 2A shows an embodiment of the present invention wherein networked client computing device 2A220 interacts with server 2A202 and server-side database 2A204 over the network 2A206. Server 2A202 may comprise one or more servers, workstations, desktop computers, computer terminals, workstations, mainframes, mobile computing devices, smart phones, mobile phones, handheld computers, laptops, or the like. Server 2A202 and client computing device 2A220 include program logic comprising computer source code, scripting language code, or interpreted language code that may be compiled to produce an executable file or computer instructions, or that may be interpreted at run-time, wherein the computer source code performs various functions of the present invention. Server 2A202 may include a software engine that executes applications as well as delivers applications, data, program code, and other information to networked computing devices, such as device 2A220. FIG. 2A further shows a database or repository 2A204, which may be a relational database comprising a Structured Query Language (SQL) database stored in a SQL server. The repository 2A204 serves data from a database, which is a repository for data used by server 2A202 and device 2A220 during the course of operation of the invention. Database 2A204 may be distributed over one or more nodes or locations that are connected via network 2A206. The database 2A204 may include user account records, user records, and multimedia records that include images, video, audio and like.

It should be noted that although FIG. 2A shows only one server 2A202, one database 2A204, one client device 2A220, and customer 2A210, the system of the present invention supports any number of servers, databases, client devices, and customers connected via network 2A206. Also note that server 2A202 is shown as a single and independent entity; in one embodiment, the functions of server 2A202 may be integrated with another entity, such as one image provider 2A240, fulfillment entity 2A250, device 2A220, and/or the database 2A204. Further, server 2A202 and its functionality, according to a preferred embodiment, can be realized in a centralized fashion in one computer system or in a distributed fashion wherein different elements are spread across several interconnected computer systems.

FIG. 2A further shows fulfillment party 2A250, which performs product fulfillment or order fulfillment services, i.e., the process of fulfilling the obligation of server 2A202 (or the entity represented by server 2A202) to send user 2A210 one or more photo-based project products 2A252 that the customer has ordered, purchased, or requested from the server 2A202 (or the entity represented by server 2A202). Fulfillment party 2A250 may receive orders for the photo-based project products, print the photo-based project products, bind the photo-based project products, package the products, and then ship the ordered products 2A252 to the end customer, such as user 2A210. In the course of a transaction, the server 2A202 may interface with fulfillment party 2A250 to effectuate the delivery of purchased products to the customers after payment has been effectuated. Note that although fulfillment party 2A250 is shown as a single and independent entity, in one embodiment of the present invention, the functions of fulfillment party 2A250 may be integrated with another entity, such as server 2A202. Further, the functionality of fulfillment party 2A250 may be realized in a centralized fashion in one computer system or in a distributed fashion wherein different elements are spread across several interconnected computer systems.

Figure 2B:
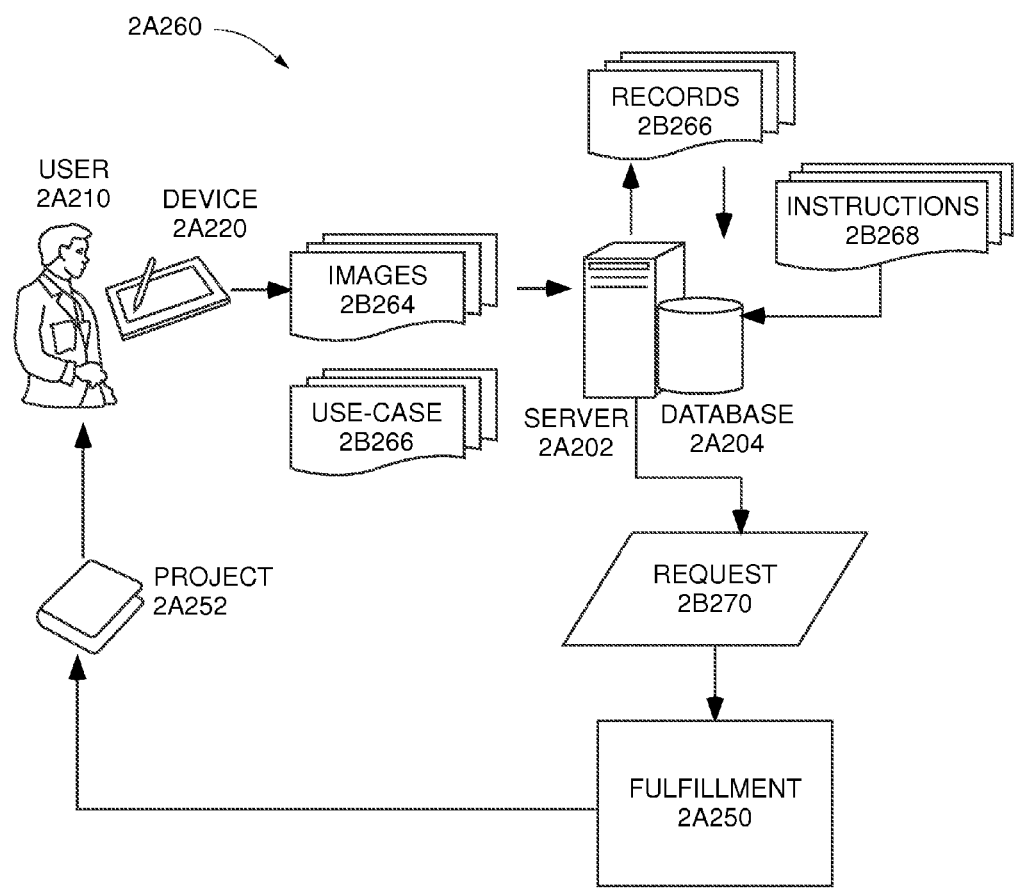
FIG. 2B is a block diagram illustrating a data flow of the system for facilitating the creation of photo-based projects over a communications network, in accordance with one embodiment of the present invention.
Figure 2C:
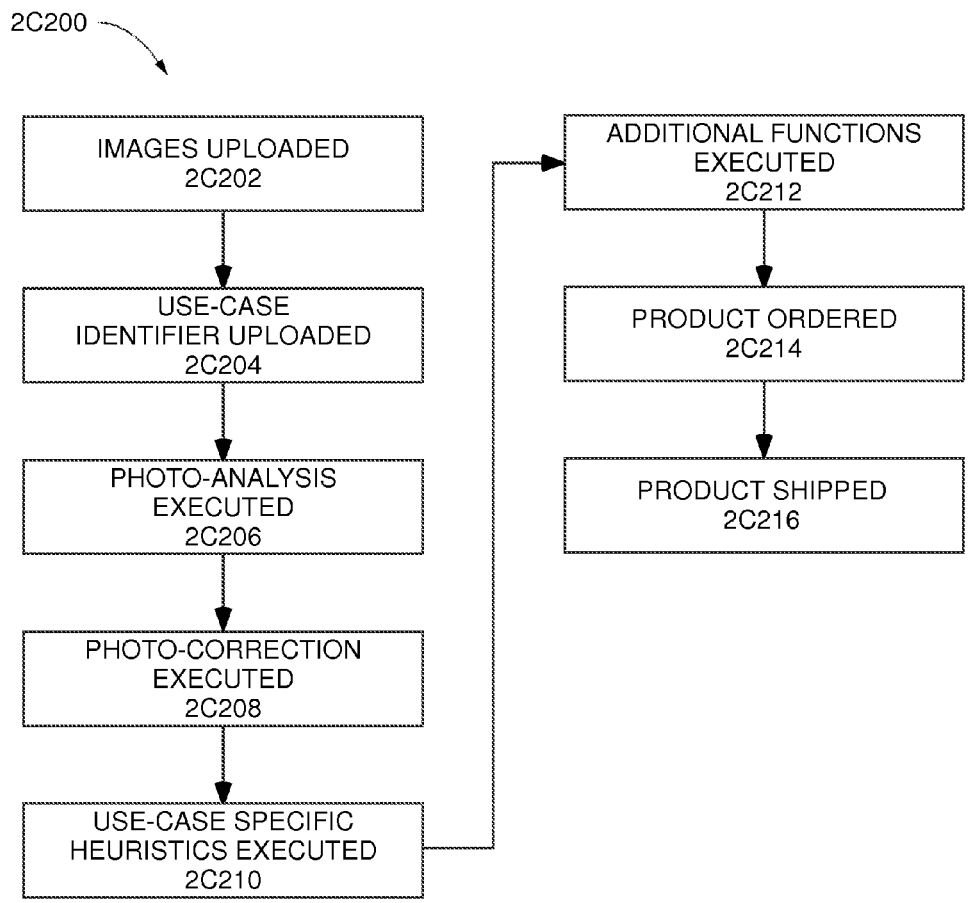
FIG. 2C is a flowchart depicting a general control flow of the process for facilitating access to a large data store over a communications network, according to an embodiment of the present invention.

FIGS. 2B to 2C depict, among other things, the data flow (2A260) and control flow (2C200) in the process for facilitating the creation of photo-based projects over a communications network 2A206, according to one embodiment. The process 2C200 of the disclosed embodiments begins with step 2C202, wherein the user 2A210 provides, via his or her device 2A220 over the network 2A206, at least a plurality of images or photos 2B264 to the server 2A202 for storage in the database 2A204. In one embodiment, the images or photos 2B264 are provided to server 2A202 via a graphical user interface executing on the device 2A220. In another embodiment, the images or photos 2B264 are provided to server 2A202 for storage in the database 2A204 via TCP/IP and/or HTTP over network 2A206. Subsequently, server 2A202 stores the images or photos 2B264 in the database 2A204 as records 2B266. In one embodiment, the records 2B266 are stored in association with an identity for user 2A210 or in association with a user record for user 2A210.

Next, in step 2C204, the user 2A210 provides, via his device 2A220 over the network 2A206, a use-case identifier 2B266 to the server 2A202 for storage in the database 2A204. In one embodiment, the use-case identifier 2B266 is provided to server 2A202 via a graphical user interface executing on the device 2A220. In another embodiment, the use-case identifier 2B266 is provided to server 2A202 for storage in the database 2A204 via TCP/IP and/or HTTP over network 2A206. Subsequently, server 2A202 stores the use-case identifier 2B266 in the database 2A204 in association with records 2B266. In one embodiment, the use-case identifier 2B266 is stored in association with an identity for user 2A210 or in association with a user record for user 2A210.

In the following step 2C206, various photo analysis processes may be executed on the images or photos 2B264 stored in the database 2A204 as records 2B266, at the direction of the user 2A210 via input provided via a graphical user interface executing on the device 2A220. The photo analysis processes comprise identifying similar images, identifying faces in the images, identifying objects in the images, identifying undesirable images, and identifying relevant portions of the images. The identification of faces and objects may be accomplished via object recognition and face recognition libraries. The identification of similar images may be accomplished via an analysis and comparison of color, focus, brightness, faces, objects and the like in each image, as described in greater detail below. The identification of undesirable images may be accomplished by identifying images that are out of focus or contain too little light for a proper exposure. For blurry photos, edge detection may be used to detect any sharp edges, if any. The identification of the relevant portions of an image may be accomplished by identifying the relevant portions of an image, such as faces and objects that may have been recognized. By applying saliency filters, a bounding box may be drawn around a focus of an image. Thus, if the relevant faces or objects are located on the sides of the image, the image may be zoomed or cropped to highlight the identified relevant area. The photo analysis processes may further include identifying images with an incorrect orientation, identifying images with incorrect color, brightness or contract, and/or identifying images with red-eye.

In the following step 2C208, various photo correction processes may be executed on the images or photos 2B264 stored in the database 2A204 as records 2B266, at the direction of the user 2A210 via input provided via a graphical user interface executing on the device 2A220. The photo correction processes comprise: orienting images that have been identified as having an incorrect orientation to an appropriate orientation, adjusting images that have been identified as having an incorrect color, brightness or contract to the correct color, brightness or contract, and removing red-eye from images that have been identified as having red-eye.

In the following step 2C210, various use-case specific heuristics may be executed on the images or photos 2B264 stored in the database 2A204 as records 2B266, based on results of said photo analysis, at the direction of the user 2A210 via input provided via a graphical user interface executing on the device 2A220. The use-case specific heuristics comprise: grouping images that have previously been found to be similar, grouping images having identical or similar faces (based on the faces that were previously identified), grouping images having identical objects (based on the objects that were previously identified), removing undesirable images (based on the images that were previously identified as undesirable), and cropping images to highlight relevant portions of said images (based on the relevant portions of images that were previously identified).

In executing the use-case specific heuristics, heuristics that correspond to the use-case identifier 2B266 are utilized. Different use-cases may require different heuristics. For example, a use-case identifier 2B266 that identifies a wedding would result in heuristics that: group images having the faces of the bride and groom (based on the faces that were previously identified), group images having the wedding cake or the altar (based on the objects that were previously identified), and crop images to highlight portions of said images having the faces of the bride and groom (based on the relevant portions of images that were previously identified). Instructions 2B268 in database 2A204 may instruct server 2A202 on which heuristics correspond to each potential use-case identifier 2B266 provided by user 2A210.

As an example, with regard to grouping images having the faces of the bride and groom (based on the faces that were previously identified), using face detection, identifiers may be applied to each face to determine, for example, that person A shows up in 85% of the photos, person B shows up in 73% of the photos, and person C shows up in 20% of the photos. Therefore, person A and B are most likely the bride and groom.

In the following step 2C212, various additional functions may be executed on the images or photos 2B264 stored in the database 2A204 as records 2B266, at the direction of the user 2A210 via input provided via a graphical user interface executing on the device 2A220. The additional functions may comprise: reading embedded date or location metadata from the images, performing a lookup of additional location data based on the embedded location metadata, and generating text boxes to be printed below said images upon creation of the photo-based project 2A252. The additional functions may also include ordering the images or photos 2B264 stored in the database 2A204 in chronological order, based on the time the images were taken or created.

In one example of the execution of the process of step 2C212, the server 2A202 reads an image in EXIF format, a standard that specifies the formats for images and ancillary tags used by digital cameras (including smartphones), scanners and other systems handling image files recorded by digital cameras. The EXIF format may store date and time information of the image, camera settings of the image, thumbnails of the image, descriptions of the image, and copyright information for the image. In this example, the server 2A202 may read the location for the image from the file and generate a text box reflecting said location to be printed below said image upon creation of the photo-based project 2A252. In another example, the server 2A202 may read the location for the image from the file (in a GPS coordinate format), perform a lookup to find a corresponding text string that matches the GPS coordinate, and generate a text box having said text string to be printed below said image upon creation of the photo-based project 2A252. In this example, the server 2A202 may read the date and time for the images from their files and place the images or photos 2B264 in chronological order, based on the time the images were taken or created.

In the following step 2C214, the creation process is concluded and the resulting photo-based project product is ordered, at the direction of the user 2A210 via input provided via a graphical user interface executing on the device 2A220. In this step, the server 2A202 sends a request 2B270 to the fulfillment party 2A250 for the photo-based project product 2A252. In the following step 2C216, the fulfillment party 2A250 receives the request 2B270 for the photo-based project product 2A252, prints the photo-based project product, binds the photo-based project product, packages the product, and then ships the ordered product 2A252 to the end customer, such as user 2A210.

Figure 2D:
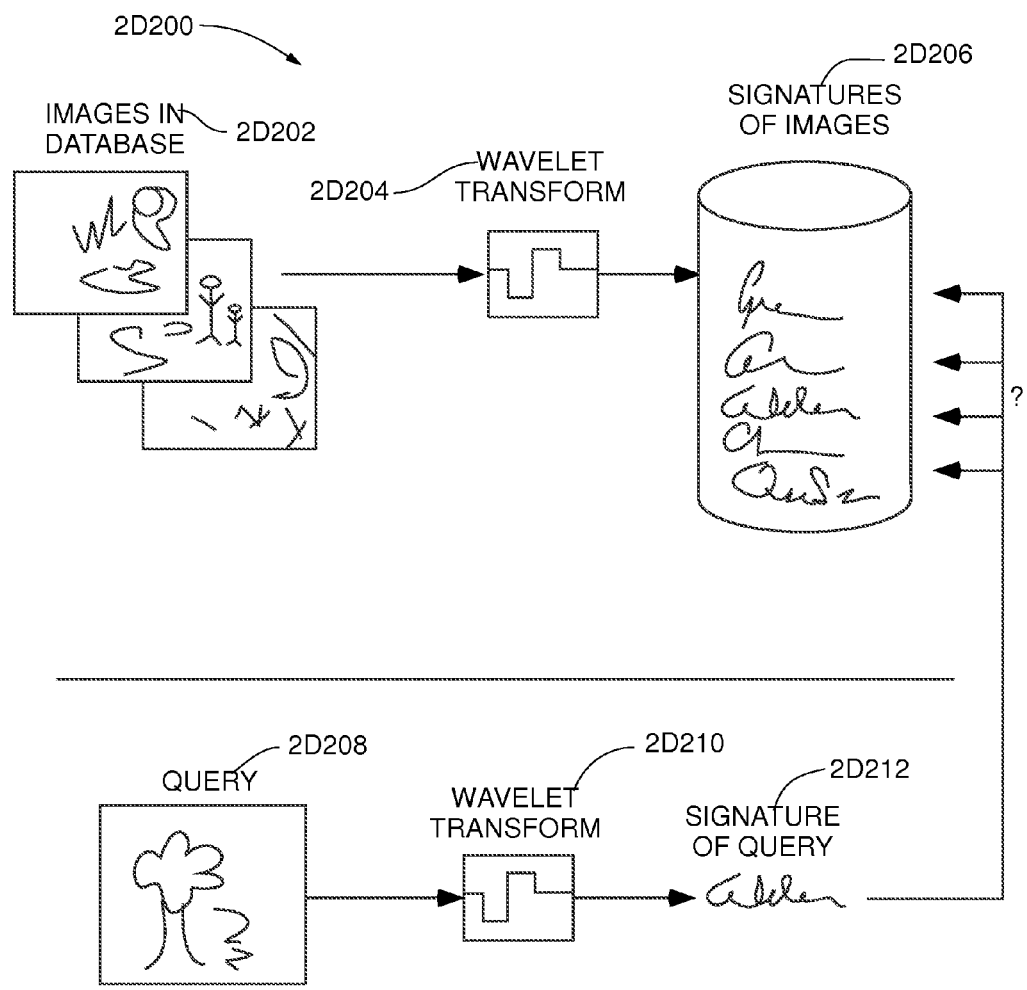
FIG. 2D is an illustrative flowchart of an image analysis process, according to one embodiment of the present invention.

FIG. 2D shows an illustrative image analysis or photo processing process according to one embodiment of the invention. The image analysis process shown in FIG. 2D is illustrative only, and is not intended to be limiting. Various other image analysis processes, some of which are described later, are also within the scope of the present invention. This image analysis process describes an image similarity detection process, as illustrative of the image analysis processes that are useable with the present invention.

In one illustrative image analysis process shown in FIG. 2D, the process 2D200 examines the images for similarity by expressing a query to the image database 2D202 (all of the images) by requesting images that are similar to one of the images (query image 2D208). The process considers basic shape and color information of the photo when looking through the database for potential matches of similar photos. Several factors make this matching process difficult. The query image is typically different from the target image, so the retrieval method must allow for some distortions. Since these are natural photos taken in natural environments, the photos may suffer artifacts such as color shift, poor resolution, dithering effects, and mis-registration. Furthermore, it is important to perform the retrieval fast enough to not hamper user experience of the media-product creation process.

When the images are first received by the server, a wavelet transform 2D204 is performed on every image in the image database 2D202. By collecting just the few largest coefficients from this transform, the process distills a small "signature" for each of the images. These signatures are saved in a signature database 2D206 so that it is computationally efficient to compare them all to each other.

When the process 2D200 requires photo(s) of similarity to a given query image 2D208, the process performs a wavelet transform 2D210 on the query image 2D208 to produce a signature 2D212 for the given query image 2D208. This query signature 2D212 is compared to the signatures of the database images 2D206, and the best matches are retrieved by the process 2D200 for use in automatically creating, organizing, and presenting the media-based project to the user.

The wavelet transform is used to analyze functions at different levels of detail; it is somewhat similar to the Fourier transform, but encodes both frequency and spatial information. By saving the few largest wavelet coefficients for an image (and throwing away all of the smaller coefficients), it is possible to recover a fairly accurate representation of the image. This property may be exploited for efficiency gains to optimize image similarity comparisons. For example, a wavelet transformed image ("signature") that incorporates 400 coefficients would require about 3% as much disk space as the original image. In one embodiment, it is possible to take a wavelet transform and keep just a few (for example, 20) coefficients for each color channel and distill from them a small "signature" for each image. Because the signature is so small, it permits very fast searching in the database.

Additional Mixbook Embodiments

Figure 2E:
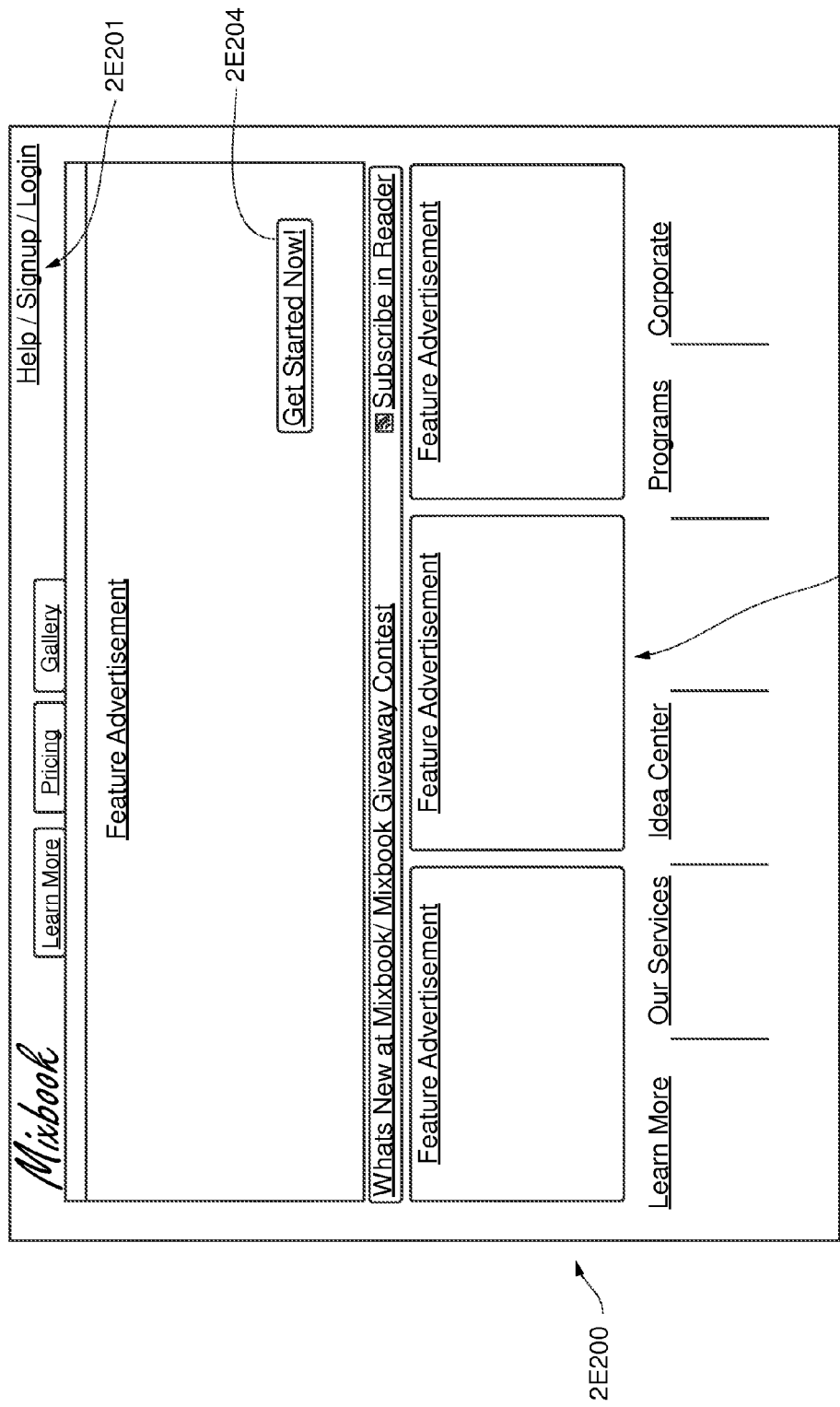
FIG. 2E is an exemplary screen shot of an introduction page of the website of FIG. 1W, according to an embodiment of the present invention.

FIG. 2E is an exemplary screen shot of an introduction page 2E200 of website 1W2106 of FIG. 1W according to an embodiment of the present invention. Introduction page 2E200 includes interactive indicia 2E201, which includes an option for retrieving help, signing up for service, and for logging into the service. On the same title bar containing the interactive indicia 2E201 for signing up or signing into the process, there are the navigation options Learn More; Pricing; and Gallery. The option "learn more" leads to additional information about the services provided, such as product quality, use cases, etc. The pricing option brings up one or more complete pricing structures for the available products that can be created and printed. The option Gallery is an option that provides access to completed projects authorized for public viewing.

Page 2E200 contains more than one feature advertisement 2E203. Each feature advertisement may comment or provide some input, access to, or information about a feature of the service or fact about the providing company. In the first feature advertisement (center top) there is an interactive option 2E204 for getting started now. Invocation of this interactive link may launch a registration or sign-up process followed by an opportunity to begin a MIXBOOK project. Hyperlinked information is provided on introduction page 2E200 under categories such as Learn More, Our Services, Idea Center, Programs, and Corporate.

In one embodiment, page 2E200 includes an option "try it now", which may be replace option 2E204. Invoking such an option may take the "guest" to a MIXBOOK EDITOR without requiring them to login or have an account with the site. Transparent to the user, the system creates a temporary account for them. If the new guest user attempts to save any work on the site they are asked to register as a user.

Automatic Insertion of Content into Projects

Figure 3:
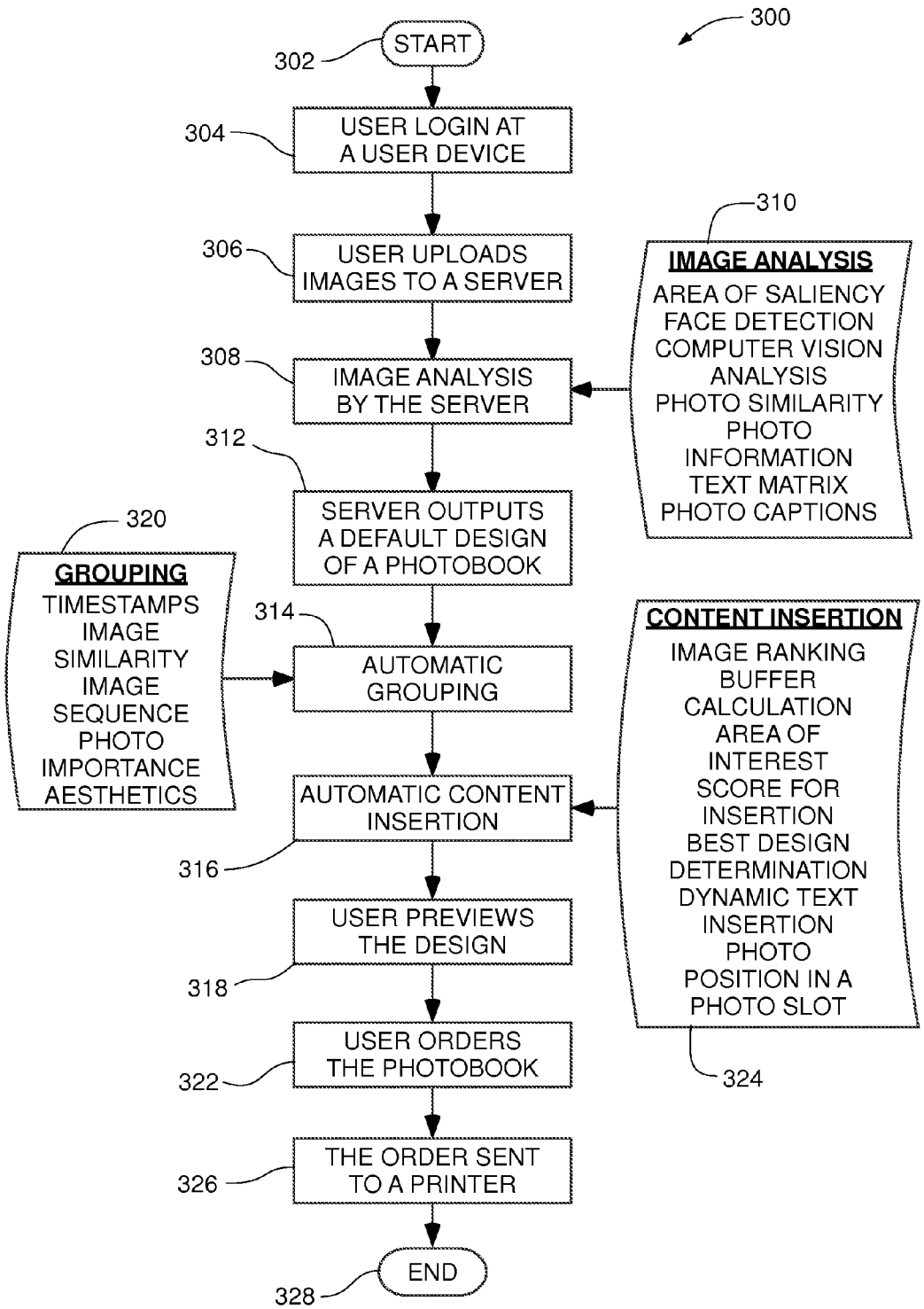
FIG. 3 is a flowchart showing an automatic insertion of content into a design, according to an embodiment of the present invention.

FIG. 3 is a flowchart 300 of an embodiment showing an automatic insertion of content into a design. Content may comprise photos or images, text, and user inputs from a user. At step 302, a user starts a process of automatic insertion of content by using a user-device. The user logs in at the user device at step 304. After log-in, the user enters a workspace, an editor, or a graphical user interface (GUI) at the user device. The user at step 306 selects images or photos from the user device and uploads them to a server. At step 308, the server performs an image analysis on the uploaded images. After the images are analyzed, the server derives automatic image information from the uploaded images. As shown in the list 310, automatic image information is derived by using computer algorithms that include, but are not limited to, one or more of detecting areas of saliency, face detection, computer vision analysis, photo similarity detection, and analyzing photo information, text matrix, photo captions, and so on. Automatic image information is also derived from image meta-data. After using the automatic image information derived by image analysis, the server at step 312 outputs a default design preview (an automated design) of a photobook. The design preview at step 312 also comprises a layout that is the basis for the design.

At step 314, the server performs automatic content grouping of the uploaded images. For automatic content grouping, the server utilizes, but is not limited to, one or more of the information in the list 320. The list 320 comprises timestamps, image similarities, image sequences, photo importance, aesthetics, and so on. At step 316, the server automatically inserts content into the design of the photo project by using, but not limited to, one or more of the items (computer algorithms) in the list 324. The list 324 comprises image ranking, buffer calculation, areas of interest in an image, scores for insertion, best design determination, dynamic text insertion, photo position in a photo slot, and so on.

The user previews the design at step 318. The preview at step 318 is populated after completing the automatic image information extraction of one or more of the items in the list 310, after step 314 of automatic content grouping, and after step 316 of automatic content insertion. The preview at step 318 is thus automatically populated by the server by using one or more of the items (computer algorithms) as shown by the lists 310, 320, and 324. After the user previews the design, the user can order the photobook at step 322. At step 326, the order is sent to a printer. The printer may be a third party printer, a social printer, or any industrial printer that is adapted to print photos on a photo quality paper. The ordered photobook may be printed on a preferred size of a photo paper. The ordered photobook may be a shippable product to the user. The printer may be further adapted to print a shipping label comprising the order information, and other relevant information. The process ends at step 328.

Figure 4:
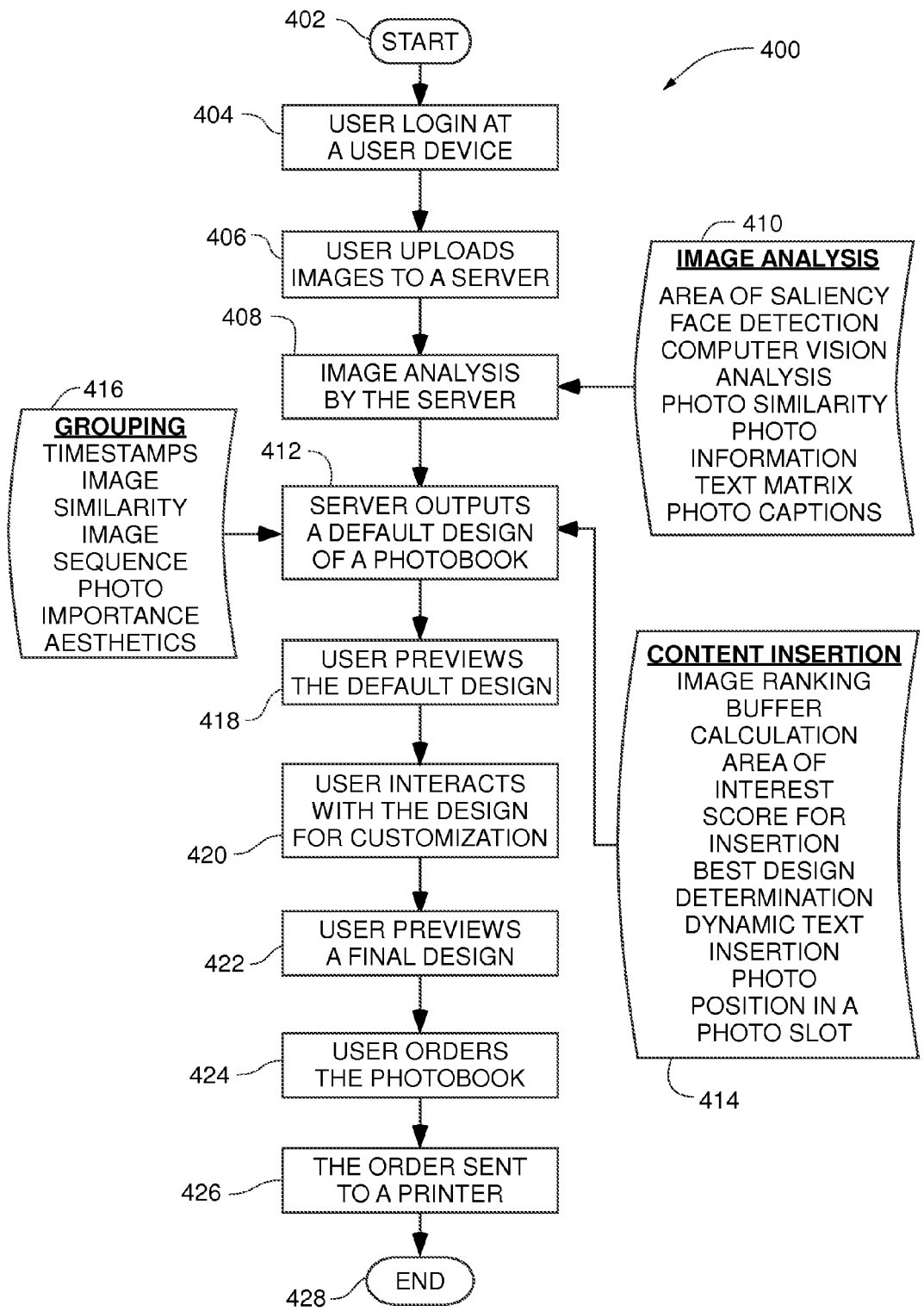
FIG. 4 is a flowchart showing a first automatic and then a second manual insertion of content into a design, according to an embodiment of the present invention.

FIG. 4 is a flowchart 400 of an alternative embodiment showing a first insertion based on automatic image information and a second insertion based on observed image information of content into a design of a photo project. At step 402, the process starts at a user-device. The user logs in at the user device at step 404. After the log-in, the user enters a workspace, an editor, or a graphical user interface (GUI) at the user device. The user at step 406 selects images or photos from the user device and uploads them to a server. At step 408, the server performs an image analysis on the uploaded images. After the images are analyzed, the server derives automatic image information from the uploaded images. As shown in the list 410, automatic image information is derived by using computer algorithms that are relevant to areas of saliency, face detection, computer vision analysis, photo similarities, photo information, text matrix, and photo captions. Automatic image information is also derived from image meta-data. After using the automatic image information derived by image analysis, the server at step 412 outputs a default design preview of a photobook.

The default design generated at step 412 is based in part on step 416 of automatic content grouping and step 414 of automatic content insertion. At step 416, the server performs automatic content grouping of the uploaded images. For automatic content grouping, the server utilizes the information comprising timestamps, image similarities, image sequences, photo importance, and aesthetics. At step 414, the server automatically inserts content into the design of the photo project by using items (computer algorithms) comprising image ranking, buffer calculation, areas of interest in an image, scores for insertion, best design determination, dynamic text insertion, and photo position in a photo slot.

The default design at step 412 is based on a combination of computer algorithms in lists 410, 414, and 416. The user previews the default design created by the server at the user device at step 418. Furthermore, the user customizes the design at step 420 by adding user interactions or user inputs. User interactions or user inputs comprise area of interest selection, photo importance determination, and so on. User interactions or user inputs are performed manually by the user. By observing and monitoring the user interactions at the GUI of the user device, the system is able to collect observed image information, which the system can use to improve on the automatic image information obtained by the system from image analysis. The system can monitor for such user interactions as zooming, panning, swapping photos, adding captions to photos, and so on. After the customization by the user, a final recommended design based on the automatic image information and the observed image information is generated by the system, and can be previewed by the user at step 422. The user can then perform additional customizations to the final recommended design, and then order the photobook at step 424. At step 426, the order is sent to a printer as described previously. The process ends at step 428.

Figure 5:
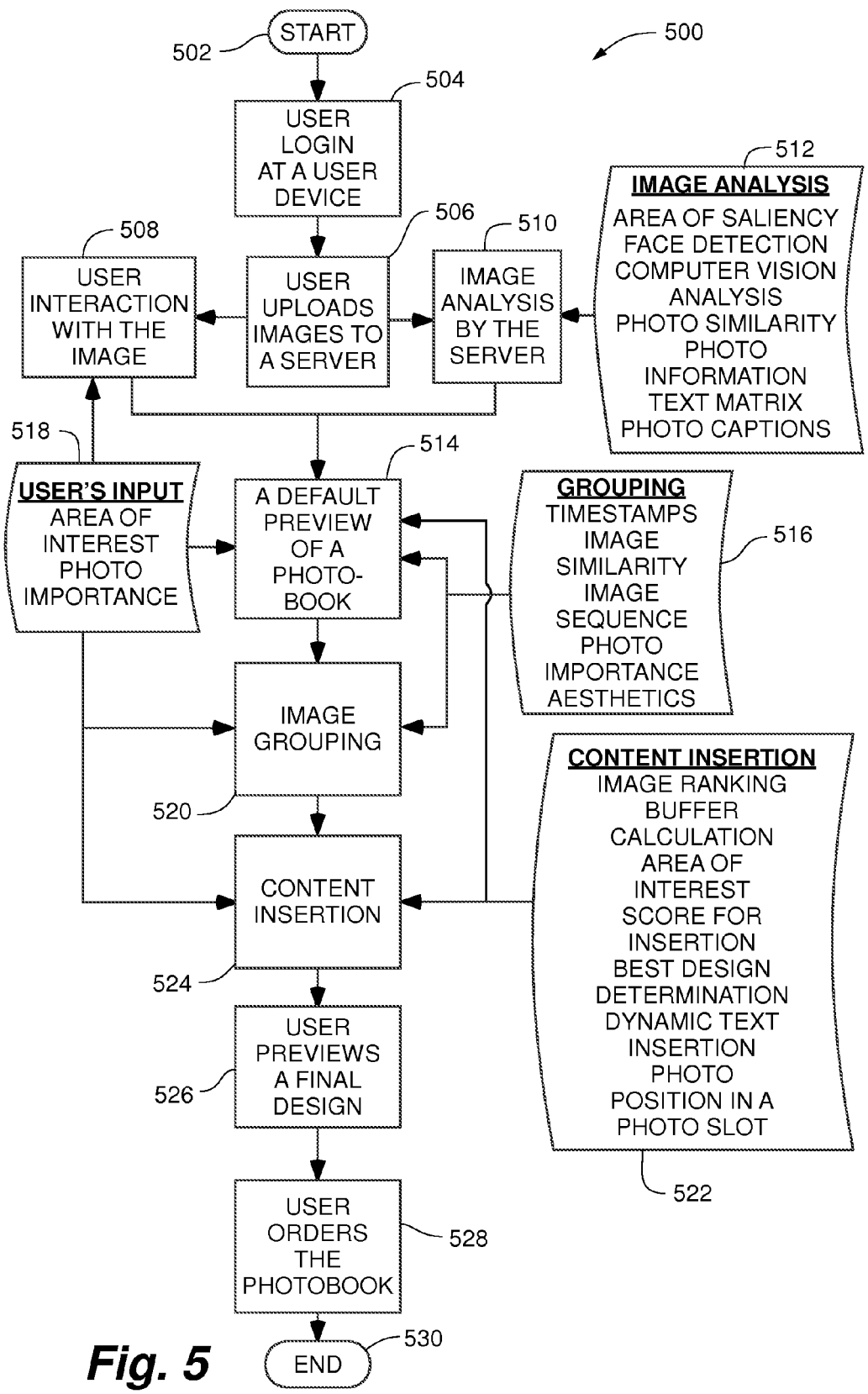
FIG. 5 is a flowchart showing a simultaneous automatic and manual insertion of contents into a design, according to an embodiment of the present invention.

FIG. 5 is a flowchart 500 of an alternative embodiment showing an insertion of content based on automatic and observed image information. At step 502, the process starts at a user-device. The user logs in at the user device at step 504. After the log-in, the user enters a workspace, an editor, or a graphical user interface (GUI) at the user device. The user at step 506 selects images or photos from the user device and uploads them to a server.

At step 510, the server performs an image analysis on the uploaded images. After the images are analyzed, the server derives automatic image information from the uploaded images. As shown in the list 512, automatic image information is derived by using computer algorithms that are relevant to areas of saliency, face detection, computer vision analysis, photo similarities, photo information, text matrix, photo captions, and so on. Automatic image information may also be derived from image meta-data. While the user is uploading original images to the server, the user can interact with a layout and a design of a photobook, and thus contribute to creating user inputs or user interactions with the design. At step 508, the user interacts with the images that are already uploaded to the server. User interactions are also called manual interactions, manually observed information, user inputs, or user's behavioral observation. As shown in the list 518, user interactions comprise one or more of, but are not limited to, areas of interest in a photo, photo importance, panning, zooming, switching photos, and so on. Not every possible user interaction is shown in list 518 for simplicity of explanation. User inputs may also be called tweaks, and give rise to observed image information. By using user's manual inputs or user interactions (observed image information) along with the automatic image information derived though image analysis by the server, a default preview of the design (an automated design) is generated at step 514. The automated design is subject to manual edit by the user at any time before an order to print is placed and confirmed.

At step 520, automatic content grouping of images is performed by using both observed image information from the user and automatic image information from the server. Errors made by the server in automatic content grouping are manually corrected by the user at step 520. For automatic content grouping, the server utilizes one or more of, but is not limited to, the items or information in the list 516. The list 516 comprises timestamps, image similarities, image sequences, photo importance, aesthetics, and so on. User inputs at step 520 come from, but are not limited to, one or more items on the list 518. At step 524, manual tweaks are performed to further customize content. The server automatically inserts content into the design of the photo project by using, but is not limited to, one or more of the items (computer algorithms) in the list 522. The list 522 comprises image ranking, buffer calculation, areas of interest in an image, scores for insertion, best design determination, dynamic text insertion, photo position in a photo slot, and so on. Manual tweaks come from the list 518, but are not limited to the items shown.

After performing manual tweaks at steps 520 and 524, the user previews a final recommended design of the photo project at step 526. When the user is happy with the final recommended design, the user can order a photobook at step 528. The order may then be sent to a printer as previously described. The process completes at step 530.

Figure 6A:
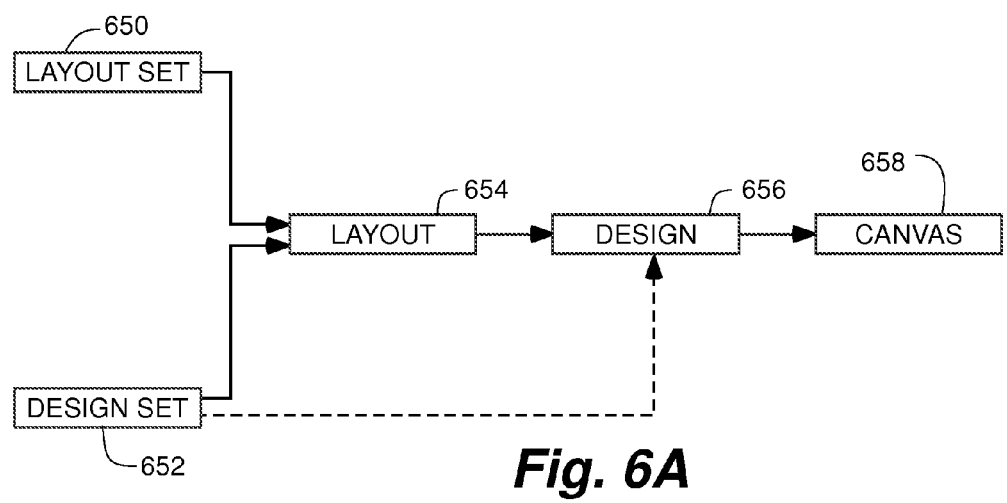
FIG. 6A illustrates a diagram showing a relationship between a canvas, a design, a layout, a designset, and a layoutset, according to an embodiment of the present invention.

FIG. 6A illustrates a diagram showing a relationship between a canvas, a design, a layout, a designset, and a layoutset, according to an embodiment of the present invention. A layoutset 650 gives rise to a layout 654, which itself gives rise to a design 656. The design 656 inherits from both a layout 654, and indirectly its layoutset 650. The design 656 is selected from a designset 652. Each design 656 specifies a style and formatting of content in a layout 654 from which it depends, while each layout 654 specifies a location of photo slots and/or text slots without reference to styling. Each designset 652 is always tied to a layout 654, which itself is always tied to a layoutset 650. Finally, the design 656 gives rise to a canvas 658 through an addition of content by a user, automatically by the server, or both. This inter-relationship of a canvas, a design, and a layout ensures system flexibility and efficiency whenever designs have to be modified.

Figure 6B:
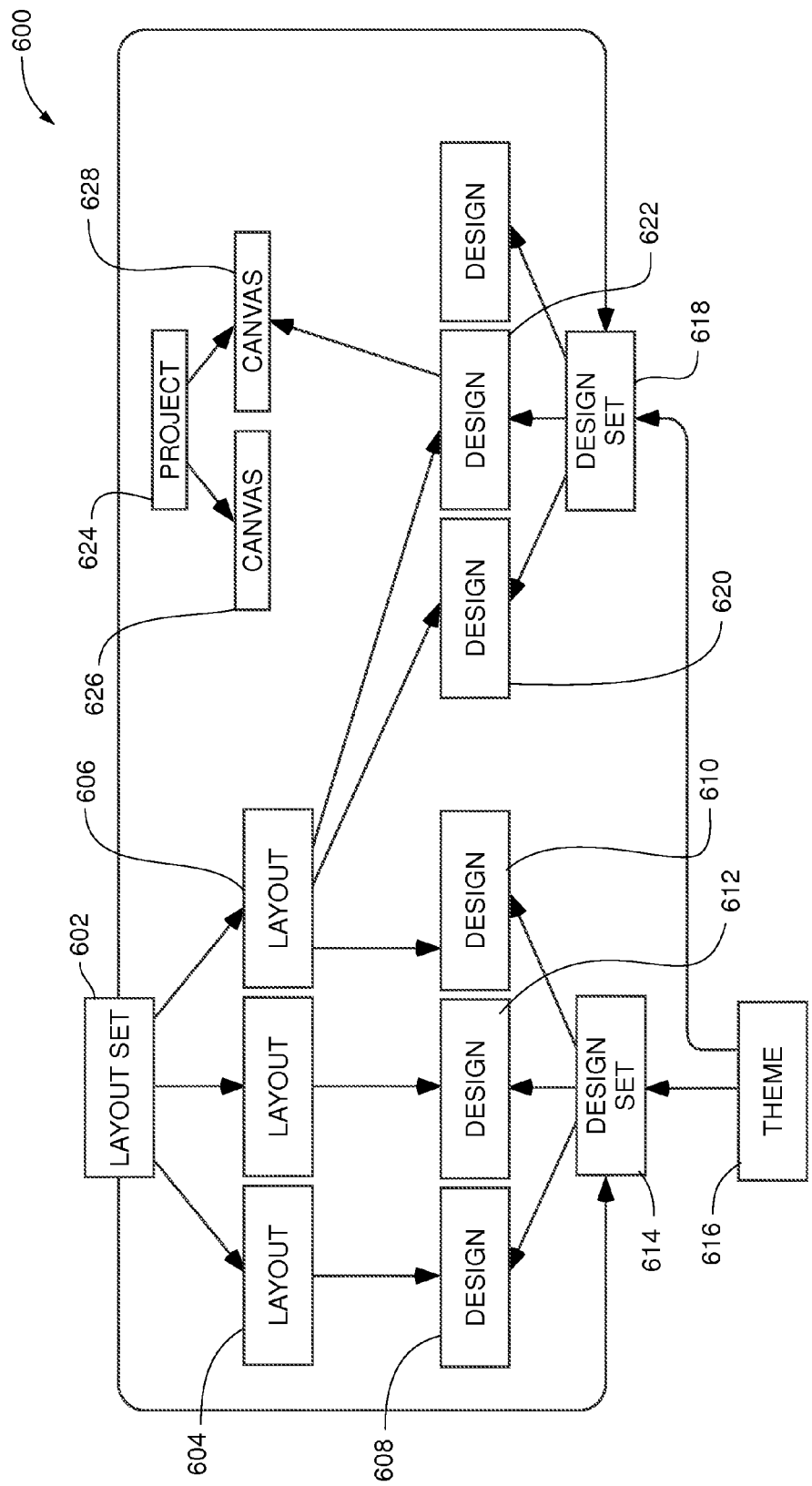
FIG. 6B illustrates a diagram showing an interrelationship of a theme, a layout, and a design, according to an embodiment of the present invention.

FIG. 6B illustrates a diagram 600 showing an inter-relationship of a theme, a layout, and a design, as well as their corresponding sets. At a user device, a user selects images to build a photobook. Once the images are selected, the user can select a theme 616. The theme 616 corresponds to designsets 614 and 618. Each designset is a collection of designs. For example, the designset 614 comprises designs 608, 610, and 612. Similarly, the designset 618 comprises designs 620, 622, and other designs not shown. Each design depends on a layout. For example, the design 608 depends on a layout 604. Each layout depends on a layoutset. For example, the layout 604 depends on a layoutset 602. A layout can have or create many designs. For example, layout 606 can create designs 620, 622, and another designs (not labeled). A design at the user device may be presented in a canvas 626. A canvas 626 represents how a design will be printed on paper. A project 624 can be represented by a canvas 626 or a canvas 628. For example, the design 622 is reflected on canvas 628. Each layoutset serves as a basis for many designsets, and each layout serves as a basis for many designs. A theme 616 selected is consistent with a layout as well as a design, thereby maintaining an inter-relationship between a theme, a layout, and a design. Thus, this inter-relationship offers greater control for a responsive design update and for auto-flow/auto-fill algorithms, thereby saving time and labor in creating a photobook.

Other Exemplary Embodiments of the Present Invention

Figure 7:
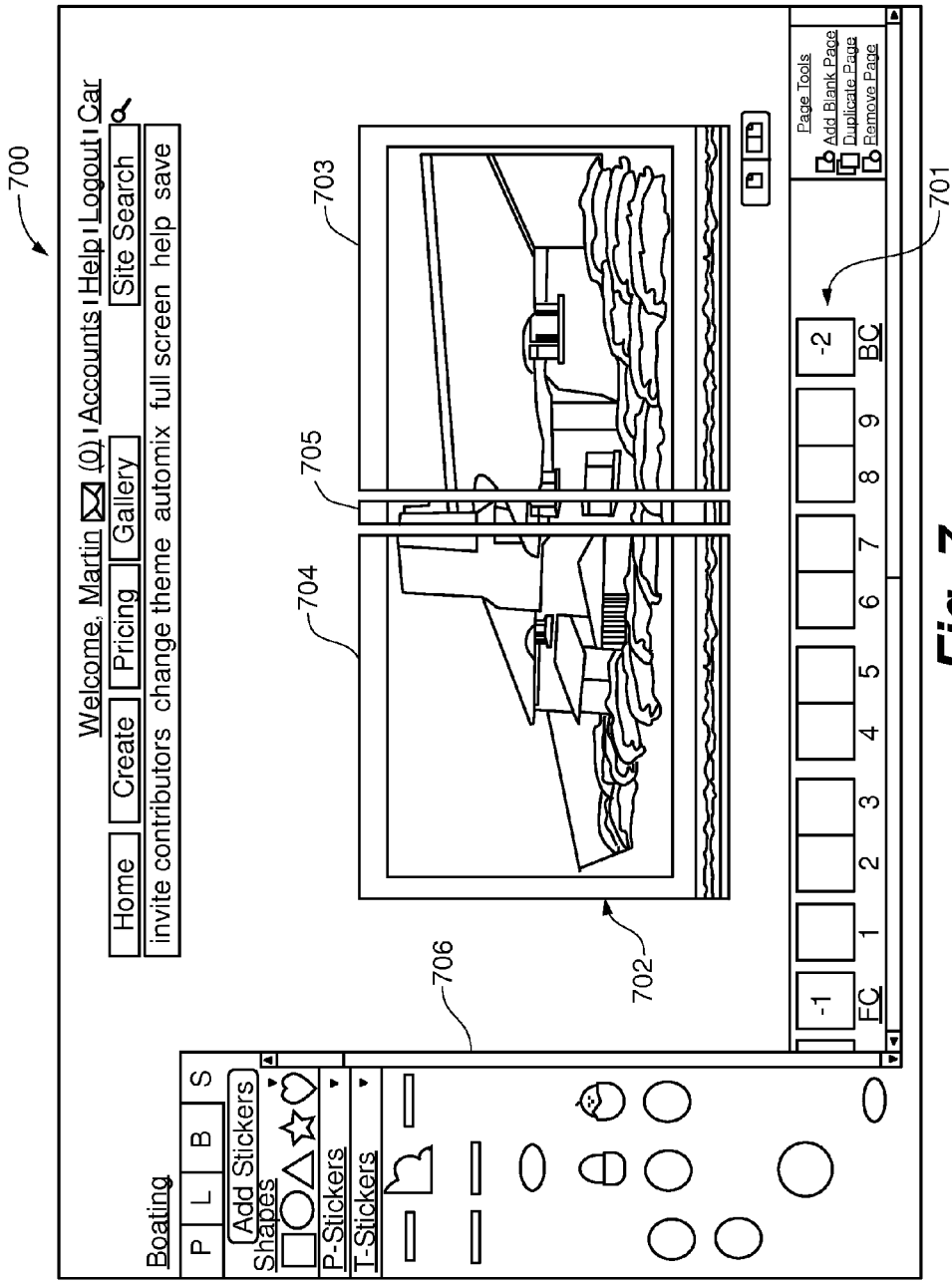
FIG. 7 is an exemplary screenshot of an editing interface displaying a photo spread across multiple pages (front cover, back cover, and spine), according to an embodiment of the present invention.

FIG. 7 is an exemplary screenshot of an editing interface 700 displaying a photo-spread including a front cover, back cover, and spine according to an embodiment of the present invention. Interface 700 has a storyboard display 701 that includes all of the pages of the photobook being created. The inventors provide a unique paradigm for relating items across multiple pages including special pages, in this case, the front cover 703, the back cover 704, and the spine of the book 705. When a user edits a spread that contains more than one page, the photos, shapes and stickers can be "overflowed" from one page to other pages within the spread. When the items are overflowing, they are linked together such that when an item changes on one page, its linked item gets updated reflectively on the other page.

In this example the related item is a single landscape photo 702 that is spread or wrapped around three special pages namely, front cover 703, back cover 704, and the spine 705. In the case of photo 702, it actively occupies all three designated special pages and editing of the photo from any of the special pages results in changes to the photo appearing on all three pages. For example, if a user pans photo 702 the results of positional change are seen on all of the pages that the photo occupies. If each of the pages has one or more related items that appear on all of the pages for example, and editing performed on one of the related items may be propagated to all of the related items on other pages automatically. The area 706 is an area in the interface that offers available resources for customizations, such as, stickers, shapes, and the like.

Related items may also be moved over to one page completely, so that original item is not showing whatsoever on the other page. When this occurs, the item will be removed from the page it is no longer visible on. In one embodiment a user may take an item that exists on a last page, for example, and may "sweep" the item off of that page to automatically create a next page with the same layout and theme that is hosting the related item.

In one aspect of the present invention, a page's position may be reflected using signed integers, which may also be used to model a special pattern. In this example, signed integers are used to describe positioning of the front cover 703 (signed integer −1) and back cover 704 (signed integer −2). Other special pages like foldable poster spreads (within a book) and inside cover jackets may also be positioned using signed integers. There may be a number of different position types to consider including number (any position value >0), special position, group position, pattern opposition, and function position.

It is duly noted herein that every product available to create at the service site like books, cards, calendars, and photobooks, is a compilation of pages. A page is the fundamental canvas unit observed by the service although other unit definitions may be observed. A book is a collection of many pages. "Pages" is not just a reference to the insides of a book, but it can also refer to the cover pieces. The front cover, spine, and back cover are each pages which can be stitched together.

Many times in the process of creating a project, it makes sense to associate certain pages together. When a user edits a foldable card, for example, the user may want to be able to move an item from the bottom portion to the top part of the card. From the perspective of the back end data, the foldable card comprises two different canvas units pieced together.

Figure 8:
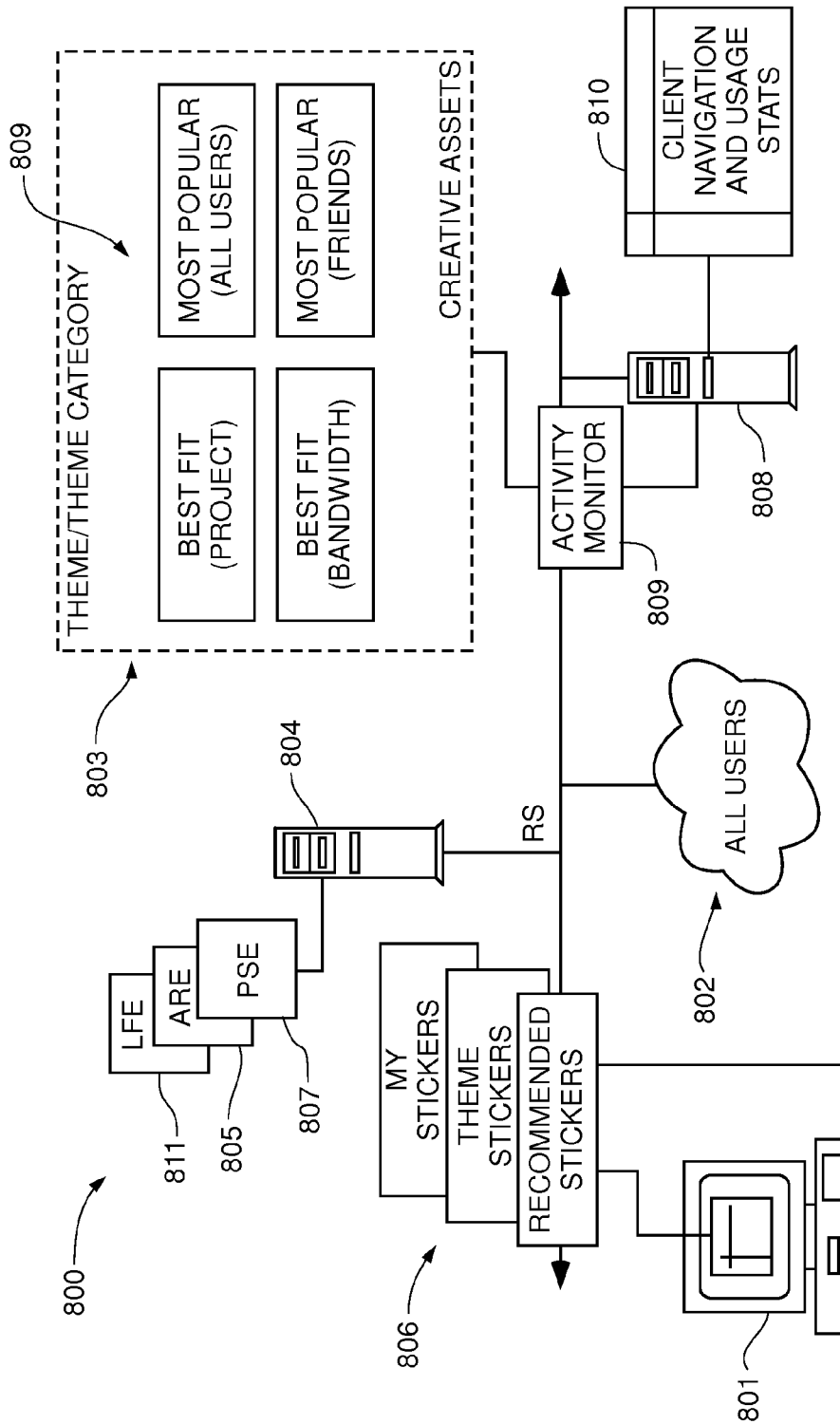
FIG. 8 is a block diagram illustrating an asset recommendation system, according to an embodiment of the present invention.

FIG. 8 is a block diagram illustrating an asset recommendation system according to an embodiment of the present invention. In one embodiment of the present invention, asset recommendations are made to a user who is editing a current project using the MIXBOOK collage editor. System architecture 800 includes a user 801 that is currently online with runtime server 804 running an asset recommendation engine (ARE) 805. The system of the invention has access to all of the assets that have been designed by system designers, users whom may be registered as asset contributors, and any other user contributions to the system. Creative assets 803 include all of the stickers, shapes, backgrounds, layouts, photos, and any other accessible imagery.

When a user edits a project, and selects a theme, theme-based assets become accessible to that user's MIXBOOK editor. In the canvas-editing interface (MBE), one can create a hierarchical recommendation system for presenting users with content to use in their current and future projects. By using themes as the building blocks for this hierarchal asset recommendation system, we can then link a theme to a project and utilize the creative content of the project as the basis for the theme.

In one embodiment, a project can be used by the system as a basis for theme creation in order to facilitate creation of more projects based on the theme. This theme creation process can be leveraged by bundling all forms of creative assets from a user-created project into a theme. If the creator of the project so chooses, all of the assets in the project can serve as the basis for a theme, which then serves as the creative basis for creating future projects. For example, if a user creates a "Mother's Day" project in the form of a photobook, they can use this project as the basis for a theme called "Mother's Day Theme." This "Mother's Day Theme" can then serve as the basis for users across the site to create their own "Mother's Day" projects. They will be able to utilize the canvas pages and all other creative assets that were added to the original "Mother's Day" project that was used to create the theme.

In one embodiment, the assets are related to a specific theme a user has selected for a project. Creative assets like backgrounds stickers, layouts, and so on appear in the interface as thumbnails along with the user's photos, etc. In one embodiment asset recommendation engine 805 is adapted to list recommendations by relativity. For example, if a user like user 801 is working a project that is baby themed, then the stickers relating to that theme would appear in the user's editing interface. For example, hierarchical recommendation may take the form of sticker categories 806. Categories 806 include "My Stickers" as the top level of stickers (the first to appear in the interface). "My stickers" would include the stickers added directly to the project by contributors to the project. "Theme stickers" would next appear and would include the system-provided theme stickers that go with that particular theme. "Recommended Stickers" may include other theme stickers used in the projects from the themes that this project's theme shares a theme category with (Baby Themes).

Creative assets may be recommended on a contextual basis as well. For example, if a user is editing a specific page that has baby stickers on it and clicks the sticker tab other baby stickers will be shown to the user, including the ones used on that page. Other recommendation schemas may be practiced in accordance with the present invention without departing from the spirit and scope of the present invention.

A cloud labeled All Users 802 may represent all of the users currently editing projects, or all of the users registered with the system. Assets may be recommended to user 801 based on what all of the current users or based on what all of the users have determined to be the best or most used or most popular assets like theme-based stickers. If the asset is stickers, a recommendation might be the most popular stickers based on use count among all users. Another category might be the most popular stickers based on use count of only the friends of the user receiving the recommendation. Another category might be recommendation of the stickers that might best fit a specific project (contextual). Yet another category might be a recommendation of creative assets based on bandwidth considerations. There are many varied possibilities. Any type of creative asset might be considered for recommendation using contextual or hierarchical recommendation using ARE 805. Recommendations may be made to users according to analyzed usage counts, friend relationships among the content creators, and content characteristics like width and heights or content meta-data such as photo data.

In one embodiment, a single asset recommendation system analogous to ARE 805 is provided for recommending creative assets stored by the system to users editing a project or a project page. Assets may include but are not limited to the categories of stickers, shapes, backgrounds, layouts, and frames. In a preferred embodiment the asset recommendation system is implemented in software and integrated with the GUI for recommending creative assets. In one embodiment the asset recommendation engine is a back-end data process that works in the background to rank creative assets and serve relevant assets according to ranking order. In this case each creative asset considered has a score card that may reflect a final score or value based on one or more conditions or "weightings."

The system is adapted to receive server calls relative to user GUI activity and to parse information about creative assets stored for use. A ranking function is provided that ranks creative assets based on filtered and/or or unfiltered statistical data known about usage and characteristics of the asset input against one or more pre-set rules for ranking the appeal of that asset. The system includes a server function for serving the recommended assets into the GUI. In this way the most relevant assets may appear in the interface closer to the top followed by the lower ranked assets and so on per asset category. The process is driven by algorithm and may fire each time the user clicks on an asset category to browse available creative assets stored by the system of the invention.

Both hierarchical and contextual recommendations can be made in concert to users operating the GUI. When a user clicks on an existing project to resume editing, the project's creative assets are loaded into the project pages as described further above. These creative assets are also listed in hierarchical order in the asset selection interface, typically the sidebar area of the editing GUI. In one aspect the hierarchy is My Stickers, followed by Theme Stickers, followed by Recommended Stickers. The ranking portion of the engine ranks My Stickers or "Project Stickers" as being most relevant to the project because they are already established in the project by the project contributors. Therefore, these already used stickers will be stickers that have the greatest probability of being re-used in the project.

The ranking engine ranks theme stickers as the next level of importance because these stickers are designed to be used in the theme that the user's project falls under. Now, the ranking engine looks at stickers that are stored that have been used in other user-created projects sharing the same theme or belonging to the same theme category but that have not yet been used in the instant project. The system ranks these stickers according to a weighting algorithm that calculates the appeal of each qualifying sticker according to one or a combination of parameter constraints.

In one example, the recommended stickers sent to a user for display in the recommended stickers' window might be the highest ranking stickers based on a use statistic filtered by user type. For example, this user's friends prefer the following recommended stickers based on the number of times they have been used in projects sharing the same theme or even the same theme category. On the other hand, the system may rank the stickers based on some other preset condition that is relevant to the situation at hand or may rank stickers based on likeness to stickers already selected for use in a project or on a project page.

In one embodiment the asset recommendation requirements are a receiving function for receiving server calls relative to user GUI activity being monitored, a weighting function for ranking creative assets based on input against one or more rules for ranking asset appeal, and a server function for serving the recommended assets into a GUI. In simple practice of the invention includes (a) receiving an indication of a user selection of a project or project page for edit at an asset recommendation engine; (b) calculating or updating current scores for the assets that qualify for service based on project, project page, and theme-based characteristics; and (c) serving the assets into the GUI asset browsing windows with the most relevant assets based on analyzed score served first followed by lesser relevant assets.

In one embodiment, the system of the present invention can select one or more photos from a user's project for recommendation in a new product. The system stores the in-depth page positioning information for all of the items placed in a user's project. The metadata about each of the user's photos, for example, is persisted along with the in-depth positioning information with each item stored for use in the project.

The system may therefore make intelligent recommendations regarding the importance and relevance of photos and other assets to a user. Through this analysis, the system can make automated suggestions of single or multiple photo products that the user may have an interest in purchasing.

By analyzing asset usage information and other data the system can access the items stored for a specific project that may contain, for example, hundreds of photos and select one photo or a few photos that would qualify for application to single or multi-photo products like canvas prints, coffee mugs or mouse pads and so on.

Referring now back to FIG. 8, the system may use ARE 805 to make an assessment of which image or photo assets in a product are good candidates for isolation for a single or multi-photo product. The term multi-photo refers to a product with two to several photos, for example, where the user had many photos in the project pool. A coffee mug may include a photo wrapped around the mug or several photos positioned about the mug. There are many different possibilities.

The ARE may first access the creator's project photos stored in the database. Then the system might weigh data associated with each photo used in the project against one or more business rules. After weighing the results, ARE 805 may select one or more than one photo based on weighted score. In one aspect each item has a score card. The system may finally suggest or recommend one or more than one photo product as an up sell at such time the user wishes to make a purchase. A unique aspect of the recommendation is that the system may present one or more views of the suggested product already loaded with the creator's photos selected by the system.

ARE 805 analyzes any tags attributed to photos and the descriptions of and captions associated with those photos. ARE 805 might consider the actual size of images for certain product types like canvas prints, for example. If a photo is a background that spans two pages in a photobook, it may be a good candidate for a canvas print. ARE 805 can consider the number of times a photo is used in the same project. The recommendation may be updated as a user edits a project such that when a user is ready to purchase the project in print form the system might also recommend that the user purchase another product that can be displayed to the user through the GUI with the recommended photos in place on the product. The system might offer an up sell option of one or more than one product exhibiting the selected photos.

With reference to FIG. 8, ARE 805 may leverage a number of statistical genres to help prioritize creative assets that are presented to customers for possible inclusion into their projects. Network 800 supports a statistics server 808. Statistics server 808 includes at least one processor, data repository, and a transitory medium. Server 808 hosts SW 809, labeled Activity Monitor. Activity monitor 809 may be hosted on runtime server 804 and may be integrated with ARE 805 without departing from the spirit and scope of the present invention.

ARE 805 may also communicate with a separate activity monitor 809 as shown in this example distributed to server 808 to better aid discussion of separate functions. Activity monitor 809 is adapted to monitor activities of customers and non-registered site visitors for the purpose of gathering data to create useable statistics across multiple categories relative to the activities of customers and, in some embodiments, relative to the activities of non-service-registered friends and family members of those customers who may visit the site to look at projects or otherwise browse published projects created by those customers. Activity monitor 809 may monitor all of the activity occurring within the service domain, such as at the service Website (not illustrated), and during project creation, editing, and transaction processes through a graphics user interface (GUI).

Server 808 has connection to a data repository 810 adapted to contain, at least, client navigation and usage statistics. In one embodiment navigation and usage statistics may be gathered from non-registered users such as friends and family of registered users who visit the service domain such as a Website, portal, social interaction page, project publication page, and so on. Activity monitor 809, in this embodiment, works in the background independently from ARE 805 to monitor all users and to collect data about those users and activities they engage in at the service site domain. Activity monitor 809 includes a processing component for creating statistics formulated under several categories. One such category is usage of assets such as repetitively used content contributions, themes, stickers, frames, styles, etc. Another possible category of data relates to a user actively liking or disliking an asset or contribution. Site navigation patterns of users through the service domain represent another possible category for gathering data and forming statistics. Still another data category is sales data relative to projects created at the service, for example, the current best-selling themes.

Activity monitor 809 creates statistical information about data it has collected and store the information in data repository 810. As activity monitor 809 creates new statistics, the data in repository 810 is updated and older data that is obsolete under any category may be purged. A time window for keeping data may be imposed as some categories may fluctuate widely in the amount of and relevancy of statistics depending on season, trend factors, or other like factors of change. For example, the theme "Mothers Day" and related creative assets and usage statistics would not be relevant during the time just before "Fathers Day", but become relevant again around the next "Mother's Day" season.

In prioritizing creative assets, the system, which may leverage ARE 805, attempts to present to the customer the best-fit assets the system can offer for what the customer's goals are in the way of project creation. ARE 805 may run for each user who is actively creating and or editing a project. In one embodiment, ARE 805 may communicate with a customer, making pre-project recommendations before the customer initiates a project if there is some indication of the intent of the customer. When ARE 805 is called to recommend assets to a user, it may access data repository 810 to obtain statistics relative to a theme, theme category, layout, and associated individual assets like stickers, photos, etc. that may be presented in prioritized fashion for that user. If the best, most likely accepted items are presented to the user first, less work will be required of the user to create a project.

The system may determine, for example, which existing template would be best for the user by looking at statistics formed from sales data and numerical analysis. In one example, assume that there are two photos arranged on a user's page for remixing. A category for data gathering could be data about history of all purchased books having layouts with 2 landscape photos arranged on them. Candidate layouts then may be prioritized further to narrow the field down to a few layouts that would best serve the customer. Template or layout categories may be filtered further by narrowing the selection criteria based on related themes to the current project being worked on.

Prioritized assets may be presented to a user in a sidebar of the graphics user interface. Activity monitor 809 includes at least a function for assessing and recording the usage statistics of digital assets used by the overall client base. Activity monitor 809 also includes a function for monitoring and recording the navigation behaviors, usage patterns, and content contributions of all or individual ones of users operating through the at least one GUI or visiting the service domain. ARE 805 functions to gather the prioritized digital assets for presentation according to analysis of statistical data recorded by activity monitor 809.

In one embodiment, a layout fabrication engine (LFE) 811 is provided to run on RS 804. LFE 811 is adapted to dynamically create or remix the layout of a canvas based on input from asset recommendation engine 805. In this way, a user may see the recommended assets and a preview of what the layout will look like using the highest prioritized assets like background, photos, stickers, frames for photo slots, text box styles, and other items. One component of such an engine is a machine learning routine that learns from a library of prioritized assets including photos, stickers, and other prioritized assets and is adapted to study page layouts containing these assets. The routine aids layout fabrication by providing intelligence relative to how best to position those assets such as photos, for example, and how best to compliment those assets with other assets like stickers. One example of such an optimization is mining metadata from prioritized assets like photos to create relevant captions for those photos. In one embodiment, location data and time data might be leveraged to provide a relevant caption for a photo, for example, if a photo is taken in New York City at 12:00 PM, then a relevant caption might be "New York City at Night", or "Midnight in New York City".

The system, in some embodiments, includes a physics simulation engine 807 for simulating motion dynamics for items placed in a canvas layout.

Figure 9:
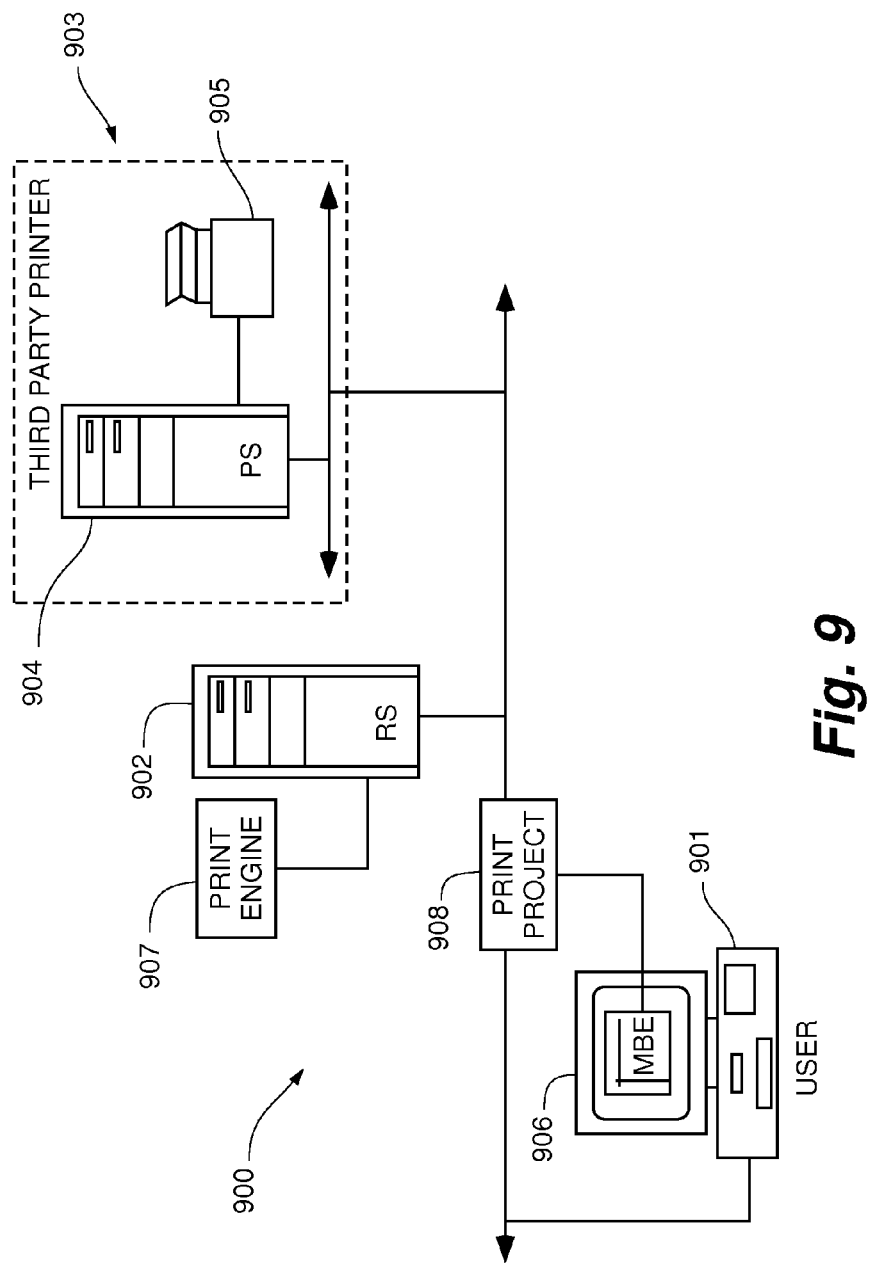
FIG. 9 is an architectural diagram illustrating a printing network, according to an embodiment of the present invention.

Finally, FIG. 9 is an architectural diagram illustrating a printing network 900 according to an embodiment of the present invention. Printing network 900 includes a user 901 connected online to a runtime server 902. Runtime server 902 is analogous to runtime servers previously described in this specification. Runtime server 902 includes a digital medium coupled thereto and adapted to contain all of the SW and data required to enable server function.

When user 901 is editing a project using a MIXBOOK editor (MBE) such as MBE 906, for example, the user is connected in session with server 902. As such, the user may decide to print a finished project such as a photobook by invoking a printing option such as print project option 908 illustrated in exploded view. Such an action invokes a printing engine 907 that is responsible for rendering the user's project in a ready state for printing according to a final end product selected by the user.

The printing engine sends output files for printing to a third-party printing service 903. Printing service 903 represents any online printing service. Third-party printer 903 includes a printing server 904 and a connected printer 905 representing printing capability. Printing engine 907 is a flash based that is enhanced to produce high resolution output files to print. Print engine 907 is a single print engine that is involved from the point of creating a project to the point of printing out the project.

A flash-based print engine has some drawbacks that need to be overcome in order to print larger high resolution files. Outputting large format prints for printing from a flash based editor is very difficult to do. The inventors provide enhancements that enable the system to take flash content and produce a near pixel-perfect reproduction of a user's work in the high resolution formats that professional printers normally require. Traditionally print systems take the back end data and then recreate the content for printing through a second engine such as a Java-based print engine or a C-application. Print engine 907 is a point for point engine and can re-create content at any dots per inch (DPI) required by the printer.

In one embodiment, gutter areas of printed products are optimized for view after print. In most situations, a traditional printed book having a gutter area will have content sucked into the gutter area where it is hard to view, or there will be a color strip applied to the gutter area whereby the color strip appears somewhat unprofessional. Print engine 907 functions to solve the above problems by optimizing the size of the gutter area and content displayed on a page before printing. In particular, the system of the invention implements a unique method of gutter size calculation and content display logic for printable products.

Based on other content optimization algorithmic results, a gutter calculation algorithm calculates the best size for the gutter based in part on the aspect ratio grouping. The gutter area is intelligently sized in order to minimize the amount of content that is not viewable on printed book products due to the glue that lies in the gutter between two pages on a given spread.

The gutter sizing algorithm works in conjunction with a content sizing algorithm to balance the two extremes, one being no gutter allowance, and the other being too much gutter allowance. No gutter allowance results in content hidden by the glued area in between pages. Too much allowance causes the area defined as gutter to be displayed visibly to the user.

Exemplary Embodiments for Illustrative Purposes

The language in the examples or elaborations below are context-specific embodiments, and should not be construed to limit the broader spirit of the present invention.

To help a user in creating a photobook, the present invention automatically inserts content into an automatically selected design for the user. Automatic insertion of content greatly helps in autoflow/autofill algorithms and in design updates, without a need to re-start designing a book from scratch each time when a user wants to update to a new design. Content refer to photos, text and inputs from the user (user inputs, user interactions, behavioral observations, etc.).

Content is analyzed along with a selected layout and a selected design of a book. Content analysis uses (A) image information automatically derived by the system ("automatic image information"); and (B) image information derived though user's interactions or behavioral observations ("observed image information"), as discussed in greater detail below. Based on the information from (A) and (B), the system performs: (C) automatic photo grouping; and (D) automatic content insertion into designs.

A) Automatic Image Information Derived by the System

A.1) Photos: For photos, the invention will analyze images to determine:

1. Saliency: Saliency is a most relevant part of an image as determined by image analysis or user's behavioral observations. By using saliency detection, the invention can store the areas of the photo that are of interest. These areas can utilize progressive reduction algorithm for saliency boxes. A saliency box is calculated by generating a saliency map, and searching an area that has a highest interest score. A searching box is adaptive. When a saliency area is small relative to a photo, the system relaxes the threshold to allow more contents in the area. When the saliency is large, the threshold is more strict.

2. Face: By using face detection, the system recognizes where faces are situated in a photo.

3. Computer Vision Analysis: The system applies image analysis to detect qualities of photos; the qualities include, such as, darkness, blurriness, colorfulness, simplicity, brightness, contrast, balance of light intensity over a photo, and harmony of color interaction.

4. Photo Similarities: Visual similarity of a photo relative to other photos.

5. Photo Information: This includes file name of a photo, dimensions (width and height), time of photo capture, make and model of the camera used in photography, aperture, shutter speed, exposure compensation, ISO, flash, focal length, and GPS location.

A.2) Text: For text, the system looks at:

1. Text Metrics: The system calculates space occupied by text in a textbox area. This includes width and height of the text at a given size. This way, the system can position the text with no cutoff by adjusting text size and other factors, such as, font.

2. Captions for photos: Captions can be provided with photos, either through an API or other format. Captions can be mined through image analysis and computer vision. For example, the system can run photos in a design page through an analyzer that predicts that a photo bears the Eiffel Tower, and puts a label "Eiffel Tower" alongside the photo on the page.

B) Observed Image Information Derived through User's Interactions: As a user interacts with selected photos in a design, the invention monitors the behavior of the user and learns about the content through the user's actions on photos. Here are some ways the invention learns the user's interests:

1. Photo Areas of Interest: By tracking the users' zooming and panning behavior, the invention can understand what areas of photos are more important over the computer vision algorithms that the present invention may use. For example, if the user takes a photo that is 400×300 pixels in size and pans/zooms the photo in a photo slot so that the bottom left quarter of the photo is showing in the photo slot, the invention learns that the bottom left 200×150 of the image holds importance to the user. The invention can further subtract off a buffer adjustment to the resulting subsection of the photo. By subtracting away from the resulting 200×150 part of the photo, the invention can make a best guess of an actual area of interest of the photo. This buffer adjustment can be calculated in the same way as when the invention seeks to add a buffer adjustment on top of the area of interest of a photo.

2. Photo Importance: If a user swaps photos on a page, the invention can use this information to understand photo importance/hierarchy on a design page.

C) Automatic Photo Grouping: Once photos are selected, the invention automatically arranges the photos into pages/spreads. If photos are more related to each other, they are more likely to be grouped together.

C.1) Multidimensional Grouping: For photos to be related to each other in a photo set, they may have to be either taken at a close time-range, or appears to be similar. The invention checks photo's timestamps and measures similarities between photo pairs to decide if photos should belong to a same page/spread or not.

1. Timestamps: Most of the modern cameras provide timestamp information. When photos are taken in an event, they are naturally close to each other by time. The invention applies algorithms to cluster the photos together by timestamps, and thus separate the photos into logical events.

2. Similarity: Timestamps alone may not always produce best results for grouping. The invention further groups photos by image similarities to place related photos together in a layout/design. For example, a user can take different sceneries within a close time range. By detecting similarities of photos, the invention can arrange the photos together by photo similarities or separate them into two groups of different sceneries.

3. Multiple cameras: When family or group photos are taken by multiple cameras, their timestamps may not be accurately aligned. For example, when people are traveling internationally, smartphone cameras are often automatically adjusted to a local time, while regular cameras are not often auto-adjusted to the time change: this may create several hours of time difference between the two camera types. The invention solves this misalignment in time difference: when multiple cameras are detected in a photo set, correct orders of all included photos ordered correctly. The invention assumes that a time offset is consistent for the photos from the same camera, and that different cameras may have different time offsets. Photos are sorted by timestamps for each camera.

4. The invention calculates a matching score as follows: for every photo, the invention searches nearby photos from a set of photos, and calculates photo similarities and time difference. A higher matching score is obtained if photos are similar and their timestamps are closer to each other. Summation of all individual photo matching scores is a score of the sequence in which the photos may be grouped. When all sequence scores are calculated, the invention picks the highest scored sequence. If the user has a third set of photos, the invention will repeat this process by treating the first two photo sets as already paired. The same calculation is used when multiple cameras are involved.

5. Photos without timestamps: Timestamps can be lost or not be available in some cases. In such cases, the invention sorts photos by natural orders, such as filenames, or uploading orders. Then, the invention progressively groups them by photo similarities until the photos form into book pages. The invention calculates similarity scores among all possible pairs of photos and then sorts these scores. Highly similar photos are grouped together first. The invention continues with the grouping process until a target group cluster numbers are achieved. During this process, the invention may need to evaluate similarities between two groups containing multiple photos. Group similarity is an average of all possible similar pairs of photos in photo sets.

6. Photo importance: Best photos are selected by its own group for highlighting purposes.

C.2) Aesthetic Rules for Grouping: Photo grouping is designed to create a pleasant-looking spread. Internet users like to focus on important photos in creating their books. Embedded in computer algorithms, the invention allows most attractive photos to be as a single spread in a group. The invention also adjusts spread counts by a number of photos. When there are fewer photos, the invention stretches the number of the groups to make the book appear having more pages. When there are many photos, the invention compresses the number of groups to not exceed the number of maximum pages available in a photobook.

D) Automatic Insertion of Content into Designs: Once content is accumulated from a server that is automatic image information, and a user's inputs that are observed image information, then the present invention can utilize a set of algorithms to lay the content onto a page. The algorithm(s) will utilize the following components described below:

D.1) Photo Level Ranking: By analyzing the information derived from a server (automatic image information) and user's inputs (observed image information), the invention determines how to place/position photos in a design so that a placement of the photos are in correct spots, and are panned/zoomed to optimal locations. Photos are scored with photo quality based on computer vision analysis. Computer vision analysis may be facial recognition-related analysis or not related to facial recognition.

Some photo/image heuristics that can be employed to calculate photo/image importance or image scores are:

1. Using identity and count of faces in photos to increase or decrease importance of a photo: Face recognition is used to identify faces in different photos. Each unique face is grouped together. Faces with higher frequency connote higher importance for that individual (subject) since they (faces) are more popular in a photo set. In some cases, the invention recognizes faces and give extra importance to main characters of a the photo set, i.e., a bride and a groom.

2. Reducing scores of photos for blurriness or undesirable traits (too dark or over exposed).

3. Using camera settings to determine the environment in which photos were taken.

4. Detecting artistic photography techniques, such as, lens flare or motion blur.

5. Using photo brightness, contrast and other photo characteristics.

6. Using machine learning to recognize important/relevant objects in photos, such as cars, pets, houses, and similar things that might indicate photo importance.

7. When a face is detected, face properties are evaluated. For example, if a person's face is smiling, a photo score is higher. Attributes, such as, size, position or clarity of a face affect a score of the photo. The invention combines attributes non-linearly to give a quality evaluation to a face.

8. A saliency box performs a target analysis on a photo. For example, within a saliency box, if there is a face, more importance is given to the face as the face is within the area of interest in the photo.

9. Scene detection, such as, landscape detection, mountain detection, indoor/outdoor detection, and naturalness or man-made detection can affect photo scores.

10. Using face detection related scoring, for example, when faces are detected from a photo, the invention combines size, location, smile confidence, orientation, clarity, and exposure to determine a facial quality score.

11. Combing all relevant scores to generate a final photo quality score.

D.2) Buffer Calculations for Best Fitting Content into Photo Boxes: The invention can draw a box around important parts of a photo. How a photo gets positioned inside a photo box can change based on the size of a relevant photo box that is available in a layout or design. For example, when face detection and saliency detection detect a person's face and body in a photo, the invention positions the photo at a photo box in a manner that the areas around the person's face and body are shown. This would be a case if the photo slot is large and if there is more real estate on a design page. This is implemented by employing a buffer over/above the box where the invention determines an area of interest in the photo.

In some cases, when a photo slot is as large as a page, the buffer around the area of importance of a photo may extend out to either a top, a bottom, a left, or a right edge of the photo. If a photo slot is very small, the buffer around an area of interest might be small or non-existent.

D.3) Area of Interest in a Photo: An area of interest in a photo is calculated by combining several computer vision processing techniques to build a box that includes all important parts of the photo (automatic image information), together with information from user interactions (observed image information). Computer vision processing techniques include, but are not limited to, face detection, face recognition, saliency detection (saliency boxes), user specified areas of interest, and so on.

D.4) Scoring for Inserting Photos into Layouts: A design contains multiple photo slots. Each photo slot may be modeled as a rectangle or square. The visible part of a rectangle is a focal box of a photo slot. A photo is processed for saliency and face detection, and each detected area is labeled and represented on the photo as a rectangle with a location on the photo.

For a photo slot to match a photo, the invention first zooms the photo so that the most of the saliency and face boxes are shown with a minimization of photo cut-off. Photo positioning with a photo slot is calculated at this step. Positioning strives to minimize the area that is cropped. If cropping is unavoidable, the area of interest is either centered to a saliency box, or best positioned to faces. Face cropping may be minimized to a smaller area. A matching score is a combination of photo area cut-off, saliency area cut-off, and face area cut-off. Each cut-off area has its own importance, where faces may have highest importance.

For each design to match a set of photos, photo permutation is a factorial of a photo set size or a number of photo slots. These calculations may be costly if there are many photos to match up with an equal number of photo slots. The invention performs a depth first search with limited branching to traverse possible matching patterns. For each permutation of photos, the invention combines individual matching scores together to get a score related to permutation. The depth search algorithm decides a best score selection and thus generate a best fitting for this design set, and this score can also be used to compare a matching fit with other design sets.

D.5) Determining a Best Design for Contents: In a case of an autoflow algorithm, the invention may need to insert content derived from a user into design pages. In order to this, below is an implementation of the heuristic:

1. The invention selects designsets for a theme.
2. The invention finds best possible designs from the designset that can fit with contents that are photos with or without text.
3. Using ranking algorithms and other heuristics, the invention determines a best fitting design from the designset.

D.6) Dynamic Text Insertion across Platforms: Software clients render text differently than photos. Text often behaves differently when trying to create books that are editable across multiple software clients. Text entered into a book through a browser might render as two lines of text. However, for example, when it is rendered on a specific user device, such as, a native APPLE IPAD client, text could show up in at least three lines. To alleviate this problem, when a user adds text to a page, the text is passed into a text processing engine that breaks it up into text lines. Each text line contains a string of text, its coordinates and size on the page. When the text is rendered on a different client, the client is responsible for slightly compressing character spacing for any text that exceeds the size of the line. By utilizing text metrics, the text to be inserted into textboxes on a design page will fit without requiring the text to cut off. The algorithm works as follows:

1. The textbox has a default size. Say, for example, size 16.
2. Check if the given text fits into the textbox, and check how it fits if it has to stretch to multiple lines.
3. If it does not fit, decrease the text size and see if the text fits (with size 15). If it still does not fit, decrease the size again until it fits.
4. If the system has to decrease the text size beyond a minimum threshold, say for example size 10, then it may be concluded that the text does not fit at all.

D.7) Positioning Photos in Photo Slots with Focal Boxes: A design may have content that are overlapping other content. This can happen for many reasons, but most likely will be for stylistics reasons. When an element is overlapping a photo slot, the photo may be repositioned in a photo slot so that the point of focus stays away from the over-lapping elements and thus keeps an adequate margin from these items. This is implemented by utilizing focal boxes. A focal box is defined on a layout or design as a rectangular area within a photo slot that is considered as "visible" or "unobstructed." In other words, it is the area on a design where the photo can be seen clearly. If a photo slot is completely uncovered, then this area would simply be the dimensions of the photo slot itself. A focal area can be represented by any shape, not just a box, as long as it is a continuous shape. Accordingly, the invention ensures that the photo is placed inside the focal box of the photo slot.

E) LayoutSets and DesignSets: After uploading images or photos, the present invention automatically creates a project by using the uploaded photos. The present invention creates canvases in the project by selecting appropriate designs, and fill photo slots and text slots in the selected designs by using computer algorithms that match contents to the designs.

For this automatic process of creating designs, the present invention builds a structure to keep the designs flexible, and maintains a consistent style (or theme) throughout the project (a collection of designs for a book creation). The present invention may create a design or design pages of a book in the following ways:

1. The present invention has LayoutSets which contain a collection of layouts. Each LayoutSet represents a different "style" of layouts, including but not limited to, such as, magazine layouts, signature layouts, and color blocking layouts.
2. A layout specifies a number of photo- or text slots in a page/canvas of a book, and their positions in the page or canvas. No styling (such as, frames, stickers, or backgrounds) may be applied on a layout. An initial page representation of the book or a page/canvas of the book is stored as a layout. A layout is also a barebone or skeleton presentation of a pre-design upon which a final design maybe implemented by adding styles or stylistic parameters.
3. The present invention has DesignSets which contain a collection of designs. Each DesignSet may be paired with at least one LayoutSet. This way, all designs in a DesignSet are build off of a layout from a corresponding LayoutSet. In this structure, every LayoutSet serves as a basis for many DesignSets. A design adds styles or stylistic parameters on top of a layout, styles including but not limited to, such as, stickers, frames, and backgrounds.

E.1) LayoutSets: In a LayoutSet, the positions of photos and text reflect a "de-stylized" approach, meaning, as default as possible. In a DesignSet, a user can tweak, adjust, and customize a design on top of the LayoutSet. In one embodiment, when a photo slot is close to an aspect ratio of 4:3, 3:4, or 1:1, the photo slot is made exactly of that aspect ratio: this may be a case when the photo slot is not part of a grid and is instead floating on a page or canvas. In another embodiment, a resizable frame may be applied to the photo slot.

E.2) DesignSets: Book designers or internet users may build a DesignSet from a LayoutSet. When there are styling properties which include styles or stylistic parameters which push the limits of a layout, the present invention has the ability to tweak, adjust, and customize a layout on a design-by-design basis. For example:

1. Textboxes can be resized if a designer wants to use a larger font size in a DesignSet.
2. Textboxes can be resized and moved if the designer wants to add a text background.
3. Photo slots can be extended or moved to accommodate elements in the background.

In some embodiments, the invention mines photos, metadata, use-case, and user data to extract useful information that will allow the process described here to decide how best to auto-create a media-based product. In one embodiment of the present invention the media-based product can be auto-populated using (F) image analysis (including meta-data in images), (G) use-case analysis, and/or (H) user analysis or a subset of these.

Before getting into the details, the inventors would like to remind the reader of the high-level goals:
1. Get users a book that they are thrilled with ordering as quickly and effortlessly as possible.
2. Average creation time should be 15-20 minutes
3. Median creation time should be 10 minutes
4. 2-3× the completion rate of book creation For the people that choose to edit their projects, this should be optional, so that even without editing, a beautiful photobook is created. The following assumptions were made by the inventors based on years of experience in producing photobooks:
1. The majority of users with the intent on buying who started but did not purchase photobooks didn't complete the purchase because of difficulties in producing a finished product—either too many decisions added anxiety to the process, and/or it was simply too time consuming.
2. By simplifying and streamlining the process, the inventors recognized that they can open up the potential user base to the mass population of people who have never embarked on the process of creating photobooks.
3. If the notion of a perfect photobook exists for a user in which they would have to tweak for hours to perfect, then a nearly perfect photobook achieved in less than a minute (through auto-book creation) would excite the user enough into ordering the book. Note: Some of this behavior can be seen with the photobooks purchased from the inventor's mobile app, where users are purchasing books created in a button click on a mobile device, but totally lacking of text, layouts, backgrounds, or any editing options whatsoever.
4. Most mainstream users would stay away from page-by-page editing and instead would find high-level editing more useful. That is, the unaddressed market would prefer to edit their book in a view devoid of layouts and styling, and one where the user can understand how his or her photos and text transition from page-to-page at a high level.

After analyzing purchase history, the inventors found that 80% of books fall into the following general categories: Wedding, Family, Baby, Travel, Year in Review, and Everyday.

Given this, the present inventors developed a system and method for automatic photobook creation by utilizing a use-case identifier which indicates a particular use-case for the photobook. That is, the inventors realized that a handful of use-cases comprise the majority of books created and the inventors can, therefore, build experiences that cater to these use cases. This means that custom business logic and heuristics per use-case category can be developed that can lead to substantial increased usage given past usage data. With these custom heuristics, the inventors developed a system that can select and organize all the content involved in building of a photobook automatically with a minimum of user involvement.

F) Auto-Creation of Books using Image Analysis

F.1) Image Analysis Examples: image analysis, auto-corrections/auto-adjustments, and meta-data extraction is performed. By leveraging computer vision, the present invention can extract relevant information from a photoset and perform automatic adjustments. Some examples of the relevant information are: analysis, detecting similar photos, and using the similarity algorithm, for example to:
1. Detect faces in photos that are for example, smiling, or blinking.
3. Identify the people in the photos (allow us to group by faces), for example, in a wedding book, who is the bride and groom?
4. One-off characteristics detection, for example, in this wedding book, which photos have the bride in her dress?
5. In a travel book, which photos, if any, take place on a beach?
6. Detect undesirable photos, and remove them from the photobook, for example, blurry photos, bad lighting, or eyes closed.
7. Detect where the focus and important part of the image is.
8. Use image saliency detection to make auto-corrections and auto-adjustments.
9. Auto-orient photos for users.
10. Auto adjust photos for color, brightness, and contrast.
11. Automatically fix redeye.

In addition, use EXIF metadata, for example to:
1. Prepopulate a wedding date from the date when the most of photos were made.
2. If photos contain GPS coordinates as most smartphone photos do, then extract (reverse geocode) country/city/resort name if location and resort are in a travel book, and pre-populate a book name, such as for example, "Lake Tahoe 2012."

Other kinds of EXIF data can include, but are not be limited to: camera manufacturer, camera model, orientation (rotation), software, date and time, YCbCr positioning, compression, x-resolution, y-resolution, resolution unit, exposure time, f-number, exposure program, Exif version, date and time (original), date and time (digitized), components configuration, compressed bits per pixel, exposure bias, max-aperture value, metering mode, flash, focal length, maker note, flash pix version, color space, pixel x-dimension, pixel y-dimension, file source, interoperability index, and interoperability version.

F.2) Object Detection Examples: According to the present invention, various image analytics may be used to detect various objects in the image data. These image analytics may be configured to detect any number of objects. Some illustrative objects, for example, are: presence of people, presence of pets, wedding cakes, vehicles, groups of people, sizes of objects, face detected (a face is a close-up of a person), type of vehicle detected (for example, a suv, convertible, etc.), animals, structures (for example, the Eiffel Tower, the Pyramids, a wedding chapel, etc.), sports items (for example, a basketball, a football, a volleyball, etc.), landscapes, indoor vs. outdoor, nighttime vs. daytime, and features of nature (for example, trees, lakes, beaches, etc.). The present invention is not limited to these objects. Various object detection processes may be used to determine one or more objects within the images and group based on the detected objects, and all are within the scope of the present invention.

G) Auto-Creation of Books Utilizing Use-Case Analysis: a usecase analysis of the book is obtained, either manually by asking the user, or automatically through one or more heuristics. By asking the user for the usecase of their book, the process can do a better job of improving the processes used to build the book for the user. For example, in the "wedding" usecase, the process can append additional heuristics to: identify photos with the wedding cake; identify photos with the altar; determine if the photos are chronological, and add special text boxes throughout the book, for example, to label the "groom" and the "bride."

Some examples of usecases which a user may manually select or which may be determined through automatic heuristics include, but are not limited to: a wedding, travel to countries, cities, climates, etc., travel to tropics, travel to Africa, travel to Paris, travel to the beach, a night out on the town, hanging out with friends, a baby is born, a year in review, water activities at a pool, beach, lake, or a snow—ski trip, a road trip, and so on.

H) Auto-Creation of Books Utilizing User Analysis: a user analysis is performed on the expected user of the finished product. By leveraging FACEBOOK connect, or other social media platform, the process can use information about the user to help automatically detect different properties in the photo set. For example, if a user logs in with FACEBOOK, the process can examine the user's profile picture to get a sample of his or her face. From this, the process would know which photos in a set are of the user. If, for example, the process knows the user wants to make a wedding book (use-case) and the user's face shows up the most out of anyone else and the process knows they are a male (from FACEBOOK), then the process can infer that this person is a groom.

Some examples of user data which may be determined through automatic processes such as those described above (or which a user may manually enter) include, but are not limited to: gender, age, location such as geo-location by GPS, city or state location, relationship status, friends, schools attended, physical characteristics (for example, height or weight), facial features, and so on.

Example Printed Embodiments of a Photobook

Example printed embodiments of the present invention are photobooks with one or more photo strips, having one or more photographic images inserted (mounted or set) into one or more cover surfaces of the photobook, wherein the one or more photographic images of each photo strip is essentially flush with the cover surface. A photo strip of an embodiment of the present invention may be inserted into a channel on a cover surface and may be attached using an adhesive or other bonding method. Photo strips for the present invention may be created in any manner and can have images of any kind arranged in any pattern, shape, or form.

In one preferred photobook embodiment of the present invention the one or more photographic images of the photo strip on the cover occupy only part of the cover surface of the photobook and are essentially flush with the photobook cover. The observer obtains a crisp visual experience of one or more photographic images with a photobook cover, providing a border flush with the one or more photographic images of each photo strip. This embodiment of the invention solves a visual depreciation problem common in the prior art that is felt when the photobook cover is very thick and relatively cumbersome, if the front cover is a thick picture frame mounting. Another problem with prior art photobooks occurs when the cover images are significantly recessed below the photobook cover's surface since this causes the cover image to appear walled-in. Another prior art problem is the cover image of a photobook can become dim or too light-reflecting if the image is placed behind a protective window of plastic or glass, or is laminated, or embedded in plastic.

An example photobook embodiment of the present invention is depicted in FIG. 10, which has a front cover 114; and a back cover edge 106. A stiff flat spine 102 connects the front cover to the back cover. There are inside pages 110 for photographic images, and the pages are interconnected with first and last inner pages attached to the inside of the front and back covers. Also, FIG. 10 depicts a frontal view of a photobook cover channel 112. This channel runs from the top edge 108 to the bottom edge 118 of the front cover 114. Channel 112 is the location where a photo strip is attached (mounted or set) using an adhesive or other means, so that the photo strip and its images are essentially flush with the front cover 114. Channel edge 116 indicates the depth of channel 112. The channel depth from the cover surface is made to be the thickness of the photo strip plus the thickness of an adhesive layer or other attachment means that has a thickness.

Figure 10A:
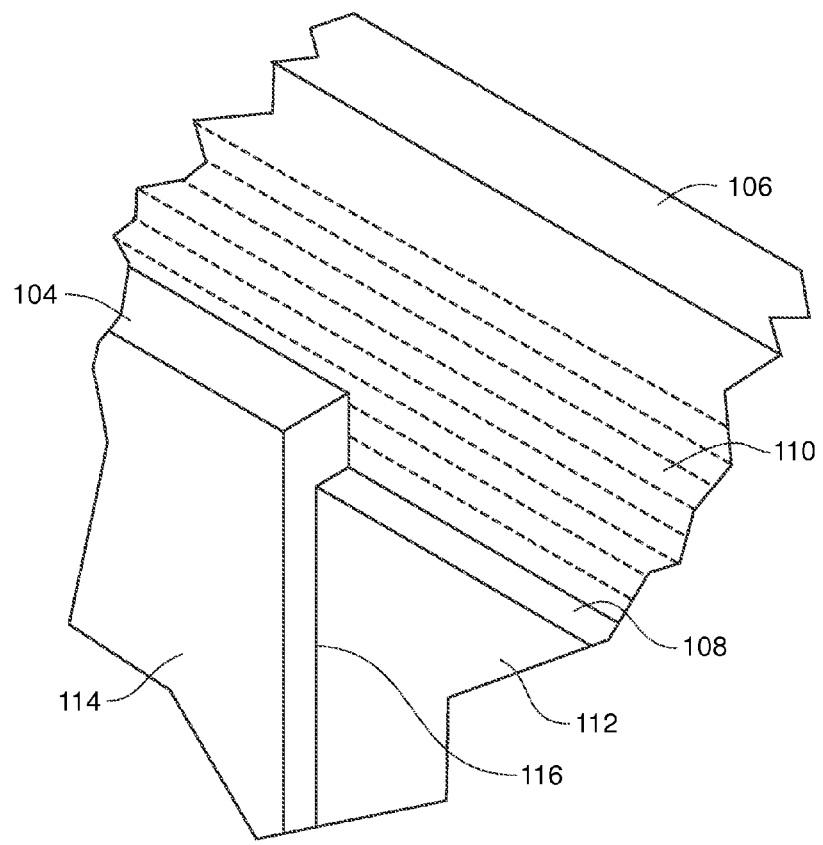
FIG. 10A depicts an expanded frontal view of a section of the top edge of the example photobook embodiment of the invention depicted in FIG. 10.

FIG. 10A depicts in greater detail various features of an example photobook of the present invention. Depicted are top edge 108 of channel 112, vertical edge 116 of channel 112, front cover 114, top edge 104 of front cover 114, top edge 106 of back cover (not shown), and top view of inside pages 110. FIG. 10A also provides details of three front cover channel surfaces: recessed top edge 108 of channel 112, channel side wall (edge) 116; and front cover channel 112, into which the photo strip would be mounted. When a photo strip is set into the channel 112 and wraps over top edge 108, the photographic images of the photo strip are essentially flush with top edge surface 104 as well as with cover surface 114.

Figure 10B:
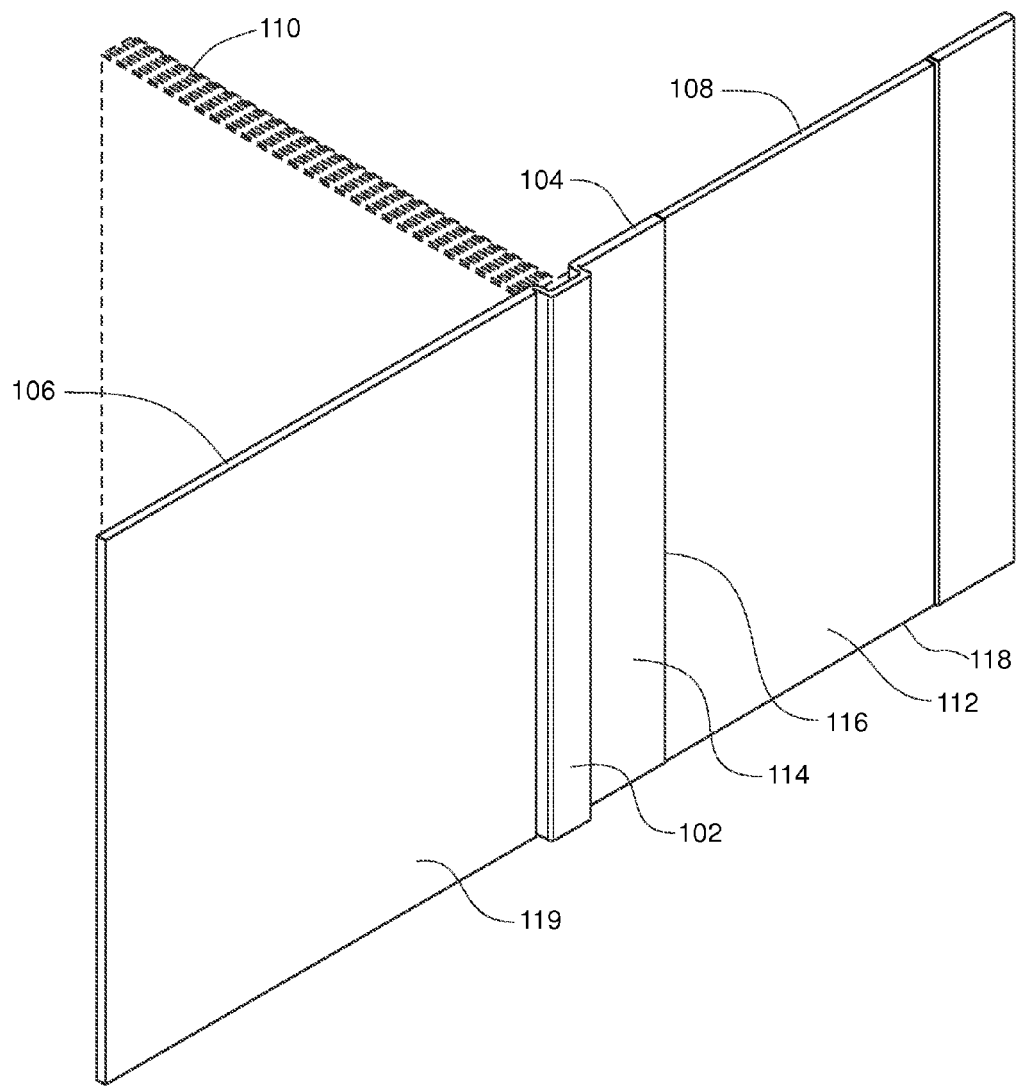
FIG. 10B depicts a front cover, a back spine, and back cover of an example photobook embodiment of the present invention before a photo strip has been set into a channel.

FIG. 10B depicts a view of the example photobook front cover 114, back cover 119, top edge 116 of back cover 119, flat stiff spine 102, channel 112, top edge 104 of front cover 114, top edge 108 of channel 112, bottom edge 118 of channel 112, side 116 of channel 112, and inside pages 110. Top edge 104 of the front cover has a top edge channel 108 in the mid-section of top edge 104. Front cover 104 continues with a channel 112 from the top edge channel 108, and channel 112 traverses a central area or mid-section of the front cover, with channel 112 continuing to bottom edge channel 118 of the front cover. A photo strip (not shown) could be set down into channel 112 and photo strip's top end could be wrapped over recessed top edge 108, while photo strip's bottom end could be wrapped over recessed bottom edge 118, so that the photo strip is essentially flush with the front cover 114, and top edge 104 surface, as well as bottom edge surface of the front cover 114.

FIG. 11 depicts a frontal view of an example embodiment of a photobook of the present invention, similar to the photobook depicted in FIG. 10, with a hypothetical single image on a photo strip 122 set in a channel 112 (not visible), so that the image and photo strip with the image are essentially flush with front cover 114, as suggested at locations 124, 126, and 126, where an edge of the photo strip in adjacent to a part of front cover 114 and at location 120 for top edge 104 of the front cover.

FIG. 12 depicts a frontal view of an example embodiment of a photobook of the present invention similar to the photobook depicted in FIG. 11, however the photo strip depicts hypothetical borders for eight photographic images as a collage 128. The photo strip is essentially flush with front cover 114, as suggested at locations 121, 125, and 126 of front cover 114.

FIG. 13 depicts a frontal view of another example embodiment of a photobook of the present invention, with a photo strip 127 depicting hypothetical borders for twelve photographic images as a collage set in the single channel on the front cover 114 (not visible), so that photo strip 127 is essentially flush with cover 114, as indicated at locations 120, 124, 126, and 129 of front cover 114. FIG. 13 photo strip 127 is wider than collage 128 of FIG. 12.

Figure 14:
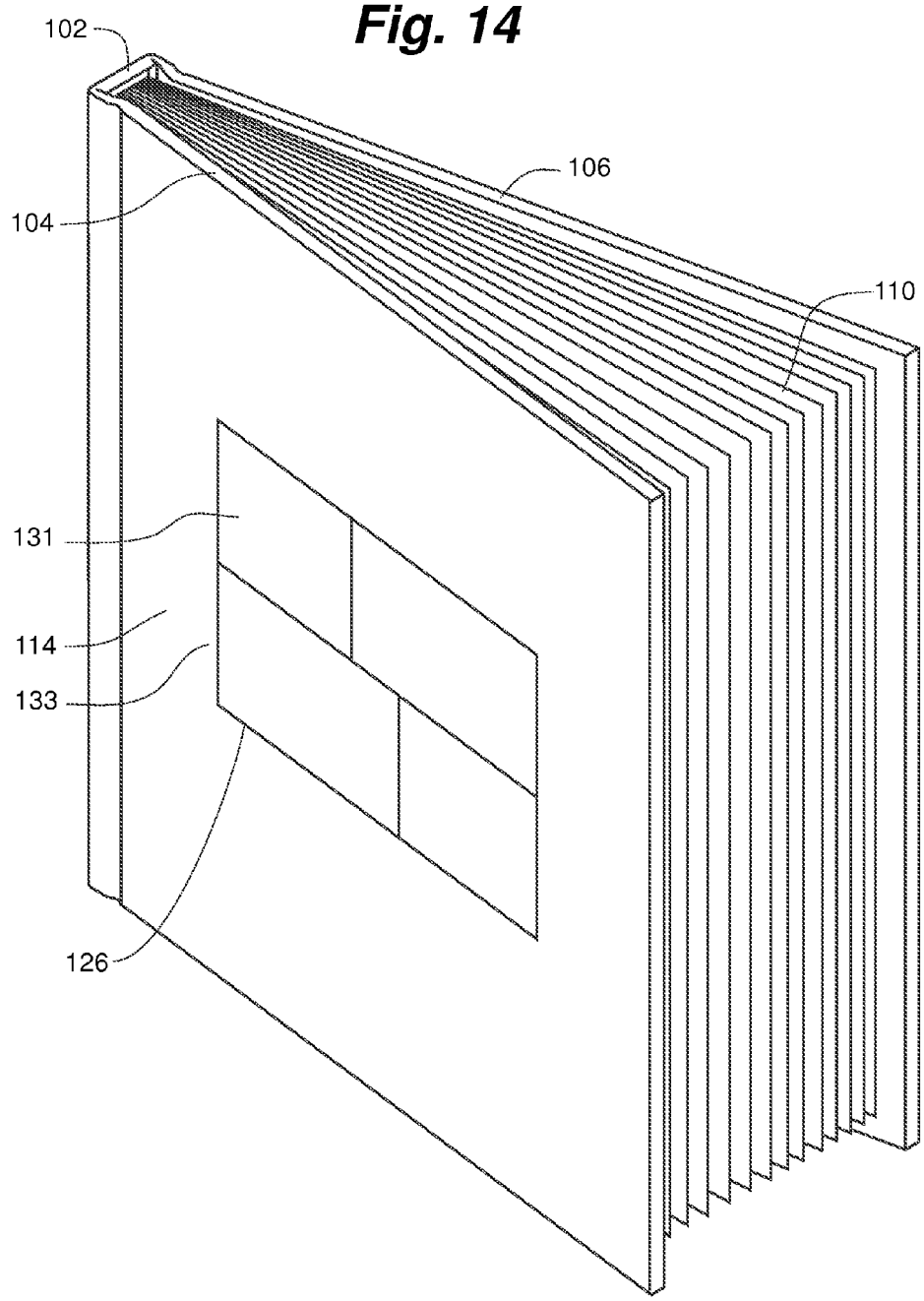
FIG. 14 depicts a frontal view of an example photobook embodiment of the present invention with a photo strip set into a channel located in the center of the front cover of the photobook so that the photo strip is essentially flush with the cover. Lines in the photo strip are hypothetical borders for four photographic images as a collage.

FIG. 14 depicts a frontal view of an example embodiment of a photobook of the present invention with a photo strip 131, depicting hypothetical borders for four photographic images as a collage set in the single channel on the front cover 114 (not visible), so that photo strip 127 is essentially flush with the front cover, as indicated at locations 126 and 133 of front cover 114.

Figure 15:
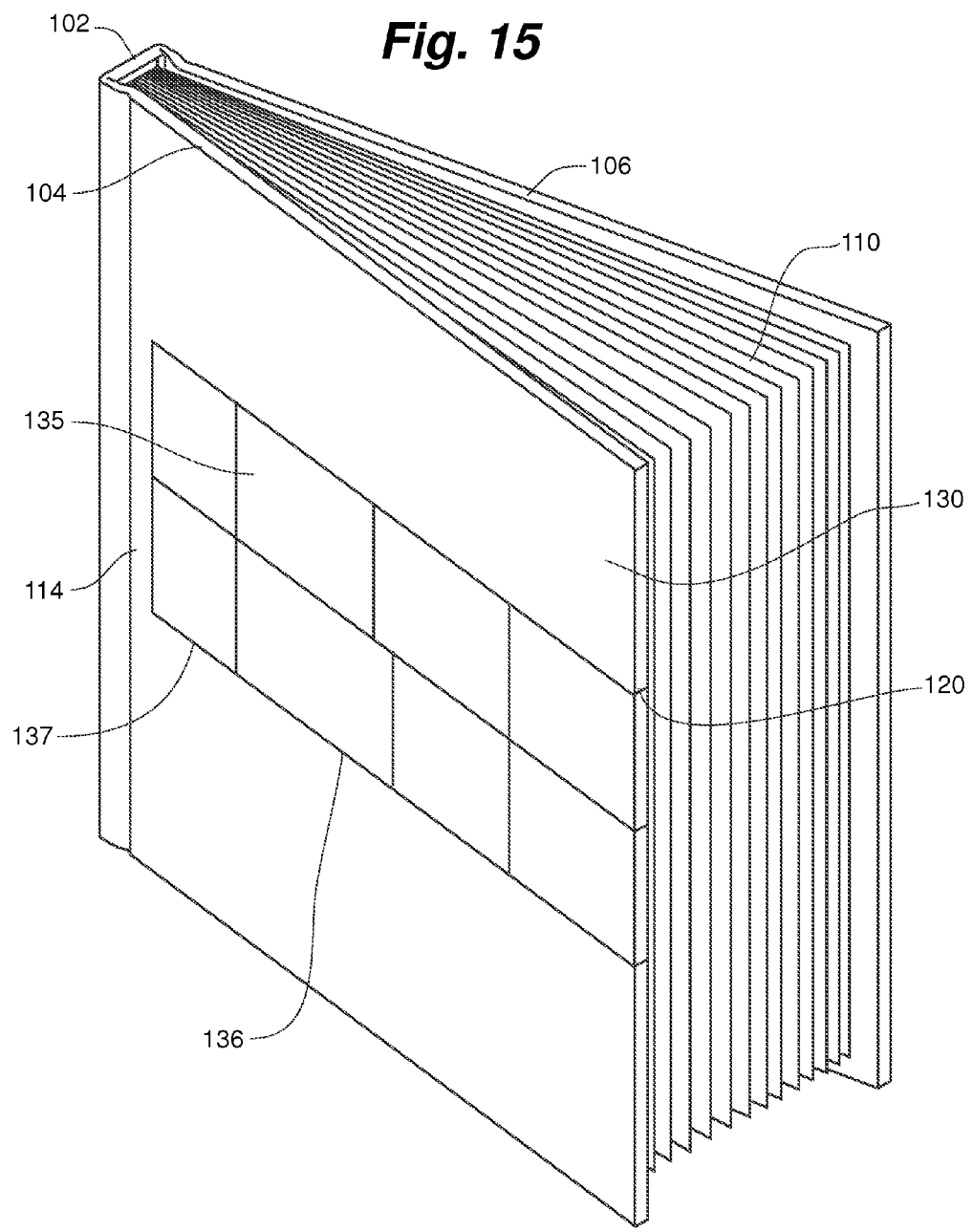
FIG. 15 depicts a frontal view of an example photobook embodiment of the present invention with a horizontally-oriented photo strip set into a channel located in the center of the front cover of the photobook so that the photo strip is essentially flush with the cover. Lines in the photo strip are hypothetical borders for eight photographic images arranged in a rectangular collage. The photo strip and channel continue over the right edge of the front cover so that the photo strip remains essentially flush with the edge.

FIG. 15 depicts a frontal view of another example embodiment of a photobook of the present invention, with a horizontal photo strip 135 in the single channel on the front cover 114 (not visible), so that photo strip 135 is essentially flush with cover 114 as indicated at locations 120, 136, and 137 of front cover 114. Photo strip 135 depicts hypothetical borders for a collage (montage) of eight photographic images. Photo strip 135 wraps over the right side edge 120 of the front cover 114.

FIG. 16 depicts a frontal view of another example embodiment of a photobook of the present invention, with circular photo strip 141 set into a circular front cover channel (not visible), so that the depicted hypothetical photographic image is essentially flush with the front cover 114, as suggested at locations 139 and 143. It is contemplated that there could be multiple images in circular photo strip 141 as a montage, and there could be multiple circular photo strips set in multiple circular channels on cover 114 of the present invention.

Figure 17A:
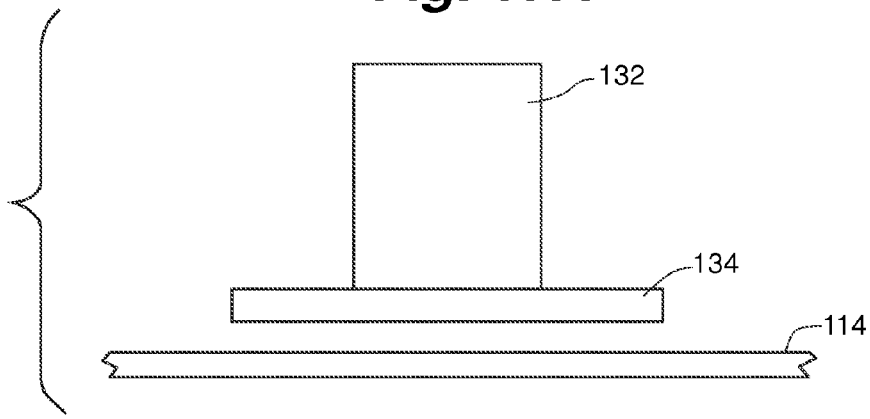
FIG. 17A, FIG. 17B, and FIG. 17C depict sequential steps of one method that could be used for making a channel into which a photo strip could be set.
Figure 17B:
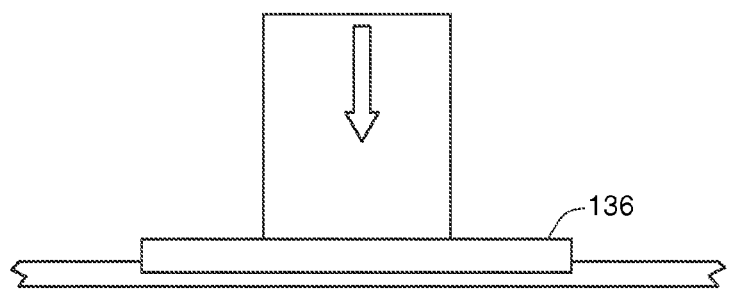
Figure 17C:

FIGS. 17A, 17B, and 17C depict in cross-section three sequential steps of one method embodiment of the invention for making a channel 112 in a photobook cover 114 (or more simply cover material 114). Any method for making a channel 112 in a cover or a cover material may be used, including cutting, hammering, abrading, dissolving, or melting (depending upon characteristics of cover material 114). FIG. 17A depicts press 132 with a stamp 134 above a cover material 114. Stamping area of stamp 134 is selected to have a shape similar to the shape of the photo strip intended so that the channel 112 has the shape of the photo strip. One or more channel shaped stamps used in conjunction to make a complex shaped area channel may be complex, when the channel needs to have a complex shape. For example, as one of skill in the art can infer from FIGS. 10-16, and 19-23 depictions of channel shape (or photo strip shape), that the channel may have a shape selected from the group consisting of a square, a rectangle, a triangle, a pentagon, a hexagon, a polygon, a circle, an ellipse, a rounded vertices polygon, a shape having a hole, and a combination thereof. Fundamentally, a channel needs to be made to have a depth matching the total thickness of the photo strip and its adhesive attaching it in the channel. Next, as depicted in FIG. 17B, press stamp 136 is compressing an area of the cover material. Then, as depicted in FIG. 17C, press stamp 136 has been withdrawn from cover material 114, and cover material 114 has a resulting channel 112 therein.

By experimentation with the stamping machine variables, including stamp pressure, temperature, moisture, and duration of compression, the channel can be formed in a particular flexible cover material, with a depth matching the thickness of the photo strip and its underlying adhesive layer, so that the photo strip can be set into the channel and is essentially flush with the cover material surface. The time required and amount of pressure needed to form the channel varies with the properties of the cover material, as is known in the art; sometimes termed de-bossing. For different photobook cover materials, the pressure needed by the stamp press to form the channel in a cover material may vary considerably. It is expected that for some soft materials, the stamp pressure would need to be only 0.1 psi. It is expected that for very hard materials, the stamp pressure might need to be as high as 20,000 psi (pounds per square inch). Another factor is the conditioning of the cover material, such as its temperature, stretch and hydration. A temperature may be increased to soften some synthetic cover materials before their pressing to form the channel. Natural fibers and leathers may be softened by a controlled aqueous hydration of the material prior to pressing the material. In addition, a softer material surface may be placed beneath the cover material when stamping the cover material to make the channel.

For some photo book embodiments of the present invention, it is preferred to make the channel in the cover material (such as a flexible cover material) before wrapping the cover material onto the front cover and back cover of the photobook. One method is to then attach the photo strip to the flexible cover material. It is contemplated, however, for some embodiments of the present invention that the strip is first attached by some means such as an adhesive, and then the photo strip attached to the cover material is pressed so that the photo strip becomes essentially flush with adjacent cover material. This method assumes that the photographic images on the photo strip can tolerate such stamping.

In other embodiments of the invention, the method for making the channel in the cover of the photobook further comprises applying two strips of a hard material to the sides of the cover to make cover walls for a channel. The channel-making method may combine this method of building up the walls channel with stamp press compression of a flexible cover material being wrapped over the two strips of the hard material. In some preferred embodiments of the present invention, the photobook has a cover comprising a rigid cover board material wrapped with a flexible cover material. The flexible cover material in such embodiments has been pressed (or de-bossed) using a stamping process as exemplified in FIGS. 17A, 17B, and 17C to create the needed channel. The flexible cover material is wrapped around the rigid cover board material to make the cover and then the photo strip is mounted (set) into the channel of the flexible cover material.

Figure 21:
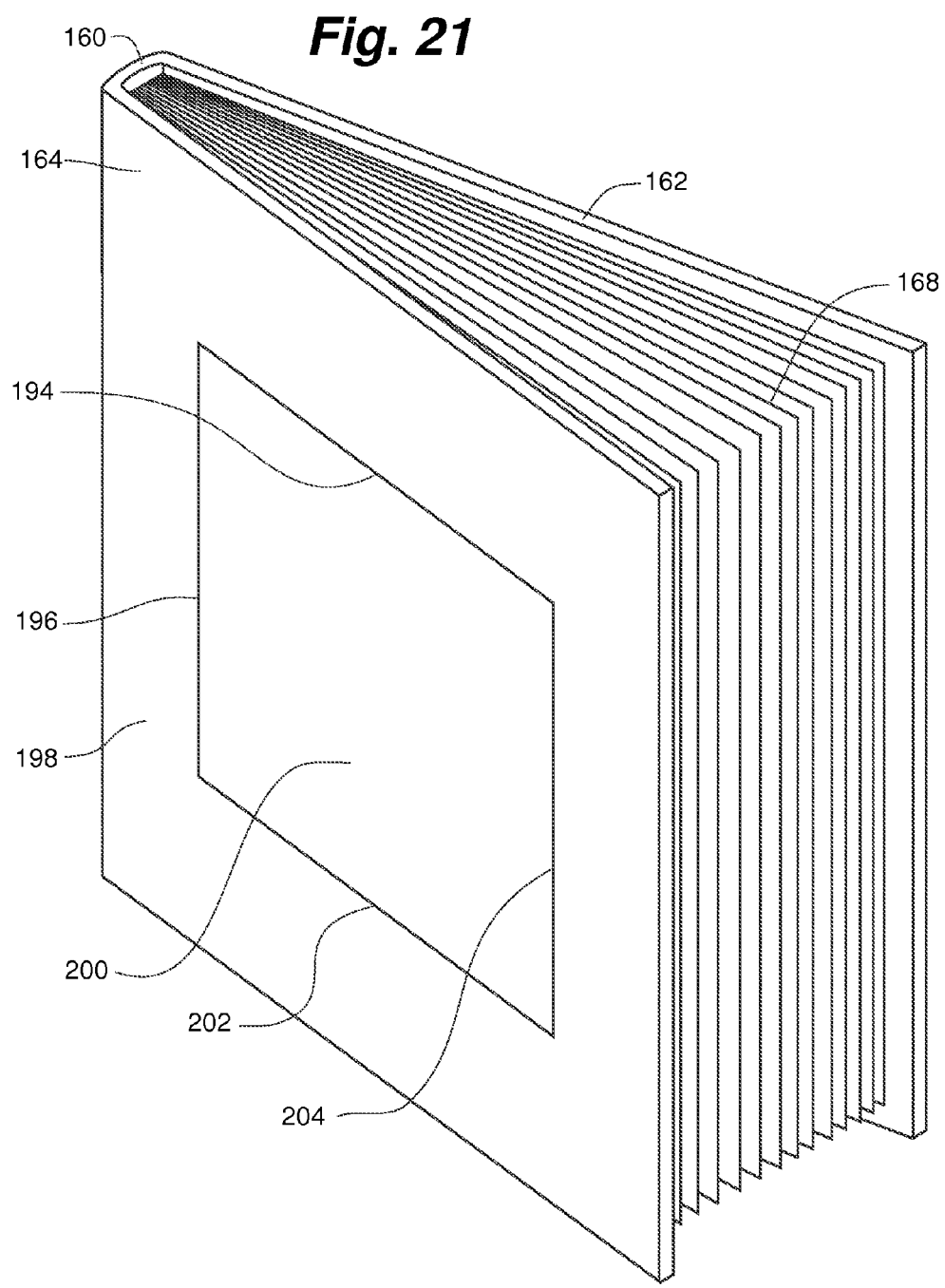
FIG. 21 depicts a frontal view of an example soft spine photobook embodiment of the present invention with a photo strip set into a channel located in the center of the front cover of the photobook so that the photo strip is essentially flush with the cover.

In general, the photo strip on a cover of a photobook of some embodiments of the present invention does not cover the entire cover. As depicted in FIG. 11, the cover-mounted photo strip and the cover's channel may be the length the photobook cover. As depicted in FIG. 14, FIG. 16, and FIG. 21, the photo strip and the sub-surface channel may have only a central location on the cover with a cover margin on all sides of the cover. A preferred horizontal width for the photo strip mounted on a cover of the photobook is between about 20 percent to about 80 percent of the horizontal length of the cover, more preferably between about 40 percent to about 70 percent of the horizontal length of the cover, and most preferably between about 50 percent to about 65 percent of the horizontal length of the cover.

Preferred embodiments of the photobook have a photo strip with a plurality of images in the form of a collage or montage. In another embodiment of the present invention, the photo strip and the channel run the length of the cover and both the strip and the channel continue around edges of the photobook with the photo strip terminating on the inside of the cover. It is contemplated that in some embodiments the photo strip material could be mounted in a long channel so that the images of the photo strip mounted in the channel continue from one cover, across the spine, and onto the other cover. A preferred flexible cover material, for some embodiments of the photo book, is thick synthetic leather. Any cover material, including glass, metal, plastic, or wood could be used provided that a suitable method is used to make the channel for the photo strip.

Figure 18A:
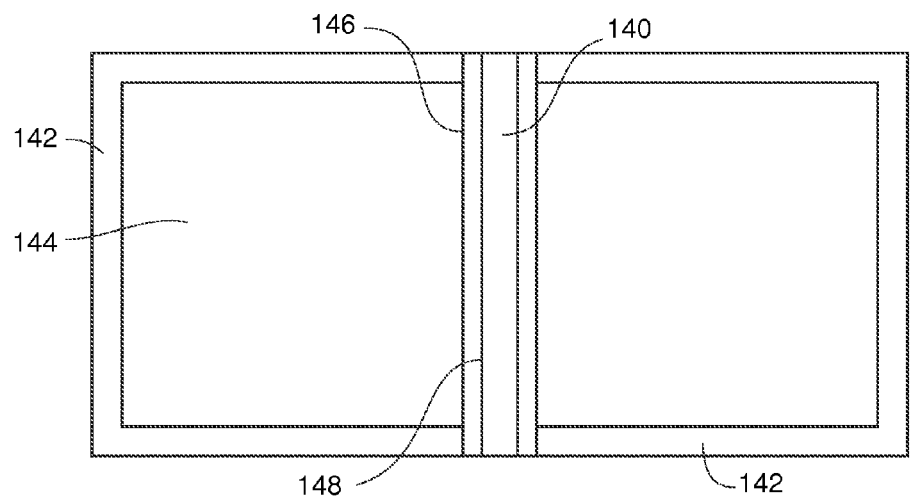
FIG. 18A and FIG. 18B are steps in a method for adding a strip of a cover material to the inside surface of a spine of a photobook of the present invention.
Figure 18B:
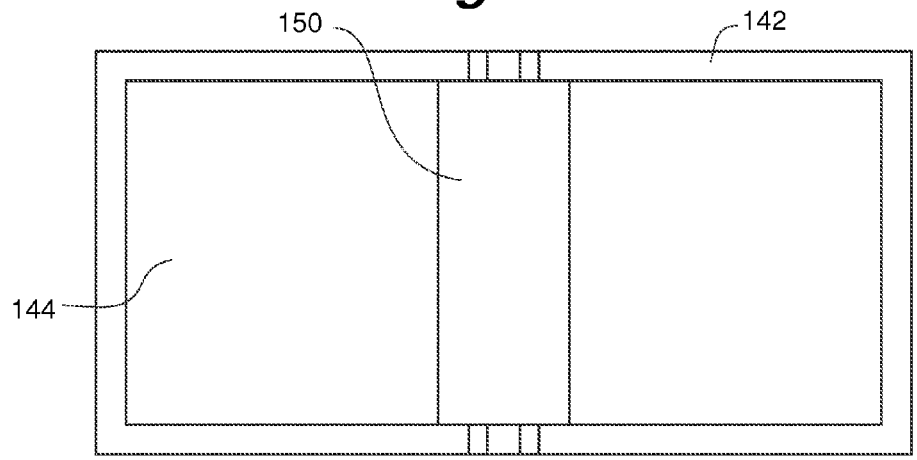

FIGS. 18A and 18B illustrate an option for some embodiments of the present invention in which an extra strip 150 of the cover material may be attached to the inside 140 of the spine 148 of the photobook 142. This extra strip 150 can be used to cover up unevenness along the spine 148 caused by the flexible cover material being wrapped from an outside cover surface to an inside cover surface 144. This extra strip 150 may also help to make the inside of the spine flatter.

Additional cover materials, such as padding 146, may be added to the front or back covers as needed to enhance the feel of the photobook.

A rigid cover board used for the present invention may comprise a material such as a high impact fiberboard, laminated plywood, a chip board, a metal sheet, a plastic sheet, and any combination thereof. A chip board is a preferred rigid board cover material. For some embodiments of the present invention, a rigid cover board has a thickness between 0.01 to about 1 inch, and preferably between 0.1 to about 0.5 inches. In one embodiment of the present invention, the front cover has the same thickness as the back cover, and uses a 0.125 inch thick chip board with a 0.0625 inch thick strip on top of the sides of the chip board.

It is contemplated that a cover material which may be used for the present invention may be selected from the group consisting of a wood, a wood chip board, a plastic, a metal foil, a foam material, a soft fabric, a metallic fabric, a fiberglass, a polymer, a fiber, a laminate, a glass, a ceramic, a leather, an animal skin, a mineral, a stone, a transparent material, a reflective material, an opaque material, a translucent material, a soft material, a padded material, a woven material, a waterproof material, a synthetic material, a flexible material, a rigid material, a rough material, a smooth material, a fragrant material, a velour material, a silk material, and a combination thereof.

To attach a photo strip to a cover material, such as, for example, a flexible or rigid cover material, an adhesive, a bonding agent, or another attaching means is used for making some embodiments of the present invention, with the proviso that adhesive, bonding agent, or other attaching means has a compatibility with attaching the photo strip to the cover material. An adhesive, a bonding agent, or another attaching means with photobook materials should not be used which may stain, degrade, or discolor the photobook cover material or the photo strip. For some embodiments of the present invention, one method for attaching the photo strip to a channel on a cover of the photobook comprises: printing the photo strip on an adhesive backed paper or applying an adhesive to the back of the photo strip; and setting the photo strip in the channel so that the adhesive holds the photo strip to surfaces of the channel.

One method for securing the photo strip and creating a clean finish is to terminate a photo strip on the inside face of the front cover after the photo strip has been wrapped over edges of a cover. In some embodiments of the present invention, the photo strip is terminated on the inside face of a cover after the photo strip has been wrapped over the cover edges by approximately 0.5 inches from a cover edge. The photo strip can of course be permitted to wrap further on the back side of the front cover. Optionally, the photo strip may display photographic images only on an outer side of the cover, with distal ends of the photo strip displaying no photographic images but colored to match or contrast with the coloration of the photobook cover.

The present invention preferably uses end sheets, which are a material layer that is attached to inside surfaces of the front and back cover of the photobook. An end sheet can be decorated in any manner for the present invention. Instead of normal solid color end sheets, optionally, a photo collage or a montage of some of the photographic images from pages of the photobook may be printed on the end sheets of a photobook of the present invention. End sheets may be comprised of a cover material, including a paper material. The end sheets and photographic images of the photo strip can be a collage of images, symbols, designs, and the like, and can have transparency, filters, overlays, and any other effects. In addition, there can be borders between photographic images within a photo strip and within end sheets. Any kind of variation in photo collages known in collage art methods can be used on a cover surface or end sheet. Cover surface and end sheet surface designs can, for example, include various grids, equal sized boxes, rectangles, polygons and rounded shapes, fractal patterns, and the like, in a repeat or random pattern.

Additionally, the present invention further includes one or any combination of the following embodiments: (1) embodiments wherein the photo strip is straight and has a constant width; (2) embodiments wherein the photo strip is located centrally on the first cover; (3) embodiments wherein at least two edges of the photo strip are located at edges of the first cover; (4) embodiments wherein edges of the photo strip cross an edge of the first cover, and a part of the photo strip is located on an outside face of the first cover and a part of the photo strip is located on an inside face of the first cover; (5) embodiments wherein edges of the photo strip are within edges of the first cover; (6) embodiments wherein the photo strip displays the one or more photographic images on the photo strip as a collage; (7) embodiments further comprising one or more printed photographic images essentially on a cover material of the photobook; (8) embodiments wherein the one or more printed photographic images is essentially on a material comprising a paper; (9) embodiments wherein one or more of the covers of the photobook comprises a rigid board cover material; (10) embodiments wherein one or more of the covers of the photobook comprises a flexible cover material; (11) embodiments wherein one or more of the covers of the photobook comprises a rigid board cover material wrapped with a flexible cover material; and (12) embodiments wherein the flexible cover material has one or more channels into which one or more photo strips are inserted so that the one or more photographic images of one or more inserted photo strips are essentially flush with the cover surfaces next to the inserted photo strips.

For some embodiments of the present invention, the photobook comprises: a front cover with a channel having an area less than the area of the front cover; a photo strip set into the channel; a back cover; a spine; and pages for photographic images, wherein the pages are situated between the front cover and the back cover, and wherein the photo strip set into the channel displays a single or multiple photographic images which are essentially flush with the front cover.

Some embodiments of the present invention are a photobook, wherein the channel and the photo strip set into the channel on the front cover continue over a top edge and over a bottom edge of the front cover, the photo strip having ends terminating on backsides of the front cover, and wherein the photo strip in the channel at each edge is essentially flush with edge surfaces to each side of the photo strip.

Some embodiments of the present invention are a photobook, wherein the photo strip has a location on the front cover selected from the group consisting of a central location, a right side location, a left side location, an upper location, a lower location, and a combination thereof.

In some embodiments of the present invention, the photobook further comprises: a second channel located on the back cover of the photobook; and a second photo strip set into the second channel, wherein the second channel has an area less than the area of the back cover, and wherein the second photo strip set into the second channel displays one or several photographic images which are essentially flush with the back cover.

Some embodiments of the present invention are a photobook, wherein the photo strip has a shape selected from the group consisting of a square, a rectangle, a triangle, pentagon, a hexagon, a polygon, a circle, an ellipse, a rounded vertices polygon, a shape having a hole, and a combination thereof.

Some embodiments of the present invention are a photobook, wherein the photo strip displays one or more photographic images on the photo strip, the one or more photographic images selected from the photographic images on pages situated between the front cover and back cover.

Some embodiments of the present invention are a photobook, wherein the photo strip displays a plurality of photographic images on the photo strip as a collage.

Some embodiments of the present invention are a photobook, wherein the front cover, the back cover and the spine are comprised of separate pieces of a rigid board cover material.

In some embodiments of the present invention, the photobook further comprises a piece of a flexible cover material, wherein the separate pieces of the rigid cover board material of the front cover, the back cover, and the spine are wrapped with the piece of the flexible cover material.

Some embodiments of the present invention are a photobook, wherein the back cover has a padding material.

Some embodiments of the present invention are a photobook, wherein the front cover and the back cover have the same thickness.

Some embodiments of the present invention are a photobook, wherein the front cover has equal numbers of channels and photo strips, with a photo strip set into each of the channels so that the one or more photographic images of each of the photo strips is essentially flush with the front cover neighboring each photo strip. In some embodiments of the present invention, there is more than one photo strip set into a channel on the photobook covers.

In some embodiments of the present invention, the photobook further comprises one or more printed photographic images as a decoration which is essentially on a cover surface.

Some embodiments of the present invention are a photobook, wherein the photobook has a cover material with an area of the cover having a type of decoration selected from the group consisting of a graphic design, a logo, a hologram, an emboss, a deboss, an emblem, an imprint, a brand name, a trademark, a name, an event name, a wedding symbol, a Christmas symbol, a Valentine's Day symbol, a Graduation Day symbol, a New Baby symbol, a title, a number, a date, a decorative symbol, a math symbol, a physics symbol, a foreign letter character, a word, the word Montage, a printed design, a painted decoration, a surface treatment, a ribbon, a metal ornament, a plastic ornament, a leather strip, and a combination thereof, wherein the surface treatment may be selected from the group consisting of a surface treatment with a dye, a surface treatment with a stain, a surface treatment with an opaque ink, a surface treatment with a paint, a surface treatment with a bleach, a surface treatment with a tanning chemical, a surface treatment with a wax, a surface treatment with an oil, a surface treatment with an acrylic spray, a surface treatment a silicone, and a combination thereof.

In some embodiments of the present invention, the photobook comprises: a front cover with a photo strip; a back cover; a spine; and pages for photographic images, wherein the pages are situated between the front cover and the back cover, the spine connected to the front cover and to the back cover, wherein the front cover, the spine, and the back cover are comprised of one or more separate rigid board cover materials with one or more flexible cover material wrappings, wherein the one or more flexible cover material wrappings has been pressed to provide a centrally located channel on the front cover, the centrally located channel having an area less than the area of the front cover, wherein the photo strip is set into the channel, and wherein the photo strip displays a single or multiple photographic images which are essentially flush with the cover.

Some embodiments of the present invention are a photobook, comprising: a front cover with a photo strip; a back cover; a spine; and pages for photographic images, wherein the pages are situated between the front cover and the back cover, wherein the front cover and the back cover are comprised of one or more separate rigid board cover materials with one or more flexible cover material wrappings, wherein the one or more flexible cover material wrappings have been pressed to provide a centrally located channel on the front cover, the centrally located channel having an area less than the area of the front cover, wherein the photo strip is set into the channel, and wherein the photo strip displays a single or multiple photographic images which are essentially flush with the cover.

ROUNDED OR SOFT SPINE EMBODIMENTS OF THE PHOTOBOOK

Figure 22:
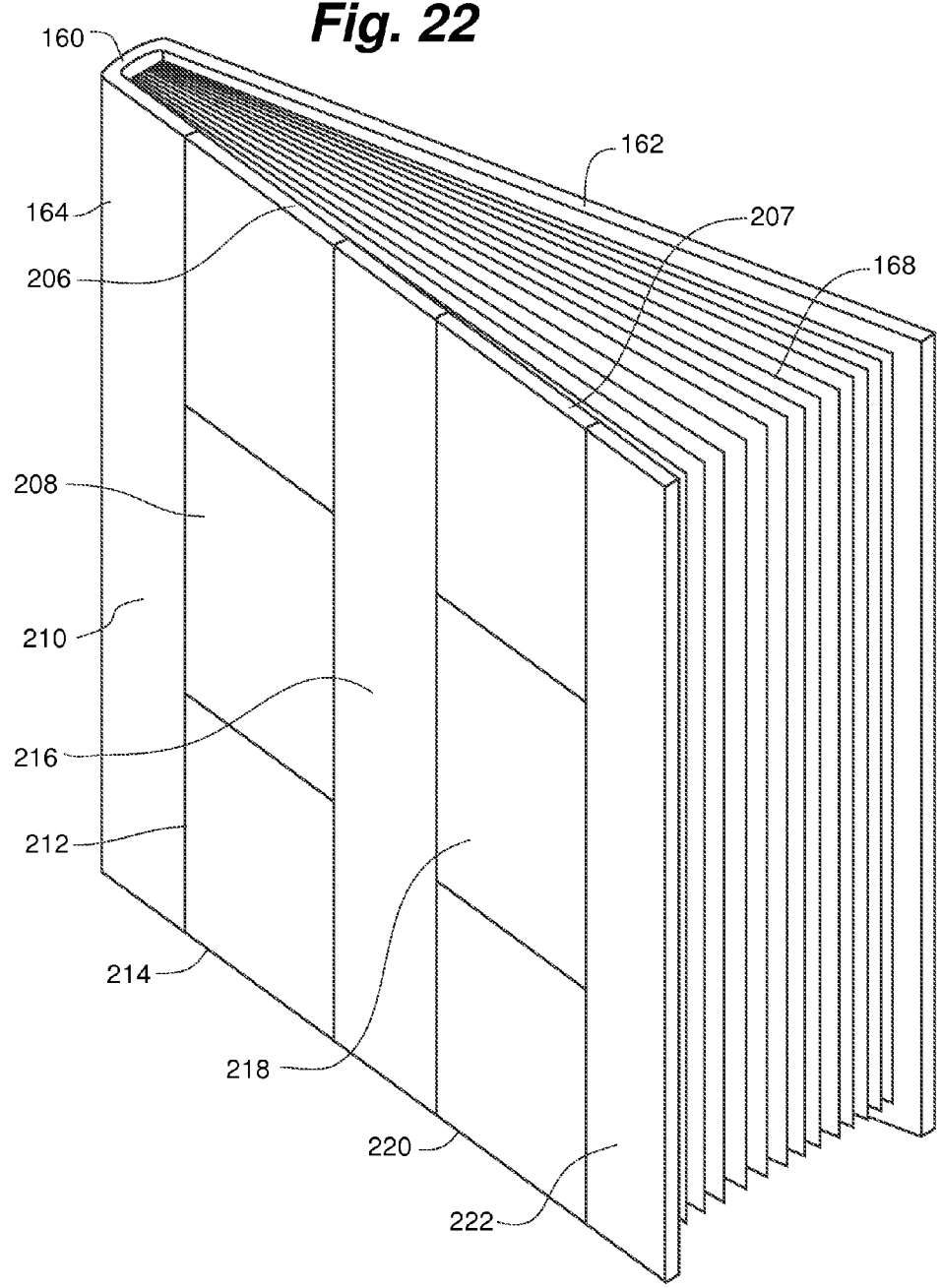
FIG. 22 depicts a frontal view of an example soft spine photobook embodiment of the present invention with two photo strips so that the photo strips are essentially flush with the cover.

In some preferred photobook embodiments of the present invention, the photobook has a rounded spine 160' which comprises a flexible cover material. See rounded spine 160 in FIGS. 19, 20, 21, 22, and 23. The spine 160, for example, may be made of the flexible cover material used on the front and back covers of the photobook. One aesthetic advantage of the soft spine photobook embodiments of the present invention is that the photo strip on the front cover (as depicted in FIGS. 21 and 22) can have equal-width panels and be centered on the photobook at the same time. In contrast, the flat stiff spine 102 photobook (as depicted in FIG. 11) can have equal-width front cover panels but at the same time cannot be centered with respect to the overall photobook.

FIG. 19 depicts a frontal view example of a photobook embodiment of the present invention prior to insertion of a photo strip into channel 170, which in this particular example vertically traverses the front cover, and over upper edge 166 and lower edge 174 of front cover 172. Additionally, FIG. 19 depicts front cover 172 connected to back cover 162 via spine 160. There is a flat area 164 on each cover side that smoothly transitions to become the rounded shoulders of the soft spine, unlike the embodiments with a flat stiff spine which are depicted in FIGS. 10, 11, 12, 13, 14, 15, and 16. FIG. 19 also depicts that inside pages 168 near the spine are functionally interconnected as a binding. The first and last inside pages of some photobooks are connected to the front and back covers of the photobook. The pages are connected together and to covers of the photobook. Channel 170 has a depth which can be inferred from the depiction of the channel depth at channel edge 176. Channel depth is made to be the same as the sum of the photo strip thickness plus the thickness of the adhesive that is used to attach the photo strip to the channel. In this way, the photo strip when mounted in the channel using the adhesive, is essentially flush with the cover of the photobook.

Figure 20:
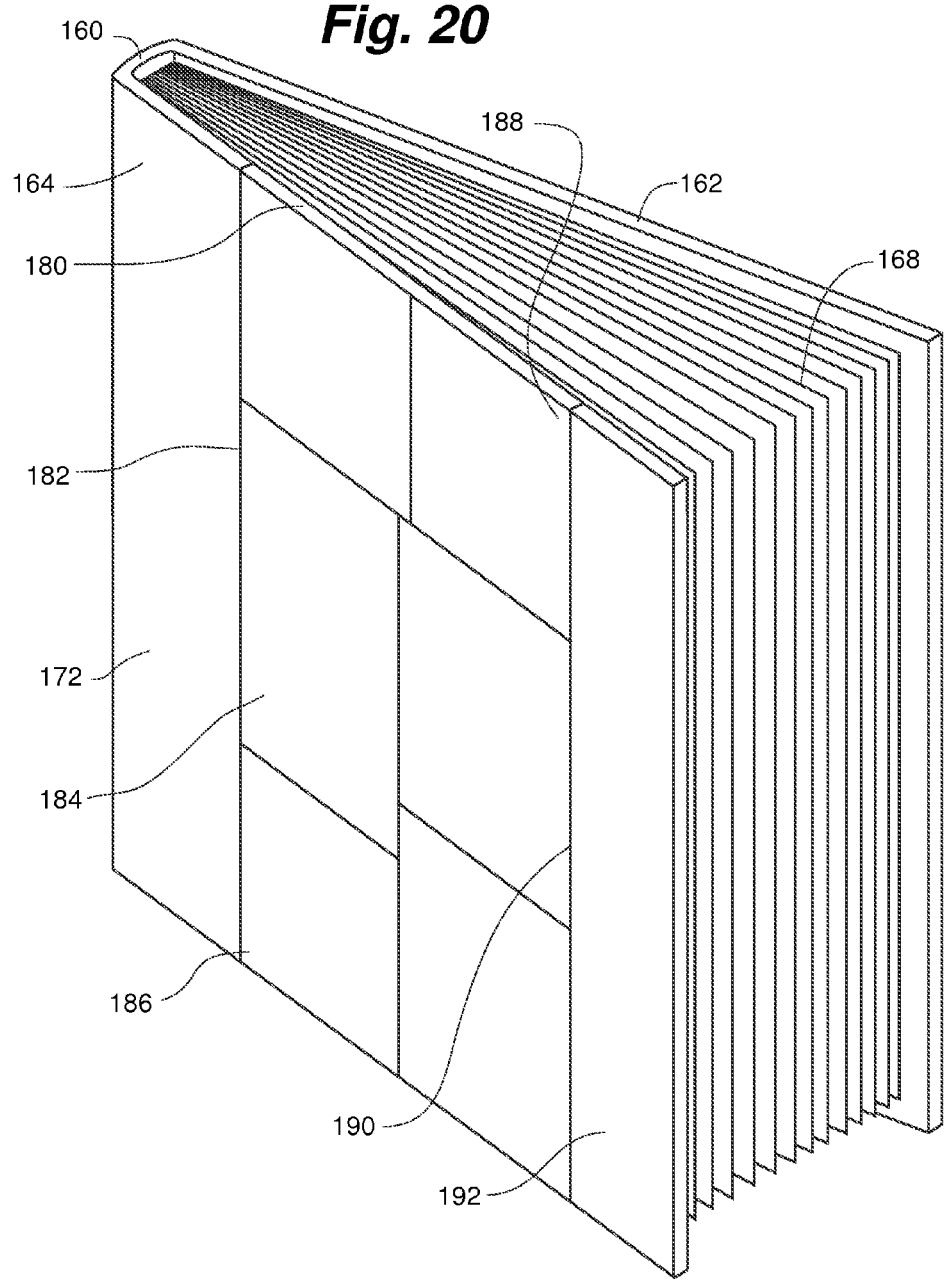
FIG. 20 depicts a frontal view of a soft spine photobook embodiment of the present invention with a photo strip set into a channel located in the center of the front cover of the photobook so that the photo strip is essentially flush with the cover. Lines in the photo strip are hypothetical borders for six photographic images in a collage. The photo strip is wrapped over top and bottom edges of the front cover and is essentially flush with the bottom edge and top edges of the cover.

FIG. 20 depicts a soft rounded spine photobook embodiment of the present invention, with a photo strip 184 set into channel 170 (not visible here) between front cover panels 172 and 192. Related FIG. 19 depicts channel 170. In FIG. 20, the example photobook embodiment of the present invention has a photo strip which traverses the front cover vertically after wrapping around top edge 180 and the bottom edge. In FIG. 20, the depicted photo strip 184 is depicted as a hypothetical collage of six photographic images (specific photographic images not depicted), where only hypothetical borders have been drawn within the photo strip 184. The hypothetical six photographic images of the photo strip 184 are depicted set in a channel 170 and are essentially flush with the surfaces of cover panels 172 and 192. In FIG. 20, the photo strip is essentially flush with the cover, for example, at upper right corner 188 of the photo strip, at mid right side 190 of the photo strip, at mid-left side 182 of the photo strip, and at bottom left edge 186 of the photo strip. In other embodiments of the present invention, it is contemplated that there be multiple photo strips set into each cover channel with each photo strip having one or more photographic images. In addition, it is contemplated for the present invention that the photobook can be of any size, and dimensions, such as in terms of its height, width, and the thickness overall, and of its covers.

FIG. 21 depicts a rounded spine 160 example photobook embodiment of the present invention, having a central rectangular photo strip 200 with a single image (specific photographic image not depicted). In this example, the photo strip does not reach an edge of the front cover. The photo strip is essentially flush with the cover 198, for example, at mid-right side 204 of the photo strip, at mid-left side 196 of the photo strip, at top mid-side 194, and at bottom mid-edge 202 of the photo strip.

Illustrated in FIG. 22 is a rounded spine 160 photobook embodiment of the present invention, having a first photo strip 208 located adjacent to a left side 210 of the front cover and a second photo strip 218 located adjacent to a right side 222 of the front cover, with each of the photo strips continuing over top edges 206, 207 and over bottom edges 214, 220 of the front cover. Each photo strip is depicted as having three hypothetical photographic images, as is suggested by the lines within the photo strip (specific photographic images not depicted). FIG. 22 depicts the photographic images of photo strips 208 and 218 as essentially flush with cover surfaces 210 and 222, and as essentially flush with the top edge of the front cover.

Figure 23:
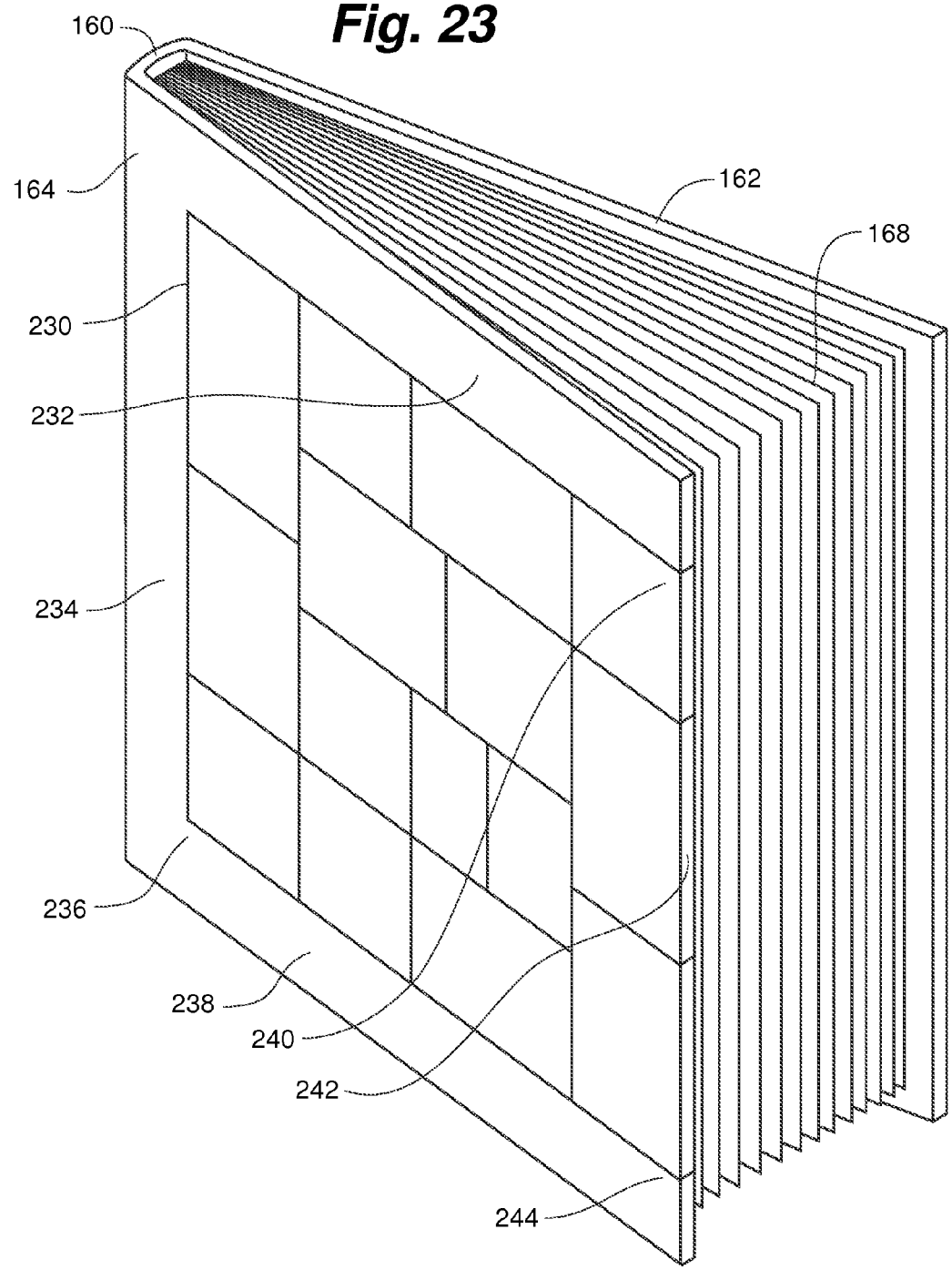
FIG. 23 depicts a frontal view of an example soft spine photobook embodiment of the present invention with a photo strip set into a channel on the front cover of the photobook so that the photo strip is essentially flush with the cover. Lines in the photo strip are hypothetical borders for fifteen photographic images as a collage. The photo strip is wrapped over top and bottom edges of the front cover and is essentially flush with the bottom edge and top edges of the cover.

FIG. 23 depicts a soft rounded spine 160 photobook embodiment of the present invention, which has a photo strip 240 depicting fifteen hypothetical photographic images as suggested by the lined boxes within the photo strip. The fifteen photographic images (specific photographic images not depicted) are essentially flush with the cover surfaces 232, 234, and 238, as is identified at locations 230, 232, 234, 236, 238, and 244. Note that photo strip 240 traverses the front cover horizontally and wraps only over right cover edge 242.

Finally, FIG. 24 depicts a binding area 250 of a photobook embodiment of the present invention, which has a binding decoration 252 situated between binding 250 and soft rounded spine 160. Spine 160 serves as a connection between covers 254 and 256 of this photobook embodiment. In some embodiments of the present invention, the binding decoration 252 is woven fabric or finely knit fabric, simulating a traditional book binding. The binding decoration is contemplated to be of any suitable shape or material, so that the photobook binding appears to look like a traditional hard copy book binding Also contemplated are various other photobook embodiments of the present invention having one of more channels of other shapes and positions in which are set one or more photo strips. In general, note that at least one edge of the photo strips set in a photobook cover of the present invention is essentially flush with a cover surface of the photobook. Additionally, the present invention is contemplated to include embodiments of photobooks of any size, and of any height, width, and length dimension, including cover thickness, and number of photo pages.

In some photobook embodiments of the present invention, the front cover, the back cover and the connection between the front cover and the back cover are comprised of separate pieces of a rigid board cover material, wherein the connection between the front cover and the back cover is a spine.

One method embodiment of the present invention is a method for making a photobook, the photobook comprising a photo strip set in a channel on a cover of the photobook, the channel having an area less than the area of the cover, the photo strip displaying one or multiple photographic images, so that the one or more photographic images are essentially flush with the cover, the method for making said photobook comprising: (a) cutting pieces of a rigid cover board material for a front cover, and a back cover of the photo book; (b) cutting a piece of a flexible cover material to a size and to a shape for a wrapping of the piece of the flexible cover material over the pieces of the rigid board cover materials for making the front cover, and for making the back cover; (c) making a connection between the front cover and the back cover; (d) making the channel by pressing a channel shaped stamp into the piece of the flexible cover material, the channel shaped stamp having a shape and dimensions of the photo strip to be set into the channel; (e) holding the channel pressed into the piece of the flexible cover material over the rigid cover board materials at a cover location selected for the channel, while wrapping the piece of flexible cover material over the front cover and over the back cover; (f) setting the photo strip having one or more photographic images into the channel of the piece of the flexible cover material so that the one or more photographic images of the photo strip are essentially flush with the cover adjacent to the cover location of the channel; (g) printing photographic images on pages to be situated in the photobook between the front cover and the back cover; and (h) situating the pages with the photographic images in the photobook between the front cover and the back cover.

For some embodiments of the present invention, there is a binding of the pages of the photobook. The binding of the pages of the photobook may be attached to the front cover, or may be attached to the back cover, or may be attached to both the front cover and the back cover. In some photobook embodiments of the present invention, the method of making the connection between the front cover and the back cover creates the spine of the photobook. The outermost connection between the front cover and the back cover is also known as the spine of the photobook.

Additional Example Embodiments of the Present Invention

Example 1

One embodiment of the present invention is a non-transitory, computer-readable storage medium storing executable instructions, which when executed by a processor of a server, causes the processor to perform a process for creating a photo-project over a communications network, the instructions causing the processor to perform the steps of:
 (a) establishing a client-server connection between the server and a computing device over said communications network;
 (b) receiving a plurality of images from said computing device through an upload to said server, and storing said plurality of images in a data repository connected to said server;
 (c) performing an image analysis on said plurality of images to derive automatic image information from said plurality of images;
 (d) grouping said plurality of images based on said automatic image information;

(e) inserting content, comprising a subset of the images, into said photo-project based on the grouping of said plurality of images to create an editable photo-project; and (f) presenting said editable photo-project to a user of said computing device enabling said user to edit the editable photo-project and order said photo-project, wherein said photo-project is a photobook comprising: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover.

In a related embodiment of the present invention, the storage medium causes the processor to perform the additional steps of:

(g) monitoring user interactions on said computing device while the user is manipulating said plurality of images to derive observed image information from said user interactions; and (h) automatically modifying an arrangement of content in said editable photo-project based on said observed image information to produce a final recommended design of the photo-project.

In another embodiment of the present invention, the storage medium causes the processor to perform a step of performing an image analysis on said plurality of images to derive automatic image information from said plurality of images, wherein said automatic image information is derived though one or more algorithms for: saliency detection, face detection, and photo similarity detection.

In another embodiment of the present invention, the storage medium causes the processor to perform a step of monitoring user interactions on said computing device while the user is manipulating said plurality of images to derive observed image information from said user interactions, wherein said observed image information is derived through analysis of said user interactions comprising: areas of interest selection, photo importance selection, and text input.

In another embodiment of the present invention, the storage medium causes the processor to perform a step of grouping said plurality of images based on said automatic image information, wherein said grouping of said plurality of images is achieved through at least one of: timestamp analysis, image similarity analysis, and photo importance scoring.

In another embodiment of the present invention, the storage medium causes the processor to perform a step of inserting content, comprising a subset of the images, into said photo-project based on the grouping of said plurality of images to create an editable photo-project, wherein the step of inserting content is derived through one or more algorithms for: a ranking of images, a buffer calculation for a best fitting content into a photo slot, an area of interest selection on a photo, a score for inserting a photo into a photo slot of a layout, a determination of a best design of a design page, a dynamic text insertion algorithm, and a positioning of a photo into a photo slot having a focal box.

In another embodiment of the present invention, the storage medium causes the processor to perform a step of inserting content, comprising a subset of the images, into said photo-project based on the grouping of said plurality of images to create an editable photo-project, wherein the step of inserting content is derived through one or more algorithms for: a ranking of images, a buffer calculation for a best fitting content into a photo slot, an area of interest selection on a photo, a score for inserting a photo into a photo slot of a layout, a determination of a best design of a design page, a dynamic text insertion algorithm, and a positioning of a photo into a photo slot having a focal box, and wherein said ranking of images comprises a plurality of image heuristics for calculating image importance.

Example 2

Another embodiment of the present invention is a non-transitory, computer-readable storage medium storing executable instructions, which when executed by a processor of a server, causes the processor to perform a process for creating a photo-project over a communications network, the instructions causing the processor to perform the steps of:

(a) establishing a client-server connection between the server and a computing device over said communications network;

(b) receiving a plurality of images from said computing device through an upload to said server, and storing said plurality of images in a data repository connected to said server;

(c) performing an image analysis on said plurality of images to derive automatic image information from said plurality of images;

(d) grouping said plurality of images based on said automatic image information;

(e) inserting content, comprising a subset of the images, into said photo-project based on the grouping of said plurality of images to create an editable photo-project; and (f) presenting said editable photo-project to a user of said computing device enabling said user to edit the editable photo-project and order said photo-project, wherein said photo-project is a photobook comprising: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein the photo strip displays a collage of images.

Example 3

Another embodiment of the present invention is a non-transitory, computer-readable storage medium storing executable instructions, which when executed by a processor of a server, causes the processor to perform a process for creating a photo-project over a communications network, the instructions causing the processor to perform the steps of:

(a) establishing a client-server connection between the server and a computing device over said communications network;

(b) receiving a plurality of images from said computing device through an upload to said server, and storing said plurality of images in a data repository connected to said server;

(c) performing an image analysis on said plurality of images to derive automatic image information from said plurality of images;

(d) grouping said plurality of images based on said automatic image information;

(e) inserting content, comprising a subset of the images, into said photo-project based on the grouping of said plurality of images to create an editable photo-project; and (f) presenting said editable photo-project to a user of said computing device enabling said user to edit the editable photo-project and order said photo-project, wherein said photo-project is a photobook comprising: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein the back cover has a padding material.

Example 4

Another embodiment of the present invention is a non-transitory, computer-readable storage medium storing executable instructions, which when executed by a processor of a server, causes the processor to perform a process for creating a photo-project over a communications network, the instructions causing the processor to perform the steps of:

(a) establishing a client-server connection between the server and a computing device over said communications network;

(b) receiving a plurality of images from said computing device through an upload to said server, and storing said plurality of images in a data repository connected to said server;

(c) performing an image analysis on said plurality of images to derive automatic image information from said plurality of images;

(d) grouping said plurality of images based on said automatic image information;

(e) inserting content, comprising a subset of the images, into said photo-project based on the grouping of said plurality of images to create an editable photo-project; and (f) presenting said editable photo-project to a user of said computing device enabling said user to edit the editable photo-project and order said photo-project, wherein said photo-project is a photobook comprising: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein the spine comprises a flexible cover material. In any of the embodiments of the present invention, the spine of the photobook can be rounded. The spine can be made to be rounded by any means such as by using a flexible cover material, a curves spine or a curved stiffened spine.

Example 5

Another embodiment of the present invention is a non-transitory, computer-readable storage medium storing executable instructions, which when executed by a processor of a server, causes the processor to perform a process for creating a photo-project over a communications network, the instructions causing the processor to perform the steps of:

(a) establishing a client-server connection between the server and a computing device over said communications network;

(b) receiving a plurality of images from said computing device through an upload to said server, and storing said plurality of images in a data repository connected to said server;

(c) performing an image analysis on said plurality of images to derive automatic image information from said plurality of images;

(d) grouping said plurality of images based on said automatic image information;

(e) inserting content, comprising a subset of the images, into said photo-project based on the grouping of said plurality of images to create an editable photo-project; and (f) presenting said editable photo-project to a user of said computing device enabling said user to edit the editable photo-project and order said photo-project, wherein said photo-project is a photobook comprising: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and the photobook further comprising a binding decoration between the spine and the binding of the pages.

Example 6

Another embodiment of the present invention is a method for automating a creation of a photobook in a client-server environment via a graphical user interface (GUI) of a user device, after a user of said user device uploads content comprising media files from said user device to a server, the method comprising:

(a) selecting a first set of content for insertion into a design of said media project, wherein said first set of content is based on information derived though an image analysis of said media files performed by said server, wherein said first set of content is automatically inserted into said design without said user's interaction utilizing automated rules for content insertion, and wherein said rules for content insertion comprise algorithms comprising at least: saliency detection rules, face detection rules, and object detection rules;

(b) grouping of said media files into a plurality of groups by using automated rules of content grouping, and inserting said groups of media files into said design, wherein said rules of content grouping comprise at least image similarity detection and image scores based on repetition of images;

(c) presenting to said user at said GUI an automated design of said media project by automatically inserting said first set of content into the media project, wherein said automated design is generated using said automated rules of content insertion and said automated rules of content grouping; and (d) receiving a print order from the user to print the media project as a photobook, wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover.

Example 7

Another embodiment of the present invention is a method for automating a creation of a photobook in a client-server environment via a graphical user interface (GUI) of a user device, after a user of said user device uploads content comprising media files from said user device to a server, the method comprising:
- (a) selecting a first set of content for insertion into a design of said media project, wherein said first set of content is based on information derived though an image analysis of said media files performed by said server, wherein said first set of content is automatically inserted into said design without said user's interaction utilizing automated rules for content insertion, and wherein said rules for content insertion comprise algorithms comprising at least: saliency detection rules, face detection rules, and object detection rules;
- (b) grouping of said media files into a plurality of groups by using automated rules of content grouping, and inserting said groups of media files into said design, wherein said rules of content grouping comprise at least image similarity detection and image scores based on repetition of images;
- (c) presenting to said user at said GUI an automated design of said media project by automatically inserting said first set of content into the media project, wherein said automated design is generated using said automated rules of content insertion and said automated rules of content grouping; and
- (d) receiving a print order from the user to print the media project as a photobook,
- wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein the photo strip displays a collage of images.

Example 8

Another embodiment of the present invention is a method for automating a creation of a photobook in a client-server environment via a graphical user interface (GUI) of a user device, after a user of said user device uploads content comprising media files from said user device to a server, the method comprising:
- (a) selecting a first set of content for insertion into a design of said media project, wherein said first set of content is based on information derived though an image analysis of said media files performed by said server, wherein said first set of content is automatically inserted into said design without said user's interaction utilizing automated rules for content insertion, and wherein said rules for content insertion comprise algorithms comprising at least: saliency detection rules, face detection rules, and object detection rules;
- (b) grouping of said media files into a plurality of groups by using automated rules of content grouping, and inserting said groups of media files into said design, wherein said rules of content grouping comprise at least image similarity detection and image scores based on repetition of images;
- (c) presenting to said user at said GUI an automated design of said media project by automatically inserting said first set of content into the media project, wherein said automated design is generated using said automated rules of content insertion and said automated rules of content grouping; and
- (d) receiving a print order from the user to print the media project as a photobook,
- wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein the back cover further comprises a padding material.

Example 9

Another embodiment of the present invention is a method for automating a creation of a photobook in a client-server environment via a graphical user interface (GUI) of a user device, after a user of said user device uploads content comprising media files from said user device to a server, the method comprising:
- (a) selecting a first set of content for insertion into a design of said media project, wherein said first set of content is based on information derived though an image analysis of said media files performed by said server, wherein said first set of content is automatically inserted into said design without said user's interaction utilizing automated rules for content insertion, and wherein said rules for content insertion comprise algorithms comprising at least: saliency detection rules, face detection rules, and object detection rules;
- (b) grouping of said media files into a plurality of groups by using automated rules of content grouping, and inserting said groups of media files into said design, wherein said rules of content grouping comprise at least image similarity detection and image scores based on repetition of images;
- (c) presenting to said user at said GUI an automated design of said media project by automatically inserting said first set of content into the media project, wherein said automated design is generated using said automated rules of content insertion and said automated rules of content grouping; and
- (d) receiving a print order from the user to print the media project as a photobook,
- wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein the spine comprises a flexible cover material.

Example 10

Another embodiment of the present invention is a method for automating a creation of a photobook in a client-server environment via a graphical user interface (GUI) of a user device, after a user of said user device uploads content comprising media files from said user device to a server, the method comprising:
  (a) selecting a first set of content for insertion into a design of said media project, wherein said first set of content is based on information derived though an image analysis of said media files performed by said server, wherein said first set of content is automatically inserted into said design without said user's interaction utilizing automated rules for content insertion, and wherein said rules for content insertion comprise algorithms comprising at least: saliency detection rules, face detection rules, and object detection rules;
  (b) grouping of said media files into a plurality of groups by using automated rules of content grouping, and inserting said groups of media files into said design, wherein said rules of content grouping comprise at least image similarity detection and image scores based on repetition of images;
  (c) presenting to said user at said GUI an automated design of said media project by automatically inserting said first set of content into the media project, wherein said automated design is generated using said automated rules of content insertion and said automated rules of content grouping; and
  (d) receiving a print order from the user to print the media project as a photobook,
  wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and the photobook further comprising a binding decoration between the spine and the binding of the pages. In some embodiments of the present invention, the print order from the user to print the media project as a photobook is used to instruct a stamping machine to create a channel in a cover material.

Example 11

Another embodiment of the present invention is a method for automating a creation of a photobook in a client-server environment via a graphical user interface (GUI) of a user device, after a user of said user device uploads content comprising media files from said user device to a server, the method comprising:
  (a) selecting a first set of content for insertion into a design of said media project, wherein said first set of content is based on information derived though an image analysis of said media files performed by said server, wherein said first set of content is automatically inserted into said design without said user's interaction utilizing automated rules for content insertion, and wherein said rules for content insertion comprise algorithms comprising at least: saliency detection rules, face detection rules, and object detection rules;
  (b) grouping of said media files into a plurality of groups by using automated rules of content grouping, and inserting said groups of media files into said design, wherein said rules of content grouping comprise at least image similarity detection and image scores based on repetition of images;
  (c) presenting to said user at said GUI an automated design of said media project by automatically inserting said first set of content into the media project, wherein said automated design is generated using said automated rules of content insertion and said automated rules of content grouping; and
  (d) receiving a print order from the user to print the media project as a photobook,
  wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and the photobook further comprising an end sheet before the binding of the pages and an end sheet after the binding of the pages, wherein the end sheets display a collage of images.

Example 12

Still other embodiments of the present invention include the following:

A system for automating a design of a media-project, the system comprising:

a user device; a server; a communications network connecting said user device and said server; and a plurality of computer codes embodied on a memory of said server, said plurality of computer codes which when executed causes said processor to:
  (a) receive a plurality of images from said user device through an upload to said server, and store said plurality of images in a data repository connected to said server;
  (b) perform an image analysis on said plurality of images to derive automatic image information from said plurality of images;
  (c) insert a subset of the plurality of uploaded images into said media-project based on the image analysis to create an editable media-project; and
  (d) present said editable media-project to a user of said user device allowing said user to further edit and then order said media-based project,
  wherein the media-based project is a photobook, and wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover.

Example 13

A system for automating a design of a media-project, the system comprising:

a user device; a server; a communications network connecting said user device and said server; and a plurality of computer codes embodied on a memory of said server, said plurality of computer codes which when executed causes said processor to:
- (a) receive a plurality of images from said user device through an upload to said server, and store said plurality of images in a data repository connected to said server;
- (b) perform an image analysis on said plurality of images to derive automatic image information from said plurality of images;
- (c) insert a subset of the plurality of uploaded images into said media-project based on the image analysis to create an editable media-project; and
- (d) present said editable media-project to a user of said user device allowing said user to further edit and then order said media-based project,
- wherein the media-based project is a photobook, and wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein said image analysis comprises an execution of computer algorithms for: saliency detection, face detection, photo similarity detection, and object detection. In some embodiments of the present invention, the user order of said media-based project contains an order to print the media-based project as a photobook with instructions for a stamping machine to create a channel in a cover material of the photobook.

Example 14

A system for automating a design of a media-project, the system comprising:

a user device; a server; a communications network connecting said user device and said server; and a plurality of computer codes embodied on a memory of said server, said plurality of computer codes which when executed causes said processor to:
- (a) receive a plurality of images from said user device through an upload to said server, and store said plurality of images in a data repository connected to said server;
- (b) perform an image analysis on said plurality of images to derive automatic image information from said plurality of images;
- (c) insert a subset of the plurality of uploaded images into said media-project based on the image analysis to create an editable media-project; and
- (d) present said editable media-project to a user of said user device allowing said user to further edit and then order said media-based project,
- wherein the media-based project is a photobook, and wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein said grouping of said plurality of images comprises an execution of computer algorithms for: image similarity detection and photo importance scoring.

Example 15

A system for automating a design of a media-project, the system comprising:

a user device; a server; a communications network connecting said user device and said server; and a plurality of computer codes embodied on a memory of said server, said plurality of computer codes which when executed causes said processor to:
- (a) receive a plurality of images from said user device through an upload to said server, and store said plurality of images in a data repository connected to said server;
- (b) perform an image analysis on said plurality of images to derive automatic image information from said plurality of images;
- (c) insert a subset of the plurality of uploaded images into said media-project based on the image analysis to create an editable media-project; and
- (d) present said editable media-project to a user of said user device allowing said user to further edit and then order said media-based project,
- wherein the media-based project is a photobook, and wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein said server, after performing said image analysis, is adapted to auto-populate a layout from a layoutset.

Example 16

A system for automating a design of a media-project, the system comprising:

a user device; a server; a communications network connecting said user device and said server; and a plurality of computer codes embodied on a memory of said server, said plurality of computer codes which when executed causes said processor to:
- (a) receive a plurality of images from said user device through an upload to said server, and store said plurality of images in a data repository connected to said server;
- (b) perform an image analysis on said plurality of images to derive automatic image information from said plurality of images;
- (c) insert a subset of the plurality of uploaded images into said media-project based on the image analysis to create an editable media-project; and
- (d) present said editable media-project to a user of said user device allowing said user to further edit and then order said media-based project,
- wherein the media-based project is a photobook, and wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein said server, after performing said image analysis, is adapted to auto-populate a design from a designset, and wherein said designset is interrelated to said layout and to said layoutset.

Example 17

A system for automating a design of a media-project, the system comprising:

a user device; a server; a communications network connecting said user device and said server; and a plurality of computer codes embodied on a memory of said server, said plurality of computer codes which when executed causes said processor to:
- (a) receive a plurality of images from said user device through an upload to said server, and store said plurality of images in a data repository connected to said server;
- (b) perform an image analysis on said plurality of images to derive automatic image information from said plurality of images;
- (c) insert a subset of the plurality of uploaded images into said media-project based on the image analysis to create an editable media-project; and
- (d) present said editable media-project to a user of said user device allowing said user to further edit and then order said media-based project,
- wherein the media-based project is a photobook, and wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein said sever, after performing said image analysis, is adapted to auto-populate a layout and a design of the media-project.

Example 18

A system for automating a design of a media-project, the system comprising:

a user device; a server; a communications network connecting said user device and said server; and a plurality of computer codes embodied on a memory of said server, said plurality of computer codes which when executed causes said processor to:
- (a) receive a plurality of images from said user device through an upload to said server, and store said plurality of images in a data repository connected to said server;
- (b) perform an image analysis on said plurality of images to derive automatic image information from said plurality of images;
- (c) insert a subset of the plurality of uploaded images into said media-project based on the image analysis to create an editable media-project; and
- (d) present said editable media-project to a user of said user device allowing said user to further edit and then order said media-based project,
- wherein the media-based project is a photobook, and wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein said media-project is sent to a printer, and wherein said printer prints said media-project on paper, thereby turning said media-project into a shippable product for delivery to a plurality of users. IN some embodiments said media-project is sent to a printer, and wherein said printer prints said media-project on paper, thereby turning said media-project into a shippable photobook product for delivery to one user or to a plurality of users.

Example 19

A system for automating a design of a media-project, the system comprising:

a user device; a server; a communications network connecting said user device and said server; and a plurality of computer codes embodied on a memory of said server, said plurality of computer codes which when executed causes said processor to:
- (a) receive a plurality of images from said user device through an upload to said server, and store said plurality of images in a data repository connected to said server;
- (b) perform an image analysis on said plurality of images to derive automatic image information from said plurality of images;
- (c) insert a subset of the plurality of uploaded images into said media-project based on the image analysis to create an editable media-project; and
- (d) present said editable media-project to a user of said user device allowing said user to further edit and then order said media-based project,
- wherein the media-based project is a photobook, and wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein the photo strip displays the images as a collage.

Example 20

A system for automating a design of a media-project, the system comprising:

a user device; a server; a communications network connecting said user device and said server; and a plurality of computer codes embodied on a memory of said server, said plurality of computer codes which when executed causes said processor to:
- (a) receive a plurality of images from said user device through an upload to said server, and store said plurality of images in a data repository connected to said server;
- (b) perform an image analysis on said plurality of images to derive automatic image information from said plurality of images;
- (c) insert a subset of the plurality of uploaded images into said media-project based on the image analysis to create an editable media-project; and (d) present said editable media-project to a user of said user device allowing said user to further edit and then order said media-based project, wherein the media-based project is a photobook, and wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein the back cover further comprises a padding material.

Example 21

A system for automating a design of a media-project, the system comprising:

a user device; a server; a communications network connecting said user device and said server; and a plurality of computer codes embodied on a memory of said server, said plurality of computer codes which when executed causes said processor to:

(a) receive a plurality of images from said user device through an upload to said server, and store said plurality of images in a data repository connected to said server;

(b) perform an image analysis on said plurality of images to derive automatic image information from said plurality of images;

(c) insert a subset of the plurality of uploaded images into said media-project based on the image analysis to create an editable media-project; and (d) present said editable media-project to a user of said user device allowing said user to further edit and then order said media-based project, wherein the media-based project is a photobook, and wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and wherein the spine comprises a flexible cover material.

Example 22

A system for automating a design of a media-project, the system comprising:

a user device; a server; a communications network connecting said user device and said server; and a plurality of computer codes embodied on a memory of said server, said plurality of computer codes which when executed causes said processor to:

(a) receive a plurality of images from said user device through an upload to said server, and store said plurality of images in a data repository connected to said server;

(b) perform an image analysis on said plurality of images to derive automatic image information from said plurality of images;

(c) insert a subset of the plurality of uploaded images into said media-project based on the image analysis to create an editable media-project; and (d) present said editable media-project to a user of said user device allowing said user to further edit and then order said media-based project, wherein the media-based project is a photobook, and wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and the photobook further comprising a binding decoration between the spine and the binding of the pages.

Example 23

A system for automating a design of a media-project, the system comprising:

a user device; a server; a communications network connecting said user device and said server; and a plurality of computer codes embodied on a memory of said server, said plurality of computer codes which when executed causes said processor to:

(a) receive a plurality of images from said user device through an upload to said server, and store said plurality of images in a data repository connected to said server;

(b) perform an image analysis on said plurality of images to derive automatic image information from said plurality of images;

(c) insert a subset of the plurality of uploaded images into said media-project based on the image analysis to create an editable media-project; and (d) present said editable media-project to a user of said user device allowing said user to further edit and then order said media-based project, wherein the media-based project is a photobook, and wherein the photobook comprises: a front cover with a channel having an area less than an area of the front cover; a photo strip set into the channel, wherein the photo strip displays one or more of the images, and the photo strip is essentially flush with the front cover; a back cover; a spine connecting the front cover to the back cover; pages displaying one or more images; and a binding of the pages between the front cover and the back cover, and the photobook further comprising an end sheet before the binding of the page and an end sheet after the binding of the pages, wherein the end sheets display a collage of images. The photobook of claim 11, wherein the photobook has a feature selected from the group consisting of a photo strip which displays a collage of images, a back cover which contains a padding material, a spine which comprises a flexible cover material, a spine which is rounded, a binding decoration which is located between the spine and the binding of the pages, an end sheet before the binding of the pages, an end sheet after the binding of the pages, an end sheet which displays a collage of images, pages which display a collage of images, a page which displays a single image, two consecutive pages which have a portion of the same image, and any combination of features thereof.

Example 24

In some photobook embodiments of the present invention, the photobook has a feature selected from the group consisting of a photo strip which displays a collage of images, a back cover which contains a padding material, a spine which comprises a flexible cover material, a spine which is rounded, a binding decoration which is located between the spine and the binding of the pages, an end sheet before the binding of the pages, an end sheet after the binding of the pages, an end sheet which displays a collage of images, pages which display a collage of images, a page which displays a single image, two consecutive pages which display a portion of the same image, and any combination of features thereof. In some photobook embodiments of the present invention, the front cover, the spine, and the back cover are wrapped with a flexible cover material. In some photobook embodiments of the present invention, a part of the front cover, a part of the spine, and a part of the back cover have a flexible cover material surface. In some embodiments of the present invention a part of the front cover, a part of the spine, and a part of the back cover have a flexible cover material surface.

Conclusions

Certain terminology may be used in the specification for convenience only and is not limiting. The words "lower" and "upper" and "top" and "bottom" designate directions in the drawings to which reference is made. There is also a front cover and a back cover designation for a photobook of the present invention with each cover having an outside and an inside. The terminology includes the words above specifically mentioned, derivatives thereof and words of similar import. Where a term is provided in the singular, the inventors also contemplate aspects of the invention described by the plural of that term. As used in this specification and in the appended claims, the singular forms "a", "an", and "the" include plural references unless the context clearly dictates otherwise, e.g., "a surface" includes a plurality of surfaces. Thus, for example, a reference to "a method" includes one or more methods, and/or steps of the type described herein and/or which will become apparent to those persons skilled in the art upon reading this disclosure. The use of the word "or" between a first item and a second item shall mean the group of items equaling a first item, a second item, and both the first item and the second item. Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

One of ordinary skill in the art knows that the use cases, structures, schematics, and flow diagrams may be performed in other orders or combinations, but the inventive concept of the present invention remains without departing from the broader spirit of the invention. Every embodiment may be unique, and methods/steps may be either shortened or lengthened, overlapped with the other activities, postponed, delayed, and continued after a time gap, such that every user is accommodated to practice the methods of the present invention.

The present invention may be implemented in hardware and/or in software. Many components of the system, for example, network interfaces etc., have not been shown, so as not to obscure the present invention. However, one of ordinary skill in the art would appreciate that the system necessarily includes these components. A user-device is a hardware that includes at least one processor coupled to a memory. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs and outputs for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface with one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

The hardware operates under the control of an operating system, and executes various computer software applications, components, programs, codes, libraries, objects, modules, etc. indicated collectively by reference numerals in FIG. 1U to perform the personalization techniques described above.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A non-transitory, computer-readable storage medium storing executable instructions, which when executed by a processor of a server, causes the processor to perform a process for creating a photo-project over a communications network, the instructions comprising computer-executable instructions for:
 establishing a client-server connection between the server and a computing device over said communications network;
 receiving a plurality of images from a user;
 storing said plurality of images in a data repository connected to said server;
 presenting the photo-project to the user of said computing device;
 receiving a print order from the user for a printed photobook corresponding to the photo-project; and
 in response to the print order, instructing a printer to print the photobook,
 wherein said photobook comprises a front cover with a channel therein, and a photo-strip permanently set into the channel, wherein the photo-strip displays one or more of the images and is flush with the front cover, and
 wherein the front cover of the photobook is made by compressing a compressible cover material with a stamp to form the channel in the compressible cover material, wherein the channel is of a size and a shape matching the photo-strip, then wrapping the compressible cover material with the channel around a cover board to make the front cover, and finally setting the photo-strip permanently into the channel to create the photobook.

2. The storage medium of claim 1, further comprising executable instructions for:
 monitoring user interactions on said computing device while the user is manipulating said plurality of images to derive observed image information from said user interactions; and
 modifying automatically an arrangement of content in said photo-project based on said observed image information to produce a final recommended design of the photo-project.

3. The storage medium of claim 2, wherein said observed image information is derived through analysis of said user interactions comprising areas of interest selection, photo importance selection, and text input.

4. The storage medium of claim 1, further comprising executable instructions for:
 deriving automatic image information though one or more algorithms for saliency detection, face detection, and photo similarity detection in order to automatically arrange said plurality of images.

5. The storage medium of claim 1, further comprising executable instructions for:
 automatically grouping said plurality of images through at least one of timestamp analysis, image similarity analysis, and photo importance scoring.

6. The storage medium of claim 1, further comprising executable instructions for:
 automatically inserting one or more of the plurality of images through one or more algorithms for a ranking of images, an area of interest selection on an image, a score for inserting an image into a photo slot, and a determination of a best design of a page.

7. The storage medium of claim 6, wherein said ranking of images comprises a plurality of image heuristics for calculating image importance.

8. The storage medium of claim 1, wherein the photo-strip of the photobook wraps over a portion of a top inside edge and a bottom inside edge of the front cover of the photobook.

9. A method for creation of a photo-project in a client-server environment via a graphical user interface (GUI) of a user device, the method comprising:
 establishing a client-server connection between a server and the user device over a communications network;
 receiving a plurality of images from a user;
 storing said plurality of images in a data repository connected to said server;
 presenting the photo-project to the user of said user device;
 receiving a print order from the user for a printed photobook corresponding to the photo-project;
 in response to the print order, instructing a printer to print a photo-strip having one or more of the images;
 instructing the printer to produce a front cover of the photobook by compressing a compressible cover material with a stamp to form a channel in the compressible cover material, wherein the channel is of a size and a shape matching the photo-strip;
 instructing the printer to wrap the compressible cover material with the channel around a cover board to make the front cover; and
 instructing the printer to set the photo-strip permanently into the channel and flush with the front cover to create the photobook for delivery to one or more recipients.

10. The method of claim 9, wherein the photo-strip of the photobook wraps over a portion of a top inside edge and a bottom inside edge of the front cover of the photobook.

11. The method of claim 9, wherein the print order from the user to print the photobook is used to instruct a stamping machine to create the channel in the compressible cover material.

12. A system for creating a photo-project and photobook, the system comprising:
 a user device, a server, and a communications network connecting said user device to said server; and
 a plurality of computer code embodied on a memory of said server, said plurality of computer code when executed causes said server to:
  establish a client-server connection between the server and the user device over said communications network;
  receive a plurality of images from a user;
  store said plurality of images in a data repository connected to said server;
  present the photo-project to the user of said user device;
  receive a print order from the user for a printed photobook corresponding to the photo-project; and
  in response to the print order, instructing a printer to print the photobook, wherein said photobook comprises a front cover with a channel therein, and a photo-strip permanently set into the channel, wherein the photo-strip displays one or more of the images and is flush with the front cover, and wherein the front cover of the photobook is made by compressing a compressible cover material with a stamp to form the channel in the compressible cover material, wherein the channel is of a size and a shape matching the photo-strip, before wrapping the compressible cover material with the channel around a cover board to make the front cover, and finally setting the photo-strip permanently into the channel to create the photobook.

13. The system of claim 12, wherein the photo-strip of the photobook wraps over a portion of a top inside edge and a bottom inside edge of the front cover of the photobook.

14. The system of claim 12, wherein the print order from the user to print the photobook is used to instruct a stamping machine to create the channel in the compressible cover material.

15. The system of claim 12, wherein the photo-strip displays a collage comprising a subset of the plurality of images.

16. The system of claim 12, wherein a back cover of the photobook contains a padding material.

17. The system of claim 12, wherein a spine of the photobook comprises the compressible cover material.

18. The system of claim 12, wherein the front cover, a back cover, and a spine of the photobook comprise a continuous piece of the compressible cover material.

19. The system of claim 12, wherein said sever, after performing an automatic image analysis on said plurality of images, is adapted to auto-populate a layout and a design of the photo-project.

20. A photobook, made by a process comprising the steps of:
receiving a plurality of images corresponding to a photo-project;
storing said plurality of images in a data repository;
receiving a print order for a printed photobook corresponding to the photo-project;
in response to the print order, printing a photo-strip having one or more of the images;
producing a front cover by compressing a compressible cover material with a stamp to form a channel in the compressible cover material, wherein the channel is of a size and a shape matching the photo-strip;
wrapping the compressible cover material with the channel around a cover board to make the front cover; and
setting the photo-strip permanently into the channel and flush with the front cover to create the photobook.

21. The photobook of claim 20, wherein the photo-strip set into the channel continues over a top edge and over a bottom edge of the front cover, and wherein the photo-strip has ends terminating on backsides of the front cover.

22. The photobook of claim 20, wherein the photo-strip is located on the front cover in a location selected from the group consisting of a center location, a right side location, a left side location, an upper location, and a lower location.

23. The photobook of claim 20, wherein the photo-strip displays a subset of the plurality of images comprising an image collage.

24. The photobook of claim 20, wherein the photo-strip displays a subset of the plurality of images comprising an image collage according to decisions of a user ordering the photobook.

25. The photobook of claim 20, further comprising:
a back cover;
a spine between the front cover and the back cover, wherein the front cover, the back cover, and the spine are composed of separate pieces of the cover board.

26. The photobook of claim 25, further comprising:
a strip located along an inside part of the spine situated so that the inside part of the spine is flat.

27. The photobook of claim 20, wherein a back cover of the photobook comprises a padding material.

28. The photobook of claim 20, wherein a connection between the front cover and a back cover comprises the compressible cover material.

29. The photobook of claim 20, further comprising:
one or more printed images as a decoration on a cover surface of the front cover or a back cover.

30. The photobook of claim 20, wherein the front cover or a back cover of the photobook has one or more decorations selected from the group consisting of a graphic design, a logo, a hologram, an emboss, a deboss, an emblem, an engraving, an imprint, a brand name, a trademark, a name, an event name, a wedding symbol, a holiday symbol, a special day symbol, a title, a number, a date, a decorative symbol, a foreign character, a word, a printed design, a painted decoration, a surface treatment, a ribbon, a metal ornament, a plastic ornament, and a leather strip.

31. The photobook of claim 20, wherein the photobook is treated with one or more surface treatments selected from the group consisting of a dye, a stain, an opaque ink, a paint, a bleach, a tanning chemical, a wax, an oil, an acrylic spray, and a silicone.

32. The photobook of claim 20, further comprising:
end sheets on an inside of the front cover and an inside of a back cover.

33. A photobook, made by a process comprising the steps of:
receiving a plurality of images corresponding to a photo-project;
storing said plurality of images in a data repository;
receiving a print order for a printed photobook corresponding to the photo- project;
in response to the print order, printing a photo-strip having one or more of the images;
producing a front cover by wrapping a compressible cover material around a cover board to make the front cover;
compressing the compressible cover material to form a channel in the compressible cover material, wherein the channel is of a size and a shape matching the photo-strip; and
setting the photo-strip permanently into the channel and flush with the front cover to create the photobook.

* * * * *